US011633268B2

(12) United States Patent
Moalem et al.

(10) Patent No.: US 11,633,268 B2
(45) Date of Patent: Apr. 25, 2023

(54) TOOTH SHADING, TRANSPARENCY AND GLAZING

(71) Applicant: Align Technology, Inc., San Jose, CA (US)

(72) Inventors: Yosi Moalem, Ness Ziona (IL); Gilad Elbaz, Tel Aviv (IL); Ofer Saphier, Rehovot (IL); Maayan Moshe, Ra'anana (IL); Shai Ayal, Shoham (IL); Doron Malka, Tel Aviv (IL)

(73) Assignee: Align Technology, Inc., San Jose, CA (US)

( * ) Notice: Subject to any disclaimer, the term of this patent is extended or adjusted under 35 U.S.C. 154(b) by 688 days.

(21) Appl. No.: 16/046,897

(22) Filed: Jul. 26, 2018

(65) Prior Publication Data
US 2019/0029784 A1    Jan. 31, 2019

Related U.S. Application Data

(60) Provisional application No. 62/662,961, filed on Apr. 26, 2018, provisional application No. 62/537,941, filed on Jul. 27, 2017.

(51) Int. Cl.
*G06T 15/08* (2011.01)
*A61C 13/08* (2006.01)
(Continued)

(52) U.S. Cl.
CPC .......... *A61C 13/082* (2013.01); *A61C 9/0053* (2013.01); *A61C 13/0004* (2013.01);
(Continued)

(58) Field of Classification Search
CPC combination set(s) only.
See application file for complete search history.

(56) References Cited

U.S. PATENT DOCUMENTS

| 2,171,695 A | 9/1939 | Harper |
|---|---|---|
| 2,194,790 A | 3/1940 | Gluck |

(Continued)

FOREIGN PATENT DOCUMENTS

| AU | 3031677 A | 11/1977 |
|---|---|---|
| CN | 1655732 A | 8/2005 |

(Continued)

OTHER PUBLICATIONS

US 8,553,966 B1, 10/2013, Alpern et al. (withdrawn)
(Continued)

*Primary Examiner* — Andrew G Yang
(74) *Attorney, Agent, or Firm* — Shay Glenn LLP

(57) ABSTRACT

Systems, methods, and/or computer-readable media described herein provide technical solutions to the highly technical problems of machine generation of dental restorations. In particular, these systems, methods and/or computer readable media may provide technical solutions to aid in the creation of dental restorations that more closely resemble a natural tooth (including its internal optical structure). These systems, methods and/or computer readable media may help in virtually rendering a tooth, including its internal optical structure, and apply these renderings (e.g., digital models) to the fabrication of the dental restoration.

24 Claims, 6 Drawing Sheets

(51) Int. Cl.
  *A61C 13/00* (2006.01)
  *A61C 9/00* (2006.01)
  *G06T 17/00* (2006.01)
  *A61C 13/09* (2006.01)

(52) U.S. Cl.
  CPC .............. *G06T 15/08* (2013.01); *G06T 17/00* (2013.01); *A61C 13/0019* (2013.01); *A61C 13/09* (2013.01); *G06T 2210/41* (2013.01)

(56) References Cited

U.S. PATENT DOCUMENTS

| | | |
|---|---|---|
| 2,467,432 A | 4/1949 | Kesling |
| 2,531,222 A | 11/1950 | Kesling |
| 3,089,487 A | 5/1963 | Enicks et al. |
| 3,092,907 A | 6/1963 | Traiger |
| 3,178,820 A | 4/1965 | Kesling |
| 3,211,143 A | 10/1965 | Grossberg |
| 3,379,193 A | 4/1968 | Monsghan |
| 3,385,291 A | 5/1968 | Martin |
| 3,407,500 A | 10/1968 | Kesling |
| 3,478,742 A | 11/1969 | Bohlmann |
| 3,496,936 A | 2/1970 | Gores |
| 3,533,163 A | 10/1970 | Kirschenbaum |
| 3,556,093 A | 1/1971 | Quick |
| 3,600,808 A | 8/1971 | Reeve |
| 3,660,900 A | 5/1972 | Andrews |
| 3,683,502 A | 8/1972 | Wallshein |
| 3,724,075 A | 4/1973 | Kesling |
| 3,738,005 A | 6/1973 | Cohen et al. |
| 3,797,115 A | 3/1974 | Silverman et al. |
| 3,860,803 A | 1/1975 | Levine |
| 3,885,310 A | 5/1975 | Northcutt |
| 3,916,526 A | 11/1975 | Schudy |
| 3,922,786 A | 12/1975 | Lavin |
| 3,949,477 A | 4/1976 | Cohen et al. |
| 3,950,851 A | 4/1976 | Bergersen |
| 3,955,282 A | 5/1976 | McNall |
| 3,983,628 A | 10/1976 | Acevedo |
| 4,014,096 A | 3/1977 | Dellinger |
| 4,055,895 A | 11/1977 | Huge |
| 4,094,068 A | 6/1978 | Schinhammer |
| 4,117,596 A | 10/1978 | Wallshein |
| 4,129,946 A | 12/1978 | Kennedy |
| 4,134,208 A | 1/1979 | Pearlman |
| 4,139,944 A | 2/1979 | Bergersen |
| 4,179,811 A | 12/1979 | Hinz |
| 4,179,812 A | 12/1979 | White |
| 4,183,141 A | 1/1980 | Dellinger |
| 4,195,046 A | 3/1980 | Kesling |
| 4,204,325 A | 5/1980 | Kaelble |
| 4,253,828 A | 3/1981 | Coles et al. |
| 4,255,138 A | 3/1981 | Frohn |
| 4,299,568 A | 11/1981 | Crowley |
| 4,324,546 A | 4/1982 | Heitlinger et al. |
| 4,324,547 A | 4/1982 | Arcan et al. |
| 4,348,178 A | 9/1982 | Kurz |
| 4,368,040 A | 1/1983 | Weissman |
| 4,419,992 A | 12/1983 | Chorbajian |
| 4,433,956 A | 2/1984 | Witzig |
| 4,433,960 A | 2/1984 | Garito et al. |
| 4,439,154 A | 3/1984 | Mayclin |
| 4,449,928 A | 5/1984 | von Weissenfluh |
| 4,478,580 A | 10/1984 | Barrut |
| 4,500,294 A | 2/1985 | Lewis |
| 4,505,672 A | 3/1985 | Kurz |
| 4,505,673 A | 3/1985 | Yoshii |
| 4,519,386 A | 5/1985 | Sullivan |
| 4,523,908 A | 6/1985 | Drisaldi et al. |
| 4,526,540 A | 7/1985 | Dellinger |
| 4,553,936 A | 11/1985 | Wang |
| 4,575,330 A | 3/1986 | Hull |
| 4,575,805 A | 3/1986 | Moermann et al. |
| 4,591,341 A | 5/1986 | Andrews |
| 4,608,021 A | 8/1986 | Barrett |
| 4,609,349 A | 9/1986 | Cain |
| 4,611,288 A | 9/1986 | Duret et al. |
| 4,629,424 A | 12/1986 | Lauks et al. |
| 4,638,145 A | 1/1987 | Sakuma et al. |
| 4,656,860 A | 4/1987 | Orthuber et al. |
| 4,663,720 A | 5/1987 | Duret et al. |
| 4,664,626 A | 5/1987 | Kesling |
| 4,665,621 A | 5/1987 | Ackerman et al. |
| 4,676,747 A | 6/1987 | Kesling |
| 4,755,139 A | 7/1988 | Abbatte et al. |
| 4,757,824 A | 7/1988 | Chaumet |
| 4,763,791 A | 8/1988 | Halverson et al. |
| 4,764,111 A | 8/1988 | Knierim |
| 4,790,752 A | 12/1988 | Cheslak |
| 4,793,803 A | 12/1988 | Martz |
| 4,798,534 A | 1/1989 | Breads |
| 4,830,612 A | 5/1989 | Bergersen |
| 4,836,778 A | 6/1989 | Baumrind et al. |
| 4,837,732 A | 6/1989 | Brandestini et al. |
| 4,850,864 A | 7/1989 | Diamond |
| 4,850,865 A | 7/1989 | Napolitano |
| 4,856,991 A | 8/1989 | Breads et al. |
| 4,877,398 A | 10/1989 | Kesling |
| 4,880,380 A | 11/1989 | Martz |
| 4,886,451 A | 12/1989 | Cetlin |
| 4,889,238 A | 12/1989 | Batchelor |
| 4,890,608 A | 1/1990 | Steer |
| 4,932,866 A | 6/1990 | Guis |
| 4,935,635 A | 6/1990 | O'Harra |
| 4,936,862 A | 6/1990 | Walker et al. |
| 4,937,928 A | 7/1990 | van der Zel |
| 4,941,826 A | 7/1990 | Loran et al. |
| 4,952,928 A | 8/1990 | Carroll et al. |
| 4,964,770 A | 10/1990 | Steinbichler et al. |
| 4,971,557 A | 11/1990 | Martin |
| 4,975,052 A | 12/1990 | Spencer et al. |
| 4,983,334 A | 1/1991 | Adell |
| 4,997,369 A | 3/1991 | Shafir |
| 5,002,485 A | 3/1991 | Aagesen |
| 5,011,405 A | 4/1991 | Lemchen |
| 5,015,183 A | 5/1991 | Fenick |
| 5,017,133 A | 5/1991 | Miura |
| 5,018,969 A | 5/1991 | Andreiko et al. |
| 5,027,281 A | 6/1991 | Rekow et al. |
| 5,035,613 A | 7/1991 | Breads et al. |
| 5,037,295 A | 8/1991 | Bergersen |
| 5,055,039 A | 10/1991 | Abbatte et al. |
| 5,061,839 A | 10/1991 | Matsuno et al. |
| 5,083,919 A | 1/1992 | Quach |
| 5,094,614 A | 3/1992 | Wildman |
| 5,100,316 A | 3/1992 | Wildman |
| 5,103,838 A | 4/1992 | Yousif |
| 5,114,339 A | 5/1992 | Guis |
| 5,121,333 A | 6/1992 | Riley et al. |
| 5,123,425 A | 6/1992 | Shannon et al. |
| 5,128,870 A | 7/1992 | Erdman et al. |
| 5,130,064 A | 7/1992 | Smalley et al. |
| 5,131,843 A | 7/1992 | Hilgers et al. |
| 5,131,844 A | 7/1992 | Marinaccio et al. |
| 5,139,419 A | 8/1992 | Andreiko et al. |
| 5,145,364 A | 9/1992 | Martz et al. |
| 5,176,517 A | 1/1993 | Truax |
| 5,194,003 A | 3/1993 | Garay et al. |
| 5,204,670 A | 4/1993 | Stinton |
| 5,222,499 A | 6/1993 | Allen et al. |
| 5,224,049 A | 6/1993 | Mushabac |
| 5,238,404 A | 8/1993 | Andreiko |
| 5,242,304 A | 9/1993 | Truax et al. |
| 5,245,592 A | 9/1993 | Kuemmel et al. |
| 5,273,429 A | 12/1993 | Rekow et al. |
| 5,278,756 A | 1/1994 | Lemchen et al. |
| 5,306,144 A | 4/1994 | Hibst et al. |
| 5,314,335 A | 5/1994 | Fung |
| 5,324,186 A | 6/1994 | Bakanowski |
| 5,328,362 A | 7/1994 | Watson et al. |
| 5,335,657 A | 8/1994 | Terry et al. |
| 5,338,198 A | 8/1994 | Wu et al. |
| 5,340,309 A | 8/1994 | Robertson |
| 5,342,202 A | 8/1994 | Deshayes |

(56) References Cited

U.S. PATENT DOCUMENTS

| | | |
|---|---|---|
| 5,344,315 A | 9/1994 | Hanson |
| 5,368,478 A | 11/1994 | Andreiko et al. |
| 5,372,502 A | 12/1994 | Massen et al. |
| D354,355 S | 1/1995 | Hilgers |
| 5,382,164 A | 1/1995 | Stern |
| 5,395,238 A | 3/1995 | Andreiko et al. |
| 5,415,542 A | 5/1995 | Kesling |
| 5,431,562 A | 7/1995 | Andreiko et al. |
| 5,440,326 A | 8/1995 | Quinn |
| 5,440,496 A | 8/1995 | Andersson et al. |
| 5,447,432 A | 9/1995 | Andreiko et al. |
| 5,449,703 A | 9/1995 | Mitra et al. |
| 5,452,219 A | 9/1995 | Dehoff et al. |
| 5,454,717 A | 10/1995 | Andreiko et al. |
| 5,456,600 A | 10/1995 | Andreiko et al. |
| 5,474,448 A | 12/1995 | Andreiko et al. |
| 5,487,662 A | 1/1996 | Kipke et al. |
| RE35,169 E | 3/1996 | Lemchen et al. |
| 5,499,633 A | 3/1996 | Fenton |
| 5,522,725 A | 6/1996 | Jordan et al. |
| 5,528,735 A | 6/1996 | Strasnick et al. |
| 5,533,895 A | 7/1996 | Andreiko et al. |
| 5,540,732 A | 7/1996 | Testerman |
| 5,542,842 A | 8/1996 | Andreiko et al. |
| 5,543,780 A | 8/1996 | McAuley et al. |
| 5,549,476 A | 8/1996 | Stern |
| 5,562,448 A | 10/1996 | Mushabac |
| 5,570,182 A | 10/1996 | Nathel et al. |
| 5,575,655 A | 11/1996 | Darnell |
| 5,583,977 A | 12/1996 | Seidl |
| 5,587,912 A | 12/1996 | Andersson et al. |
| 5,588,098 A | 12/1996 | Chen et al. |
| 5,605,459 A | 2/1997 | Kuroda et al. |
| 5,607,305 A | 3/1997 | Andersson et al. |
| 5,614,075 A | 3/1997 | Andre |
| 5,621,648 A | 4/1997 | Crump |
| 5,626,537 A | 5/1997 | Danyo et al. |
| 5,636,736 A | 6/1997 | Jacobs et al. |
| 5,645,420 A | 7/1997 | Bergersen |
| 5,645,421 A | 7/1997 | Slootsky |
| 5,651,671 A | 7/1997 | Seay et al. |
| 5,655,653 A | 8/1997 | Chester |
| 5,659,420 A | 8/1997 | Wakai et al. |
| 5,683,243 A | 11/1997 | Andreiko et al. |
| 5,683,244 A | 11/1997 | Truax |
| 5,691,539 A | 11/1997 | Pfeiffer |
| 5,692,894 A | 12/1997 | Schwartz et al. |
| 5,711,665 A | 1/1998 | Adam et al. |
| 5,711,666 A | 1/1998 | Hanson |
| 5,725,376 A | 3/1998 | Poirier |
| 5,725,378 A | 3/1998 | Wang |
| 5,730,151 A | 3/1998 | Summer et al. |
| 5,737,084 A | 4/1998 | Ishihara |
| 5,740,267 A | 4/1998 | Echerer et al. |
| 5,742,700 A | 4/1998 | Yoon et al. |
| 5,769,631 A | 6/1998 | Williams |
| 5,774,425 A | 6/1998 | Ivanov et al. |
| 5,790,242 A | 8/1998 | Stern et al. |
| 5,799,100 A | 8/1998 | Clarke et al. |
| 5,800,162 A | 9/1998 | Shimodaira et al. |
| 5,800,174 A | 9/1998 | Andersson |
| 5,813,854 A | 9/1998 | Nikodem |
| 5,816,800 A | 10/1998 | Brehm et al. |
| 5,818,587 A | 10/1998 | Devaraj et al. |
| 5,823,778 A | 10/1998 | Schmitt et al. |
| 5,848,115 A | 12/1998 | Little et al. |
| 5,857,853 A | 1/1999 | van Nifterick et al. |
| 5,866,058 A | 2/1999 | Batchelder et al. |
| 5,876,199 A | 3/1999 | Bergersen |
| 5,879,158 A | 3/1999 | Doyle et al. |
| 5,880,961 A | 3/1999 | Crump |
| 5,880,962 A | 3/1999 | Andersson et al. |
| 5,882,192 A | 3/1999 | Bergersen |
| 5,886,702 A | 3/1999 | Migdal et al. |
| 5,890,896 A | 4/1999 | Padial |
| 5,904,479 A | 5/1999 | Staples |
| 5,934,288 A | 8/1999 | Avila et al. |
| 5,957,686 A | 9/1999 | Anthony |
| 5,964,587 A | 10/1999 | Sato |
| 5,971,754 A | 10/1999 | Sondhi et al. |
| 5,975,893 A | 11/1999 | Chishti et al. |
| 5,975,906 A | 11/1999 | Knutson |
| 5,980,246 A | 11/1999 | Ramsay et al. |
| 5,989,023 A | 11/1999 | Summer et al. |
| 6,002,706 A | 12/1999 | Staver et al. |
| 6,018,713 A | 1/2000 | Coli et al. |
| 6,044,309 A | 3/2000 | Honda |
| 6,049,743 A | 4/2000 | Baba |
| 6,053,731 A | 4/2000 | Heckenberger |
| 6,068,482 A | 5/2000 | Snow |
| 6,070,140 A | 5/2000 | Tran |
| 6,099,303 A | 8/2000 | Gibbs et al. |
| 6,099,314 A | 8/2000 | Kopelman et al. |
| 6,102,701 A | 8/2000 | Engeron |
| 6,120,287 A | 9/2000 | Chen |
| 6,123,544 A | 9/2000 | Cleary |
| 6,152,731 A | 11/2000 | Jordan et al. |
| 6,154,676 A | 11/2000 | Levine |
| 6,183,248 B1 | 2/2001 | Chishti et al. |
| 6,183,249 B1 | 2/2001 | Brennan et al. |
| 6,186,780 B1 | 2/2001 | Hibst et al. |
| 6,190,165 B1 | 2/2001 | Andreiko et al. |
| 6,200,133 B1 | 3/2001 | Kittelsen |
| 6,201,880 B1 | 3/2001 | Elbaum et al. |
| 6,210,162 B1 | 4/2001 | Chishti et al. |
| 6,212,435 B1 | 4/2001 | Lattner et al. |
| 6,213,767 B1 | 4/2001 | Dixon et al. |
| 6,217,334 B1 | 4/2001 | Hultgren |
| 6,227,850 B1 | 5/2001 | Chishti et al. |
| 6,231,338 B1 | 5/2001 | de Josselin de Jong et al. |
| 6,239,705 B1 | 5/2001 | Glen |
| 6,243,601 B1 | 6/2001 | Wist |
| 6,263,234 B1 | 7/2001 | Engelhardt et al. |
| 6,283,761 B1 | 9/2001 | Joao |
| 6,288,138 B1 | 9/2001 | Yamamoto |
| 6,299,438 B1 | 10/2001 | Sahagian et al. |
| 6,309,215 B1 | 10/2001 | Phan et al. |
| 6,313,432 B1 | 11/2001 | Nagata et al. |
| 6,315,553 B1 | 11/2001 | Sachdeva et al. |
| 6,328,745 B1 | 12/2001 | Ascherman |
| 6,332,774 B1 | 12/2001 | Chikami |
| 6,334,073 B1 | 12/2001 | Levine |
| 6,350,120 B1 | 2/2002 | Sachdeva et al. |
| 6,364,660 B1 | 4/2002 | Durbin et al. |
| 6,382,975 B1 | 5/2002 | Poirier |
| 6,386,878 B1 | 5/2002 | Pavlovskaia et al. |
| 6,394,802 B1 | 5/2002 | Hahn |
| 6,402,510 B1 | 6/2002 | Williams |
| 6,402,707 B1 | 6/2002 | Ernst |
| 6,405,729 B1 | 6/2002 | Thornton |
| 6,406,292 B1 | 6/2002 | Chishti et al. |
| 6,409,504 B1 | 6/2002 | Jones et al. |
| 6,413,086 B1 | 7/2002 | Womack |
| 6,414,264 B1 | 7/2002 | von Falkenhausen |
| 6,414,708 B1 | 7/2002 | Carmeli et al. |
| 6,435,871 B1 | 8/2002 | Inman |
| 6,436,058 B1 | 8/2002 | Krahner et al. |
| 6,441,354 B1 | 8/2002 | Seghatol et al. |
| 6,450,167 B1 | 9/2002 | David et al. |
| 6,450,807 B1 | 9/2002 | Chishti et al. |
| 6,462,301 B1 | 10/2002 | Scott et al. |
| 6,470,338 B1 | 10/2002 | Rizzo et al. |
| 6,471,511 B1 | 10/2002 | Chishti et al. |
| 6,471,512 B1 | 10/2002 | Sachdeva et al. |
| 6,471,970 B1 | 10/2002 | Fanara et al. |
| 6,482,002 B2 | 11/2002 | Jordan et al. |
| 6,482,298 B1 | 11/2002 | Bhatnagar |
| 6,496,814 B1 | 12/2002 | Busche |
| 6,496,816 B1 | 12/2002 | Thiesson et al. |
| 6,499,026 B1 | 12/2002 | Rivette et al. |
| 6,499,995 B1 | 12/2002 | Schwartz |
| 6,507,832 B1 | 1/2003 | Evans et al. |
| 6,514,074 B1 | 2/2003 | Chishti et al. |
| 6,515,593 B1 | 2/2003 | Stark et al. |

(56) References Cited

U.S. PATENT DOCUMENTS

| | | |
|---|---|---|
| 6,516,288 B2 | 2/2003 | Bagne |
| 6,516,805 B1 | 2/2003 | Thornton |
| 6,520,772 B2 | 2/2003 | Williams |
| 6,523,009 B1 | 2/2003 | Wilkins |
| 6,523,019 B1 | 2/2003 | Borthwick |
| 6,524,101 B1 | 2/2003 | Phan et al. |
| 6,526,168 B1 | 2/2003 | Ornes et al. |
| 6,526,982 B1 | 3/2003 | Strong |
| 6,529,891 B1 | 3/2003 | Heckerman |
| 6,529,902 B1 | 3/2003 | Kanevsky et al. |
| 6,532,455 B1 | 3/2003 | Martin et al. |
| 6,535,865 B1 | 3/2003 | Skaaning et al. |
| 6,540,512 B1 | 4/2003 | Sachdeva et al. |
| 6,540,707 B1 | 4/2003 | Stark et al. |
| 6,542,593 B1 | 4/2003 | Bowman Amuah |
| 6,542,881 B1 | 4/2003 | Meidan et al. |
| 6,542,894 B1 | 4/2003 | Lee et al. |
| 6,542,903 B2 | 4/2003 | Hull et al. |
| 6,551,243 B2 | 4/2003 | Bocionek et al. |
| 6,554,837 B1 | 4/2003 | Hauri et al. |
| 6,556,659 B1 | 4/2003 | Bowman Amuah |
| 6,556,977 B1 | 4/2003 | Lapointe et al. |
| 6,560,592 B1 | 5/2003 | Reid et al. |
| 6,564,209 B1 | 5/2003 | Dempski et al. |
| 6,567,814 B1 | 5/2003 | Bankier et al. |
| 6,571,227 B1 | 5/2003 | Agrafiotis et al. |
| 6,572,372 B1 | 6/2003 | Phan et al. |
| 6,573,998 B2 | 6/2003 | Sabban |
| 6,574,561 B2 | 6/2003 | Alexander et al. |
| 6,578,003 B1 | 6/2003 | Camarda et al. |
| 6,580,948 B2 | 6/2003 | Haupert et al. |
| 6,587,529 B1 | 7/2003 | Staszewski et al. |
| 6,587,828 B1 | 7/2003 | Sachdeva |
| 6,592,368 B1 | 7/2003 | Weathers |
| 6,594,539 B1 | 7/2003 | Geng |
| 6,595,342 B1 | 7/2003 | Maritzen et al. |
| 6,597,934 B1 | 7/2003 | de Jong et al. |
| 6,598,043 B1 | 7/2003 | Baclawski |
| 6,599,250 B2 | 7/2003 | Webb et al. |
| 6,602,070 B2 | 8/2003 | Miller et al. |
| 6,604,527 B1 | 8/2003 | Palmisano |
| 6,606,744 B1 | 8/2003 | Mikurak |
| 6,607,382 B1 | 8/2003 | Kuo et al. |
| 6,611,783 B2 | 8/2003 | Kelly et al. |
| 6,611,867 B1 | 8/2003 | Bowman Amuah |
| 6,613,001 B1 | 9/2003 | Dworkin |
| 6,615,158 B2 | 9/2003 | Wenzel et al. |
| 6,616,447 B1 | 9/2003 | Rizoiu et al. |
| 6,616,579 B1 | 9/2003 | Reinbold et al. |
| 6,621,491 B1 | 9/2003 | Baumrind et al. |
| 6,623,698 B2 | 9/2003 | Kuo |
| 6,624,752 B2 | 9/2003 | Klitsgaard et al. |
| 6,626,180 B1 | 9/2003 | Kittelsen et al. |
| 6,626,569 B2 | 9/2003 | Reinstein et al. |
| 6,626,669 B2 | 9/2003 | Zegarelli |
| 6,633,772 B2 | 10/2003 | Ford et al. |
| 6,640,128 B2 | 10/2003 | Vilsmeier et al. |
| 6,643,646 B2 | 11/2003 | Su et al. |
| 6,647,383 B1 | 11/2003 | August et al. |
| 6,650,944 B2 | 11/2003 | Goedeke et al. |
| 6,671,818 B1 | 12/2003 | Mikurak |
| 6,675,104 B2 | 1/2004 | Paulse et al. |
| 6,678,669 B2 | 1/2004 | Lapointe et al. |
| 6,682,346 B2 | 1/2004 | Chishti et al. |
| 6,685,469 B2 | 2/2004 | Chishti et al. |
| 6,689,055 B1 | 2/2004 | Mullen et al. |
| 6,690,761 B2 | 2/2004 | Lang et al. |
| 6,691,110 B2 | 2/2004 | Wang et al. |
| 6,694,234 B2 | 2/2004 | Lockwood et al. |
| 6,697,164 B1 | 2/2004 | Babayoff et al. |
| 6,697,793 B2 | 2/2004 | McGreevy |
| 6,702,765 B2 | 3/2004 | Robbins et al. |
| 6,702,804 B1 | 3/2004 | Ritter et al. |
| 6,705,863 B2 | 3/2004 | Phan et al. |
| 6,729,876 B2 | 5/2004 | Chishti et al. |
| 6,733,289 B2 | 5/2004 | Manemann et al. |
| 6,736,638 B1 | 5/2004 | Sachdeva et al. |
| 6,739,869 B1 | 5/2004 | Taub et al. |
| 6,744,932 B1 | 6/2004 | Rubbert et al. |
| 6,749,414 B1 | 6/2004 | Hanson et al. |
| 6,769,913 B2 | 8/2004 | Hurson |
| 6,772,026 B2 | 8/2004 | Bradbury et al. |
| 6,790,036 B2 | 9/2004 | Graham |
| 6,802,713 B1 | 10/2004 | Chishti et al. |
| 6,814,574 B2 | 11/2004 | Abolfathi et al. |
| 6,830,450 B2 | 12/2004 | Knopp et al. |
| 6,832,912 B2 | 12/2004 | Mao |
| 6,832,914 B1 | 12/2004 | Bonnet et al. |
| 6,843,370 B2 | 1/2005 | Tuneberg |
| 6,845,175 B2 | 1/2005 | Kopelman et al. |
| 6,885,464 B1 | 4/2005 | Pfeiffer et al. |
| 6,890,285 B2 | 5/2005 | Rahman et al. |
| 6,951,254 B2 | 10/2005 | Morrison |
| 6,976,841 B1 | 12/2005 | Osterwalder |
| 6,978,268 B2 | 12/2005 | Thomas et al. |
| 6,983,752 B2 | 1/2006 | Garabadian |
| 6,984,128 B2 | 1/2006 | Breining et al. |
| 6,988,893 B2 | 1/2006 | Haywood |
| 7,016,952 B2 | 3/2006 | Mullen et al. |
| 7,020,963 B2 | 4/2006 | Cleary et al. |
| 7,036,514 B2 | 5/2006 | Heck |
| 7,040,896 B2 | 5/2006 | Pavlovskaia et al. |
| 7,106,233 B2 | 9/2006 | Schroeder et al. |
| 7,112,065 B2 | 9/2006 | Kopelman et al. |
| 7,121,825 B2 | 10/2006 | Chishti et al. |
| 7,134,874 B2 | 11/2006 | Chishti et al. |
| 7,137,812 B2 | 11/2006 | Cleary et al. |
| 7,138,640 B1 | 11/2006 | Delgado et al. |
| 7,140,877 B2 | 11/2006 | Kaza |
| 7,142,312 B2 | 11/2006 | Quadling et al. |
| 7,155,373 B2 | 12/2006 | Jordan et al. |
| 7,156,655 B2 | 1/2007 | Sachdeva et al. |
| 7,156,661 B2 | 1/2007 | Choi et al. |
| 7,166,063 B2 | 1/2007 | Rahman et al. |
| 7,184,150 B2 | 2/2007 | Quadling et al. |
| 7,191,451 B2 | 3/2007 | Nakagawa |
| 7,192,273 B2 | 3/2007 | McSurdy |
| 7,217,131 B2 | 5/2007 | Vuillemot |
| 7,220,122 B2 | 5/2007 | Chishti |
| 7,220,124 B2 | 5/2007 | Taub et al. |
| 7,229,282 B2 | 6/2007 | Andreiko et al. |
| 7,234,937 B2 | 6/2007 | Sachdeva et al. |
| 7,241,142 B2 | 7/2007 | Abolfathi et al. |
| 7,244,230 B2 | 7/2007 | Duggirala et al. |
| 7,245,753 B2 | 7/2007 | Squilla et al. |
| 7,257,136 B2 | 8/2007 | Mori et al. |
| 7,286,954 B2 | 10/2007 | Kopelman et al. |
| 7,292,759 B2 | 11/2007 | Boutoussov et al. |
| 7,294,141 B2 | 11/2007 | Bergersen |
| 7,302,842 B2 | 12/2007 | Biester et al. |
| 7,320,592 B2 | 1/2008 | Chishti et al. |
| 7,328,706 B2 | 2/2008 | Barach et al. |
| 7,329,122 B1 | 2/2008 | Scott |
| 7,338,327 B2 | 3/2008 | Sticker et al. |
| D565,509 S | 4/2008 | Fechner et al. |
| 7,351,116 B2 | 4/2008 | Dold |
| 7,354,270 B2 | 4/2008 | Abolfathi et al. |
| 7,357,637 B2 | 4/2008 | Liechtung |
| 7,435,083 B2 | 10/2008 | Chishti et al. |
| 7,450,231 B2 | 11/2008 | Johs et al. |
| 7,458,810 B2 | 12/2008 | Bergersen |
| 7,460,230 B2 | 12/2008 | Johs et al. |
| 7,462,076 B2 | 12/2008 | Walter et al. |
| 7,463,929 B2 | 12/2008 | Simmons |
| 7,476,100 B2 | 1/2009 | Kuo |
| 7,500,851 B2 | 3/2009 | Williams |
| D594,413 S | 6/2009 | Palka et al. |
| 7,543,511 B2 | 6/2009 | Kimura et al. |
| 7,544,103 B2 | 6/2009 | Walter et al. |
| 7,553,157 B2 | 6/2009 | Abolfathi et al. |
| 7,561,273 B2 | 7/2009 | Stautmeister et al. |
| 7,577,284 B2 | 8/2009 | Wong et al. |
| 7,596,253 B2 | 9/2009 | Wong et al. |
| 7,597,594 B2 | 10/2009 | Stadler et al. |

(56) References Cited

U.S. PATENT DOCUMENTS

| | | |
|---|---|---|
| 7,609,875 B2 | 10/2009 | Liu et al. |
| D603,796 S | 11/2009 | Sticker et al. |
| 7,616,319 B1 | 11/2009 | Woollam et al. |
| 7,626,705 B2 | 12/2009 | Altendorf |
| 7,632,216 B2 | 12/2009 | Rahman et al. |
| 7,633,625 B1 | 12/2009 | Woollam et al. |
| 7,637,262 B2 | 12/2009 | Bailey |
| 7,637,740 B2 | 12/2009 | Knopp |
| 7,641,473 B2 | 1/2010 | Sporbert et al. |
| 7,668,355 B2 | 2/2010 | Wong et al. |
| 7,670,179 B2 | 3/2010 | Müller |
| 7,695,327 B2 | 4/2010 | Bäuerle et al. |
| 7,698,068 B2 | 4/2010 | Babayoff |
| 7,711,447 B2 | 5/2010 | Lu et al. |
| 7,724,378 B2 | 5/2010 | Babayoff |
| D618,619 S | 6/2010 | Walter |
| 7,728,848 B2 | 6/2010 | Petrov et al. |
| 7,731,508 B2 | 6/2010 | Borst |
| 7,735,217 B2 | 6/2010 | Borst |
| 7,740,476 B2 | 6/2010 | Rubbert et al. |
| 7,744,369 B2 | 6/2010 | Imgrund et al. |
| 7,746,339 B2 | 6/2010 | Matov et al. |
| 7,780,460 B2 | 8/2010 | Walter |
| 7,787,132 B2 | 8/2010 | Körner et al. |
| 7,791,810 B2 | 9/2010 | Powell |
| 7,796,243 B2 | 9/2010 | Choo-Smith et al. |
| 7,806,687 B2 | 10/2010 | Minagi et al. |
| 7,806,727 B2 | 10/2010 | Dold et al. |
| 7,813,787 B2 | 10/2010 | de Josselin de Jong et al. |
| 7,824,180 B2 | 11/2010 | Abolfathi et al. |
| 7,828,601 B2 | 11/2010 | Pyczak |
| 7,841,464 B2 | 11/2010 | Cinader et al. |
| 7,845,969 B2 | 12/2010 | Stadler et al. |
| 7,854,609 B2 | 12/2010 | Chen et al. |
| 7,862,336 B2 | 1/2011 | Kopelman et al. |
| 7,869,983 B2 | 1/2011 | Raby et al. |
| 7,872,760 B2 | 1/2011 | Ertl |
| 7,874,836 B2 | 1/2011 | McSurdy |
| 7,874,837 B2 | 1/2011 | Chishti et al. |
| 7,874,849 B2 | 1/2011 | Sticker et al. |
| 7,878,801 B2 | 2/2011 | Abolfathi et al. |
| 7,878,805 B2 | 2/2011 | Moss et al. |
| 7,880,751 B2 | 2/2011 | Kuo et al. |
| 7,892,474 B2 | 2/2011 | Shkolnik et al. |
| 7,904,308 B2 | 3/2011 | Arnone et al. |
| 7,907,280 B2 | 3/2011 | Johs et al. |
| 7,929,151 B2 | 4/2011 | Liang et al. |
| 7,930,189 B2 | 4/2011 | Kuo |
| 7,947,508 B2 | 5/2011 | Tricca et al. |
| 7,959,308 B2 | 6/2011 | Freeman et al. |
| 7,963,766 B2 | 6/2011 | Cronauer |
| 7,970,627 B2 | 6/2011 | Kuo et al. |
| 7,985,414 B2 | 7/2011 | Knaack et al. |
| 7,986,415 B2 | 7/2011 | Thiel et al. |
| 7,987,099 B2 | 7/2011 | Kuo et al. |
| 7,991,485 B2 | 8/2011 | Zakim |
| 8,017,891 B2 | 9/2011 | Nevin |
| 8,026,916 B2 | 9/2011 | Wen |
| 8,027,709 B2 | 9/2011 | Arnone et al. |
| 8,029,277 B2 | 10/2011 | Imgrund et al. |
| 8,038,444 B2 | 10/2011 | Kitching et al. |
| 8,045,772 B2 | 10/2011 | Kosuge et al. |
| 8,054,556 B2 | 11/2011 | Chen et al. |
| 8,070,490 B1 | 12/2011 | Roetzer et al. |
| 8,075,306 B2 | 12/2011 | Kitching et al. |
| 8,077,949 B2 | 12/2011 | Liang et al. |
| 8,083,556 B2 | 12/2011 | Stadler et al. |
| D652,799 S | 1/2012 | Mueller |
| 8,092,215 B2 | 1/2012 | Stone-Collonge et al. |
| 8,095,383 B2 | 1/2012 | Arnone et al. |
| 8,099,268 B2 | 1/2012 | Kitching et al. |
| 8,099,305 B2 | 1/2012 | Kuo et al. |
| 8,118,592 B2 | 2/2012 | Tortorici |
| 8,126,025 B2 | 2/2012 | Takeda |
| 8,136,529 B2 | 3/2012 | Kelly |
| 8,144,954 B2 | 3/2012 | Quadling et al. |
| 8,160,334 B2 | 4/2012 | Thiel et al. |
| 8,172,569 B2 | 5/2012 | Matty et al. |
| 8,197,252 B1 | 6/2012 | Harrison |
| 8,201,560 B2 | 6/2012 | Dembro |
| 8,215,312 B2 | 7/2012 | Garabadian et al. |
| 8,240,018 B2 | 8/2012 | Walter et al. |
| 8,275,180 B2 | 9/2012 | Kuo |
| 8,279,450 B2 | 10/2012 | Oota et al. |
| 8,292,617 B2 | 10/2012 | Brandt et al. |
| 8,294,657 B2 | 10/2012 | Kim et al. |
| 8,296,952 B2 | 10/2012 | Greenberg |
| 8,297,286 B2 | 10/2012 | Smernoff |
| 8,306,608 B2 | 11/2012 | Mandelis et al. |
| 8,314,764 B2 | 11/2012 | Kim et al. |
| 8,332,015 B2 | 12/2012 | Ertl |
| 8,354,588 B2 | 1/2013 | Sticker et al. |
| 8,366,479 B2 | 2/2013 | Borst et al. |
| 8,401,826 B2 | 3/2013 | Cheng et al. |
| 8,419,428 B2 | 4/2013 | Lawrence |
| 8,433,083 B2 | 4/2013 | Abolfathi et al. |
| 8,439,672 B2 | 5/2013 | Matov et al. |
| 8,465,280 B2 | 6/2013 | Sachdeva et al. |
| 8,477,320 B2 | 7/2013 | Stock et al. |
| 8,488,113 B2 | 7/2013 | Thiel et al. |
| 8,517,726 B2 | 8/2013 | Kakavand et al. |
| 8,520,922 B2 | 8/2013 | Wang et al. |
| 8,520,925 B2 | 8/2013 | Duret et al. |
| 8,523,565 B2 | 9/2013 | Matty et al. |
| 8,545,221 B2 | 10/2013 | Stone-Collonge et al. |
| 8,556,625 B2 | 10/2013 | Lovely |
| 8,570,530 B2 | 10/2013 | Liang |
| 8,573,224 B2 | 11/2013 | Thornton |
| 8,577,212 B2 | 11/2013 | Thiel |
| 8,601,925 B1 | 12/2013 | Coto |
| 8,639,477 B2 | 1/2014 | Chelnokov et al. |
| 8,650,586 B2 | 2/2014 | Lee et al. |
| 8,675,706 B2 | 3/2014 | Seurin et al. |
| 8,723,029 B2 | 5/2014 | Pyczak et al. |
| 8,738,394 B2 | 5/2014 | Kuo |
| 8,743,923 B2 | 6/2014 | Geske et al. |
| 8,753,114 B2 | 6/2014 | Vuillemot |
| 8,767,270 B2 | 7/2014 | Curry et al. |
| 8,768,016 B2 | 7/2014 | Pan et al. |
| 8,771,149 B2 | 7/2014 | Rahman et al. |
| 8,839,476 B2 | 9/2014 | Adachi |
| 8,843,381 B2 | 9/2014 | Kuo et al. |
| 8,856,053 B2 | 10/2014 | Mah |
| 8,870,566 B2 | 10/2014 | Bergersen |
| 8,874,452 B2 | 10/2014 | Kuo |
| 8,878,905 B2 | 11/2014 | Fisker et al. |
| 8,899,976 B2 | 12/2014 | Chen et al. |
| 8,936,463 B2 | 1/2015 | Mason et al. |
| 8,944,812 B2 | 2/2015 | Kuo |
| 8,948,482 B2 | 2/2015 | Levin |
| 8,956,058 B2 | 2/2015 | Rösch |
| 8,992,216 B2 | 3/2015 | Karazivan |
| 9,004,915 B2 | 4/2015 | Moss et al. |
| 9,022,792 B2 | 5/2015 | Sticker et al. |
| 9,039,418 B1 | 5/2015 | Rubbert |
| 9,084,535 B2 | 7/2015 | Girkin et al. |
| 9,084,657 B2 | 7/2015 | Matty et al. |
| 9,108,338 B2 | 8/2015 | Sirovskiy et al. |
| 9,144,512 B2 | 9/2015 | Wagner |
| 9,192,305 B2 | 11/2015 | Levin |
| 9,204,952 B2 | 12/2015 | Lampalzer |
| 9,211,166 B2 | 12/2015 | Kuo et al. |
| 9,214,014 B2 | 12/2015 | Levin |
| 9,220,580 B2 | 12/2015 | Borovinskih et al. |
| 9,241,774 B2 | 1/2016 | Li et al. |
| 9,242,118 B2 | 1/2016 | Brawn |
| 9,261,358 B2 | 2/2016 | Atiya et al. |
| 9,277,972 B2 | 3/2016 | Brandt et al. |
| 9,336,336 B2 | 5/2016 | Deichmann et al. |
| 9,351,810 B2 | 5/2016 | Moon |
| 9,375,300 B2 | 6/2016 | Matov et al. |
| 9,403,238 B2 | 8/2016 | Culp |
| 9,408,743 B1 | 8/2016 | Wagner |
| 9,414,897 B2 | 8/2016 | Wu et al. |

(56) References Cited

U.S. PATENT DOCUMENTS

| | | |
|---|---|---|
| 9,433,476 B2 | 9/2016 | Khardekar et al. |
| 9,439,568 B2 | 9/2016 | Atiya et al. |
| 9,444,981 B2 | 9/2016 | Bellis et al. |
| 9,463,287 B1 | 10/2016 | Lorberbaum et al. |
| 9,492,243 B2 | 11/2016 | Kuo |
| 9,500,635 B2 | 11/2016 | Islam |
| 9,506,808 B2 | 11/2016 | Jeon et al. |
| 9,510,918 B2 | 12/2016 | Sanchez |
| 9,545,331 B2 | 1/2017 | Ingemarsson-Matzen |
| 9,566,132 B2 | 2/2017 | Stone-Collonge et al. |
| 9,584,771 B2 | 2/2017 | Mandelis et al. |
| 9,589,329 B2 | 3/2017 | Levin |
| 9,675,427 B2 | 6/2017 | Kopelman |
| 9,675,430 B2 | 6/2017 | Verker et al. |
| 9,693,839 B2 | 7/2017 | Atiya et al. |
| 9,730,769 B2 | 8/2017 | Chen et al. |
| 9,744,006 B2 | 8/2017 | Ross |
| 9,820,829 B2 | 11/2017 | Kuo |
| 9,830,688 B2 | 11/2017 | Levin |
| 9,844,421 B2 | 12/2017 | Moss et al. |
| 9,848,985 B2 | 12/2017 | Yang et al. |
| 9,861,451 B1 | 1/2018 | Davis |
| 9,936,186 B2 | 4/2018 | Jesenko et al. |
| 10,123,853 B2 | 11/2018 | Moss et al. |
| 10,154,889 B2 | 12/2018 | Chen et al. |
| 10,159,541 B2 | 12/2018 | Bindayel |
| 10,172,693 B2 | 1/2019 | Brandt et al. |
| 10,195,690 B2 | 2/2019 | Culp |
| 10,231,801 B2 | 3/2019 | Korytov et al. |
| 10,238,472 B2 | 3/2019 | Levin |
| 10,258,432 B2 | 4/2019 | Webber |
| 2001/0002310 A1 | 5/2001 | Chishti et al. |
| 2001/0032100 A1 | 10/2001 | Mahmud et al. |
| 2001/0038705 A1 | 11/2001 | Rubbert et al. |
| 2001/0041320 A1 | 11/2001 | Phan et al. |
| 2002/0004727 A1 | 1/2002 | Knaus et al. |
| 2002/0007284 A1 | 1/2002 | Schurenberg et al. |
| 2002/0010568 A1 | 1/2002 | Rubbert et al. |
| 2002/0015934 A1 | 2/2002 | Rubbert et al. |
| 2002/0025503 A1 | 2/2002 | Chapoulaud et al. |
| 2002/0026105 A1 | 2/2002 | Drazen |
| 2002/0028417 A1 | 3/2002 | Chapoulaud et al. |
| 2002/0035572 A1 | 3/2002 | Takatori et al. |
| 2002/0064752 A1 | 5/2002 | Durbin et al. |
| 2002/0064759 A1 | 5/2002 | Durbin et al. |
| 2002/0087551 A1 | 7/2002 | Hickey et al. |
| 2002/0107853 A1 | 8/2002 | Hofmann et al. |
| 2002/0188478 A1 | 12/2002 | Breeland et al. |
| 2002/0192617 A1 | 12/2002 | Phan et al. |
| 2003/0000927 A1 | 1/2003 | Kanaya et al. |
| 2003/0009252 A1 | 1/2003 | Pavlovskaia et al. |
| 2003/0019848 A1 | 1/2003 | Nicholas et al. |
| 2003/0021453 A1 | 1/2003 | Weise et al. |
| 2003/0035061 A1 | 2/2003 | Iwaki et al. |
| 2003/0049581 A1 | 3/2003 | Deluke |
| 2003/0057192 A1 | 3/2003 | Patel |
| 2003/0059736 A1 | 3/2003 | Uai et al. |
| 2003/0060532 A1 | 3/2003 | Subelka et al. |
| 2003/0068598 A1 | 4/2003 | Vallittu et al. |
| 2003/0095697 A1 | 5/2003 | Wood et al. |
| 2003/0101079 A1 | 5/2003 | McUaughlin |
| 2003/0103060 A1 | 6/2003 | Anderson et al. |
| 2003/0120517 A1 | 6/2003 | Eida et al. |
| 2003/0139834 A1 | 7/2003 | Nikolskiy et al. |
| 2003/0144886 A1 | 7/2003 | Taira |
| 2003/0172043 A1 | 9/2003 | Guyon et al. |
| 2003/0190575 A1 | 10/2003 | Hilliard |
| 2003/0192867 A1 | 10/2003 | Yamazaki et al. |
| 2003/0207224 A1 | 11/2003 | Lotte |
| 2003/0215764 A1 | 11/2003 | Kopelman et al. |
| 2003/0224311 A1 | 12/2003 | Cronauer |
| 2003/0224313 A1 | 12/2003 | Bergersen |
| 2003/0224314 A1 | 12/2003 | Bergersen |
| 2004/0002873 A1 | 1/2004 | Sachdeva |
| 2004/0009449 A1 | 1/2004 | Mah et al. |
| 2004/0013994 A1 | 1/2004 | Goldberg et al. |
| 2004/0019262 A1 | 1/2004 | Perelgut |
| 2004/0029078 A1 | 2/2004 | Marshall |
| 2004/0038168 A1 | 2/2004 | Choi et al. |
| 2004/0054304 A1 | 3/2004 | Raby |
| 2004/0054358 A1 | 3/2004 | Cox et al. |
| 2004/0058295 A1 | 3/2004 | Bergersen |
| 2004/0068199 A1 | 4/2004 | Echauz et al. |
| 2004/0078222 A1 | 4/2004 | Khan et al. |
| 2004/0080621 A1 | 4/2004 | Fisher et al. |
| 2004/0094165 A1 | 5/2004 | Cook |
| 2004/0107118 A1 | 6/2004 | Harnsberger et al. |
| 2004/0133083 A1 | 7/2004 | Comaniciu et al. |
| 2004/0152036 A1 | 8/2004 | Abolfathi |
| 2004/0158194 A1 | 8/2004 | Wolff et al. |
| 2004/0166463 A1 | 8/2004 | Wen et al. |
| 2004/0167646 A1* | 8/2004 | Jelonek .............. B33Y 80/00 700/97 |
| 2004/0170941 A1 | 9/2004 | Phan et al. |
| 2004/0193036 A1 | 9/2004 | Zhou et al. |
| 2004/0197728 A1 | 10/2004 | Abolfathi et al. |
| 2004/0214128 A1 | 10/2004 | Sachdeva et al. |
| 2004/0219479 A1 | 11/2004 | Malin et al. |
| 2004/0220691 A1 | 11/2004 | Hofmeister et al. |
| 2004/0229185 A1 | 11/2004 | Knopp |
| 2004/0259049 A1 | 12/2004 | Kopelman et al. |
| 2005/0003318 A1 | 1/2005 | Choi et al. |
| 2005/0023356 A1 | 2/2005 | Wiklof et al. |
| 2005/0031196 A1 | 2/2005 | Moghaddam et al. |
| 2005/0037312 A1 | 2/2005 | Uchida |
| 2005/0038669 A1 | 2/2005 | Sachdeva et al. |
| 2005/0040551 A1 | 2/2005 | Biegler et al. |
| 2005/0042569 A1 | 2/2005 | Plan et al. |
| 2005/0042577 A1 | 2/2005 | Kvitrud et al. |
| 2005/0048433 A1 | 3/2005 | Hilliard |
| 2005/0074717 A1 | 4/2005 | Cleary et al. |
| 2005/0089822 A1 | 4/2005 | Geng |
| 2005/0100333 A1 | 5/2005 | Kerschbaumer et al. |
| 2005/0108052 A1 | 5/2005 | Omaboe |
| 2005/0131738 A1 | 6/2005 | Morris |
| 2005/0144150 A1 | 6/2005 | Ramamurthy et al. |
| 2005/0171594 A1 | 8/2005 | Machan et al. |
| 2005/0171630 A1 | 8/2005 | Dinauer et al. |
| 2005/0181333 A1 | 8/2005 | Karazivan et al. |
| 2005/0186524 A1 | 8/2005 | Abolfathi et al. |
| 2005/0186526 A1 | 8/2005 | Stewart et al. |
| 2005/0216314 A1 | 9/2005 | Secor |
| 2005/0233276 A1 | 10/2005 | Kopelman et al. |
| 2005/0239013 A1 | 10/2005 | Sachdeva |
| 2005/0244781 A1 | 11/2005 | Abels et al. |
| 2005/0244791 A1 | 11/2005 | Davis et al. |
| 2005/0271996 A1 | 12/2005 | Sporbert et al. |
| 2006/0056670 A1 | 3/2006 | Hamadeh |
| 2006/0057533 A1 | 3/2006 | McGann |
| 2006/0063135 A1 | 3/2006 | Mehl |
| 2006/0078842 A1 | 4/2006 | Sachdeva et al. |
| 2006/0084024 A1 | 4/2006 | Farrell |
| 2006/0093982 A1 | 5/2006 | Wen |
| 2006/0098007 A1 | 5/2006 | Rouet et al. |
| 2006/0099545 A1 | 5/2006 | Lia et al. |
| 2006/0099546 A1 | 5/2006 | Bergersen |
| 2006/0110698 A1 | 5/2006 | Robson |
| 2006/0111631 A1 | 5/2006 | Kelliher et al. |
| 2006/0115785 A1 | 6/2006 | Li et al. |
| 2006/0137813 A1 | 6/2006 | Robrecht et al. |
| 2006/0147872 A1 | 7/2006 | Andreiko |
| 2006/0154198 A1 | 7/2006 | Durbin et al. |
| 2006/0154207 A1 | 7/2006 | Kuo |
| 2006/0173715 A1 | 8/2006 | Wang |
| 2006/0183082 A1 | 8/2006 | Quadling et al. |
| 2006/0188834 A1 | 8/2006 | Hilliard |
| 2006/0188848 A1 | 8/2006 | Tricca et al. |
| 2006/0194163 A1 | 8/2006 | Tricca et al. |
| 2006/0199153 A1 | 9/2006 | Liu et al. |
| 2006/0204078 A1 | 9/2006 | Orth et al. |
| 2006/0223022 A1 | 10/2006 | Solomon |
| 2006/0223023 A1 | 10/2006 | Lai et al. |
| 2006/0223032 A1 | 10/2006 | Fried et al. |
| 2006/0223342 A1 | 10/2006 | Borst et al. |

(56) References Cited

U.S. PATENT DOCUMENTS

| | | |
|---|---|---|
| 2006/0234179 A1 | 10/2006 | Wen et al. |
| 2006/0257815 A1 | 11/2006 | De Dominicis |
| 2006/0275729 A1 | 12/2006 | Fornoff |
| 2006/0275731 A1 | 12/2006 | Wen et al. |
| 2006/0275736 A1 | 12/2006 | Wen et al. |
| 2006/0277075 A1 | 12/2006 | Salwan |
| 2006/0290693 A1 | 12/2006 | Zhou et al. |
| 2006/0292520 A1 | 12/2006 | Dillon et al. |
| 2007/0031775 A1 | 2/2007 | Andreiko |
| 2007/0046865 A1 | 3/2007 | Umeda et al. |
| 2007/0053048 A1 | 3/2007 | Kumar et al. |
| 2007/0054237 A1 | 3/2007 | Neuschafer |
| 2007/0065768 A1 | 3/2007 | Nadav |
| 2007/0087300 A1 | 4/2007 | Willison et al. |
| 2007/0087302 A1 | 4/2007 | Reising et al. |
| 2007/0106138 A1 | 5/2007 | Beiski et al. |
| 2007/0122592 A1 | 5/2007 | Anderson et al. |
| 2007/0128574 A1 | 6/2007 | Kuo et al. |
| 2007/0134615 A1* | 6/2007 | Lovely ................ A61B 5/0086 433/29 |
| 2007/0141525 A1 | 6/2007 | Cinader, Jr. |
| 2007/0141526 A1 | 6/2007 | Eisenberg et al. |
| 2007/0143135 A1 | 6/2007 | Lindquist et al. |
| 2007/0168152 A1 | 7/2007 | Matov et al. |
| 2007/0172112 A1 | 7/2007 | Paley et al. |
| 2007/0172291 A1 | 7/2007 | Yokoyama |
| 2007/0178420 A1 | 8/2007 | Keski-Nisula et al. |
| 2007/0183633 A1 | 8/2007 | Hoffmann |
| 2007/0184402 A1 | 8/2007 | Boutoussov et al. |
| 2007/0185732 A1 | 8/2007 | Hicks et al. |
| 2007/0192137 A1 | 8/2007 | Ombrellaro |
| 2007/0199929 A1 | 8/2007 | Rippl et al. |
| 2007/0215582 A1 | 9/2007 | Roeper et al. |
| 2007/0218422 A1 | 9/2007 | Ehrenfeld |
| 2007/0231765 A1 | 10/2007 | Phan et al. |
| 2007/0238065 A1 | 10/2007 | Sherwood et al. |
| 2007/0239488 A1 | 10/2007 | DeRosso |
| 2007/0263226 A1 | 11/2007 | Kurtz et al. |
| 2008/0013727 A1 | 1/2008 | Uemura |
| 2008/0020350 A1 | 1/2008 | Matov et al. |
| 2008/0045053 A1 | 2/2008 | Stadler et al. |
| 2008/0057461 A1 | 3/2008 | Cheng et al. |
| 2008/0057467 A1 | 3/2008 | Gittelson |
| 2008/0057479 A1 | 3/2008 | Grenness |
| 2008/0059238 A1 | 3/2008 | Park et al. |
| 2008/0090208 A1 | 4/2008 | Rubbert |
| 2008/0094389 A1 | 4/2008 | Rouet et al. |
| 2008/0113317 A1 | 5/2008 | Kemp et al. |
| 2008/0115791 A1 | 5/2008 | Heine |
| 2008/0118882 A1 | 5/2008 | Su |
| 2008/0118886 A1 | 5/2008 | Liang et al. |
| 2008/0141534 A1 | 6/2008 | Hilliard |
| 2008/0169122 A1 | 7/2008 | Shiraishi et al. |
| 2008/0171934 A1 | 7/2008 | Greenan et al. |
| 2008/0176448 A1 | 7/2008 | Muller et al. |
| 2008/0233530 A1 | 9/2008 | Cinader |
| 2008/0242144 A1 | 10/2008 | Dietz |
| 2008/0248443 A1 | 10/2008 | Chishti et al. |
| 2008/0254403 A1 | 10/2008 | Hilliard |
| 2008/0268400 A1 | 10/2008 | Moss et al. |
| 2008/0306724 A1 | 12/2008 | Kitching et al. |
| 2009/0029310 A1 | 1/2009 | Pumphrey et al. |
| 2009/0030290 A1 | 1/2009 | Kozuch et al. |
| 2009/0030347 A1 | 1/2009 | Cao |
| 2009/0040740 A1 | 2/2009 | Muller et al. |
| 2009/0061379 A1 | 3/2009 | Yamamoto et al. |
| 2009/0061381 A1 | 3/2009 | Durbin et al. |
| 2009/0075228 A1 | 3/2009 | Kumada et al. |
| 2009/0087050 A1 | 4/2009 | Gandyra |
| 2009/0087811 A1* | 4/2009 | Ertl ..................... A61B 5/0088 433/29 |
| 2009/0098502 A1 | 4/2009 | Andreiko |
| 2009/0099445 A1 | 4/2009 | Burger |
| 2009/0103579 A1 | 4/2009 | Ushimaru et al. |
| 2009/0105523 A1 | 4/2009 | Kassayan et al. |
| 2009/0130620 A1 | 5/2009 | Yazdi et al. |
| 2009/0136890 A1 | 5/2009 | Kang et al. |
| 2009/0136893 A1 | 5/2009 | Zegarelli |
| 2009/0148809 A1 | 6/2009 | Kuo et al. |
| 2009/0170050 A1 | 7/2009 | Marcus |
| 2009/0181346 A1 | 7/2009 | Orth |
| 2009/0191502 A1 | 7/2009 | Cao et al. |
| 2009/0210032 A1 | 8/2009 | Belski et al. |
| 2009/0218514 A1 | 9/2009 | Klunder et al. |
| 2009/0246726 A1 | 10/2009 | Chelnokov et al. |
| 2009/0281433 A1 | 11/2009 | Saadat et al. |
| 2009/0286195 A1 | 11/2009 | Sears et al. |
| 2009/0298017 A1 | 12/2009 | Boerjes et al. |
| 2009/0305540 A1 | 12/2009 | Stadler et al. |
| 2009/0316966 A1 | 12/2009 | Marshall et al. |
| 2009/0317757 A1 | 12/2009 | Lemchen |
| 2010/0015565 A1 | 1/2010 | Carrillo Gonzalez et al. |
| 2010/0019170 A1 | 1/2010 | Hart et al. |
| 2010/0028825 A1 | 2/2010 | Lemchen |
| 2010/0045902 A1 | 2/2010 | Ikeda et al. |
| 2010/0062394 A1 | 3/2010 | Jones et al. |
| 2010/0068676 A1 | 3/2010 | Mason et al. |
| 2010/0086890 A1 | 4/2010 | Kuo |
| 2010/0105010 A1* | 4/2010 | Mah ..................... A61C 1/084 433/215 |
| 2010/0138025 A1 | 6/2010 | Morton et al. |
| 2010/0142789 A1 | 6/2010 | Chang et al. |
| 2010/0145664 A1 | 6/2010 | Hultgren et al. |
| 2010/0145898 A1 | 6/2010 | Malfliet et al. |
| 2010/0152599 A1 | 6/2010 | DuHamel et al. |
| 2010/0165275 A1 | 7/2010 | Tsukamoto et al. |
| 2010/0167225 A1 | 7/2010 | Kuo |
| 2010/0179789 A1 | 7/2010 | Sachdeva et al. |
| 2010/0193482 A1 | 8/2010 | Ow et al. |
| 2010/0196837 A1 | 8/2010 | Farrell |
| 2010/0216085 A1 | 8/2010 | Kopelman |
| 2010/0217130 A1 | 8/2010 | Weinlaender |
| 2010/0231577 A1 | 9/2010 | Kim et al. |
| 2010/0253773 A1* | 10/2010 | Oota ..................... G01B 11/25 348/77 |
| 2010/0268363 A1 | 10/2010 | Karim et al. |
| 2010/0268515 A1 | 10/2010 | Vogt et al. |
| 2010/0279243 A1 | 11/2010 | Cinader et al. |
| 2010/0280798 A1 | 11/2010 | Pattijn |
| 2010/0281370 A1 | 11/2010 | Rohaly et al. |
| 2010/0303316 A1 | 12/2010 | Bullis et al. |
| 2010/0312484 A1 | 12/2010 | DuHamel et al. |
| 2010/0327461 A1 | 12/2010 | Co et al. |
| 2011/0007920 A1 | 1/2011 | Abolfathi et al. |
| 2011/0012901 A1 | 1/2011 | Kaplanyan |
| 2011/0038514 A1* | 2/2011 | Weigl ................... A61C 9/0053 382/128 |
| 2011/0045428 A1 | 2/2011 | Boltunov et al. |
| 2011/0056350 A1 | 3/2011 | Gale et al. |
| 2011/0065060 A1 | 3/2011 | Teixeira et al. |
| 2011/0081625 A1 | 4/2011 | Fuh |
| 2011/0091832 A1 | 4/2011 | Kim et al. |
| 2011/0102549 A1 | 5/2011 | Takahashi |
| 2011/0102566 A1 | 5/2011 | Zakian et al. |
| 2011/0104630 A1 | 5/2011 | Matov et al. |
| 2011/0136072 A1 | 6/2011 | Li et al. |
| 2011/0136090 A1 | 6/2011 | Kazemi |
| 2011/0143300 A1 | 6/2011 | Villaalba |
| 2011/0143673 A1 | 6/2011 | Landesman et al. |
| 2011/0159452 A1 | 6/2011 | Huang |
| 2011/0164810 A1 | 7/2011 | Zang et al. |
| 2011/0207072 A1 | 8/2011 | Schiemann |
| 2011/0212420 A1 | 9/2011 | Vuillemot |
| 2011/0220623 A1 | 9/2011 | Beutler |
| 2011/0235045 A1 | 9/2011 | Koerner et al. |
| 2011/0269092 A1 | 11/2011 | Kuo et al. |
| 2011/0316994 A1 | 12/2011 | Lemchen |
| 2012/0028210 A1 | 2/2012 | Hegyi et al. |
| 2012/0029883 A1 | 2/2012 | Heinz et al. |
| 2012/0040311 A1 | 2/2012 | Nilsson |
| 2012/0064477 A1 | 3/2012 | Schmitt |
| 2012/0081786 A1 | 4/2012 | Mizuyama et al. |
| 2012/0086681 A1 | 4/2012 | Kim et al. |
| 2012/0115107 A1 | 5/2012 | Adams |

(56) References Cited

U.S. PATENT DOCUMENTS

| | | |
|---|---|---|
| 2012/0129117 A1 | 5/2012 | McCance |
| 2012/0147912 A1 | 6/2012 | Moench et al. |
| 2012/0150494 A1 | 6/2012 | Anderson et al. |
| 2012/0166213 A1 | 6/2012 | Arnone et al. |
| 2012/0172678 A1 | 7/2012 | Logan et al. |
| 2012/0281293 A1 | 11/2012 | Gronenborn et al. |
| 2012/0295216 A1 | 11/2012 | Dykes et al. |
| 2012/0322025 A1 | 12/2012 | Ozawa et al. |
| 2013/0029284 A1 | 1/2013 | Teasdale |
| 2013/0081272 A1 | 4/2013 | Johnson et al. |
| 2013/0089828 A1 | 4/2013 | Borovinskih et al. |
| 2013/0095446 A1 | 4/2013 | Andreiko et al. |
| 2013/0103176 A1 | 4/2013 | Kopelman et al. |
| 2013/0110469 A1 | 5/2013 | Kopelman |
| 2013/0150689 A1 | 6/2013 | Shaw-Klein |
| 2013/0163627 A1 | 6/2013 | Seurin et al. |
| 2013/0201488 A1 | 8/2013 | Ishihara |
| 2013/0204599 A1 | 8/2013 | Matov et al. |
| 2013/0209952 A1 | 8/2013 | Kuo et al. |
| 2013/0235165 A1 | 9/2013 | Gharib et al. |
| 2013/0252195 A1 | 9/2013 | Popat |
| 2013/0266326 A1 | 10/2013 | Joseph et al. |
| 2013/0278396 A1 | 10/2013 | Kimmel |
| 2013/0280671 A1 | 10/2013 | Brawn et al. |
| 2013/0286174 A1 | 10/2013 | Urakabe |
| 2013/0293824 A1 | 11/2013 | Yoneyama et al. |
| 2013/0323664 A1 | 12/2013 | Parker |
| 2013/0323671 A1 | 12/2013 | Dillon et al. |
| 2013/0323674 A1 | 12/2013 | Hakomori et al. |
| 2013/0325431 A1 | 12/2013 | See et al. |
| 2013/0337412 A1 | 12/2013 | Kwon |
| 2014/0061974 A1 | 3/2014 | Tyler |
| 2014/0081091 A1 | 3/2014 | Abolfathi et al. |
| 2014/0093160 A1 | 4/2014 | Porikli et al. |
| 2014/0106289 A1 | 4/2014 | Kozlowski |
| 2014/0122027 A1 | 5/2014 | Andreiko et al. |
| 2014/0136222 A1 | 5/2014 | Arnone et al. |
| 2014/0142902 A1 | 5/2014 | Chelnokov et al. |
| 2014/0178829 A1 | 6/2014 | Kim |
| 2014/0265034 A1 | 9/2014 | Dudley |
| 2014/0272774 A1 | 9/2014 | Dillon et al. |
| 2014/0280376 A1 | 9/2014 | Kuo |
| 2014/0294273 A1 | 10/2014 | Jaisson |
| 2014/0313299 A1 | 10/2014 | Gebhardt et al. |
| 2014/0329194 A1 | 11/2014 | Sachdeva et al. |
| 2014/0342301 A1 | 11/2014 | Fleer et al. |
| 2014/0350354 A1 | 11/2014 | Stenzler et al. |
| 2014/0363778 A1 | 12/2014 | Parker |
| 2015/0002649 A1 | 1/2015 | Nowak et al. |
| 2015/0004553 A1 | 1/2015 | Li et al. |
| 2015/0021210 A1 | 1/2015 | Kesling |
| 2015/0079531 A1 | 3/2015 | Heine |
| 2015/0094564 A1 | 4/2015 | Tashman et al. |
| 2015/0097315 A1 | 4/2015 | DeSimone et al. |
| 2015/0097316 A1 | 4/2015 | DeSimone et al. |
| 2015/0102532 A1 | 4/2015 | DeSimone et al. |
| 2015/0132708 A1 | 5/2015 | Kuo |
| 2015/0140502 A1 | 5/2015 | Brawn et al. |
| 2015/0150501 A1 | 6/2015 | George et al. |
| 2015/0164335 A1 | 6/2015 | Van Der Poel et al. |
| 2015/0173856 A1 | 6/2015 | Iowe et al. |
| 2015/0182303 A1 | 7/2015 | Abraham et al. |
| 2015/0216626 A1 | 8/2015 | Ranjbar |
| 2015/0216716 A1 | 8/2015 | Anitua Aldecoa |
| 2015/0230885 A1 | 8/2015 | Wucher |
| 2015/0238280 A1 | 8/2015 | Wu et al. |
| 2015/0238283 A1 | 8/2015 | Tanugula et al. |
| 2015/0306486 A1 | 10/2015 | Logan et al. |
| 2015/0320320 A1 | 11/2015 | Kopelman et al. |
| 2015/0320532 A1 | 11/2015 | Matty et al. |
| 2015/0325044 A1 | 11/2015 | Lebovitz |
| 2015/0338209 A1 | 11/2015 | Knüttel |
| 2015/0348320 A1* | 12/2015 | Pesach .................. A61B 1/247 382/128 |
| 2015/0351638 A1 | 12/2015 | Amato |
| 2015/0374469 A1 | 12/2015 | Konno et al. |
| 2016/0000332 A1 | 1/2016 | Atiya et al. |
| 2016/0003610 A1* | 1/2016 | Lampert ............ G01B 11/2518 356/4.01 |
| 2016/0022185 A1 | 1/2016 | Agarwal et al. |
| 2016/0042509 A1 | 2/2016 | Andreiko et al. |
| 2016/0051345 A1 | 2/2016 | Levin |
| 2016/0064898 A1 | 3/2016 | Atiya et al. |
| 2016/0067013 A1 | 3/2016 | Morton et al. |
| 2016/0081768 A1 | 3/2016 | Kopelman et al. |
| 2016/0081769 A1 | 3/2016 | Kimura et al. |
| 2016/0095668 A1 | 4/2016 | Kuo et al. |
| 2016/0100924 A1 | 4/2016 | Wilson et al. |
| 2016/0106520 A1 | 4/2016 | Borovinskih et al. |
| 2016/0120621 A1 | 5/2016 | Li et al. |
| 2016/0135924 A1 | 5/2016 | Choi et al. |
| 2016/0135925 A1 | 5/2016 | Mason et al. |
| 2016/0163115 A1 | 6/2016 | Furst |
| 2016/0217708 A1 | 7/2016 | Levin et al. |
| 2016/0220105 A1 | 8/2016 | Durent |
| 2016/0220200 A1* | 8/2016 | Sandholm ............ A61C 9/004 |
| 2016/0225151 A1 | 8/2016 | Cocco et al. |
| 2016/0228213 A1 | 8/2016 | Tod et al. |
| 2016/0242871 A1 | 8/2016 | Morton et al. |
| 2016/0246936 A1 | 8/2016 | Kahn |
| 2016/0287358 A1 | 10/2016 | Nowak et al. |
| 2016/0296303 A1 | 10/2016 | Parker |
| 2016/0302885 A1 | 10/2016 | Matov et al. |
| 2016/0328843 A1 | 11/2016 | Graham et al. |
| 2016/0338799 A1 | 11/2016 | Wu et al. |
| 2016/0346063 A1 | 12/2016 | Schulhof et al. |
| 2016/0367188 A1 | 12/2016 | Malik et al. |
| 2016/0367336 A1* | 12/2016 | Lv .......................... A61C 1/082 |
| 2016/0367339 A1 | 12/2016 | Khardekar et al. |
| 2016/0374784 A1* | 12/2016 | Joshi .................. A61C 13/082 433/214 |
| 2017/0007365 A1 | 1/2017 | Kopelman et al. |
| 2017/0007366 A1 | 1/2017 | Kopelman et al. |
| 2017/0007367 A1 | 1/2017 | Li et al. |
| 2017/0007368 A1 | 1/2017 | Boronkay |
| 2017/0020633 A1 | 1/2017 | Stone-Collonge et al. |
| 2017/0049311 A1 | 2/2017 | Borovinskih et al. |
| 2017/0049326 A1 | 2/2017 | Alfano et al. |
| 2017/0056131 A1 | 3/2017 | Alauddin et al. |
| 2017/0071705 A1 | 3/2017 | Kuo |
| 2017/0086943 A1 | 3/2017 | Mah |
| 2017/0100209 A1 | 4/2017 | Wen |
| 2017/0100212 A1 | 4/2017 | Sherwood et al. |
| 2017/0100213 A1 | 4/2017 | Kuo |
| 2017/0100214 A1 | 4/2017 | Wen |
| 2017/0105815 A1 | 4/2017 | Matov et al. |
| 2017/0135792 A1 | 5/2017 | Webber |
| 2017/0135793 A1 | 5/2017 | Webber et al. |
| 2017/0156821 A1 | 6/2017 | Kopelman et al. |
| 2017/0165032 A1 | 6/2017 | Webber et al. |
| 2017/0215739 A1 | 8/2017 | Miyasato |
| 2017/0251954 A1 | 9/2017 | Lotan et al. |
| 2017/0258555 A1 | 9/2017 | Kopelman |
| 2017/0265970 A1 | 9/2017 | Verker |
| 2017/0319054 A1 | 11/2017 | Miller et al. |
| 2017/0319296 A1 | 11/2017 | Webber et al. |
| 2017/0325690 A1 | 11/2017 | Salah et al. |
| 2017/0340411 A1 | 11/2017 | Akselrod |
| 2017/0340415 A1 | 11/2017 | Choi et al. |
| 2018/0000563 A1 | 1/2018 | Shanjani et al. |
| 2018/0000565 A1 | 1/2018 | Shanjani et al. |
| 2018/0028063 A1 | 2/2018 | Elbaz et al. |
| 2018/0028064 A1 | 2/2018 | Elbaz et al. |
| 2018/0028065 A1 | 2/2018 | Elbaz et al. |
| 2018/0055602 A1 | 3/2018 | Kopelman et al. |
| 2018/0071054 A1 | 3/2018 | Ha |
| 2018/0071055 A1 | 3/2018 | Kuo |
| 2018/0085059 A1 | 3/2018 | Lee |
| 2018/0096465 A1 | 4/2018 | Levin |
| 2018/0125610 A1 | 5/2018 | Carrier et al. |
| 2018/0153648 A1 | 6/2018 | Shanjani et al. |
| 2018/0153649 A1 | 6/2018 | Wu et al. |
| 2018/0153733 A1 | 6/2018 | Kuo |
| 2018/0168788 A1 | 6/2018 | Fernie |

(56) References Cited

U.S. PATENT DOCUMENTS

| | | | |
|---|---|---|---|
| 2018/0192877 A1 | 7/2018 | Atiya et al. | |
| 2018/0228359 A1 | 8/2018 | Meyer et al. | |
| 2018/0318043 A1 | 11/2018 | Li et al. | |
| 2018/0368944 A1 | 12/2018 | Sato et al. | |
| 2019/0026599 A1 | 1/2019 | Salah et al. | |
| 2019/0046296 A1 | 2/2019 | Kopelman et al. | |
| 2019/0046297 A1 | 2/2019 | Kopelman et al. | |
| 2019/0066537 A1* | 2/2019 | Van Den Braber | G06T 17/00 |
| 2019/0069975 A1 | 3/2019 | Cam et al. | |
| 2019/0076216 A1 | 3/2019 | Moss et al. | |
| 2019/0090983 A1 | 3/2019 | Webber et al. | |
| 2019/0110689 A1* | 4/2019 | Ertl | A61B 5/0261 |
| 2020/0100863 A1* | 4/2020 | Kirchner | A61C 9/0006 |

FOREIGN PATENT DOCUMENTS

| | | | |
|---|---|---|---|
| CN | 1655733 A | 8/2005 | |
| CN | 102017658 A | 4/2011 | |
| CN | 103889364 A | 6/2014 | |
| CN | 204092220 U | 1/2015 | |
| CN | 105496575 A | 4/2016 | |
| CN | 105997274 A | 10/2016 | |
| DE | 2749802 A1 | 5/1978 | |
| DE | 3526198 A1 | 2/1986 | |
| DE | 4207169 A1 | 9/1993 | |
| DE | 69327661 T2 | 7/2000 | |
| DE | 102005043627 A1 | 3/2007 | |
| DE | 102007034005 A1 | 1/2009 | |
| DE | 202010017014 U1 | 3/2011 | |
| DE | 102011051443 A1 | 1/2013 | |
| DE | 202012011899 U1 | 1/2013 | |
| DE | 102014225457 A1 | 6/2016 | |
| EP | 0428152 A1 | 5/1991 | |
| EP | 490848 A2 | 6/1992 | |
| EP | 541500 A1 | 5/1993 | |
| EP | 714632 B1 | 5/1997 | |
| EP | 774933 B1 | 12/2000 | |
| EP | 731673 B1 | 5/2001 | |
| EP | 1941843 A2 | 7/2008 | |
| EP | 2437027 A2 | 4/2012 | |
| EP | 2447754 A1 | 5/2012 | |
| EP | 1989764 B1 | 7/2012 | |
| EP | 2332221 B1 | 11/2012 | |
| EP | 2596553 B1 | 12/2013 | |
| EP | 2612300 B1 | 2/2015 | |
| EP | 2848229 A1 | 3/2015 | |
| ES | 463897 A1 | 1/1980 | |
| ES | 2455066 A1 | 4/2014 | |
| FR | 2369828 A1 | 6/1978 | |
| FR | 2867377 A1 | 9/2005 | |
| FR | 2930334 A1 | 10/2009 | |
| GB | 1550777 A | 8/1979 | |
| JP | 53-058191 A | 5/1978 | |
| JP | 4028359 A | 1/1992 | |
| JP | 08-508174 A | 9/1996 | |
| JP | 09-19443 A | 1/1997 | |
| JP | 2003245289 A | 9/2003 | |
| JP | 2000339468 A | 9/2004 | |
| JP | 2005527320 A | 9/2005 | |
| JP | 2005527321 A | 9/2005 | |
| JP | 2006043121 A | 2/2006 | |
| JP | 2007151614 A | 6/2007 | |
| JP | 2007260158 A | 10/2007 | |
| JP | 2007537824 A | 12/2007 | |
| JP | 2008067732 A | 3/2008 | |
| JP | 2008523370 A | 7/2008 | |
| JP | 04184427 B1 | 11/2008 | |
| JP | 2009000412 A | 1/2009 | |
| JP | 2009018173 A | 1/2009 | |
| JP | 2009078133 A | 4/2009 | |
| JP | 2009101386 A | 5/2009 | |
| JP | 2009205330 A | 9/2009 | |
| JP | 2010017726 A | 1/2010 | |
| JP | 2011087733 A | 5/2011 | |
| JP | 2012045143 A | 3/2012 | |
| JP | 2013007645 A | 1/2013 | |
| JP | 2013192865 A | 9/2013 | |
| JP | 201735173 A | 2/2017 | |
| KR | 10-20020062793 A | 7/2002 | |
| KR | 10-20070108019 A | 11/2007 | |
| KR | 10-20090065778 A | 6/2009 | |
| KR | 10-1266966 B1 | 5/2013 | |
| KR | 10-2016-041632 A | 4/2016 | |
| KR | 10-2016-0071127 A | 6/2016 | |
| KR | 10-1675089 B1 | 11/2016 | |
| TW | 480166 B | 3/2002 | |
| WO | WO91/004713 A1 | 4/1991 | |
| WO | WO92/03102 A1 | 3/1992 | |
| WO | WO94/010935 A1 | 5/1994 | |
| WO | WO96/23452 A1 | 8/1996 | |
| WO | WO98/032394 A1 | 7/1998 | |
| WO | WO98/044865 A1 | 10/1998 | |
| WO | WO01/08592 A1 | 2/2001 | |
| WO | WO01/85047 A2 | 11/2001 | |
| WO | WO02/017776 A2 | 3/2002 | |
| WO | WO02/062252 A1 | 8/2002 | |
| WO | WO02/095475 A1 | 11/2002 | |
| WO | WO03/003932 A2 | 1/2003 | |
| WO | WO2006/096558 A2 | 9/2006 | |
| WO | WO2006/100700 A1 | 9/2006 | |
| WO | WO2006/133548 A1 | 12/2006 | |
| WO | WO2007/019709 A2 | 2/2007 | |
| WO | WO2007/071341 A1 | 6/2007 | |
| WO | WO2007/103377 A2 | 9/2007 | |
| WO | WO2008/115654 A1 | 9/2008 | |
| WO | WO2009/016645 A2 | 2/2009 | |
| WO | WO2009/085752 A2 | 7/2009 | |
| WO | WO2009/089129 A1 | 7/2009 | |
| WO | WO2009/146788 A1 | 12/2009 | |
| WO | WO2009/146789 A1 | 12/2009 | |
| WO | WO2010/059988 A1 | 5/2010 | |
| WO | WO2010/123892 A2 | 10/2010 | |
| WO | WO2012/007003 A1 | 1/2012 | |
| WO | WO2012/064684 A2 | 5/2012 | |
| WO | WO2012/074304 A2 | 6/2012 | |
| WO | WO2012/078980 A2 | 6/2012 | |
| WO | WO2012/083968 A1 | 6/2012 | |
| WO | WO2012/140021 A2 | 10/2012 | |
| WO | WO2013/058879 A2 | 4/2013 | |
| WO | WO2014/068107 A1 | 5/2014 | |
| WO | WO2014/091865 A1 | 6/2014 | |
| WO | WO2014/143911 A1 | 9/2014 | |
| WO | WO2015/015289 A2 | 2/2015 | |
| WO | WO2015/063032 A1 | 5/2015 | |
| WO | WO2015/112638 A1 | 7/2015 | |
| WO | WO2015/176004 A1 | 11/2015 | |
| WO | WO2016/004415 A1 | 1/2016 | |
| WO | WO2016/042393 A1 | 3/2016 | |
| WO | WO2016/061279 A1 | 4/2016 | |
| WO | WO2016/084066 A1 | 6/2016 | |
| WO | WO2016/099471 A1 | 6/2016 | |
| WO | WO2016/113745 A1 | 7/2016 | |
| WO | WO2016/116874 A1 | 7/2016 | |
| WO | WO2016/200177 A1 | 12/2016 | |
| WO | WO2017/006176 A1 | 1/2017 | |
| WO | 2017088139 A1 | 6/2017 | |
| WO | WO2017/182654 A1 | 10/2017 | |
| WO | WO-2017180615 A1 * | 10/2017 | G06T 15/08 |
| WO | WO2018/057547 A1 | 3/2018 | |
| WO | WO2018/085718 A2 | 5/2018 | |
| WO | WO2018/232113 A1 | 12/2018 | |
| WO | WO2019/018784 A1 | 1/2019 | |

OTHER PUBLICATIONS

Arakawa et al; Mouthguard biosensor with telemetry system for monitoring of saliva glucose: A novel cavitas sensor; Biosensors and Bioelectronics; 84; pp. 106-111; Oct. 2016.

O'Leary et al.; U.S. Appl. No. 16/195,701 entitled "Orthodontic retainers," filed Nov. 19, 2018.

Shanjani et al., U.S. Appl. No. 16/206,894 entitled "Sensors for monitoring oral appliances," filed Nov. 28, 2019.

(56) References Cited

OTHER PUBLICATIONS

Shanjani et al., U.S. Appl. No. 16/231,906 entitled "Augmented reality enhancements for dental practitioners." Dec. 24, 2018.
Kopleman et al., U.S. Appl. No. 16/220,381 entitled "Closed loop adaptive orthodontic treatment methods and apparatuses," Dec. 14, 2018.
Bernabe et al.; Are the lower incisors the best predictors for the unerupted canine and premolars sums? An analysis of Peruvian sample; The Angle Orthodontist; 75(2); pp. 202-207; Mar. 2005.
Collins English Dictionary; Teeth (definition); 9 pages; retrieved from the internet (https:www.collinsdictionary.com/us/dictionary/english/teeth) on May 13, 2019.
Dental Monitoring; Basics: Howto put the cheek retractor?; 1 page (Screenshot); retrieved from the interenet (https://www.youtube.com/watch?v=6K1HXw4Kq3c); May 27, 2016.
Dental Monitoring; Dental monitoring tutorial; 1 page (Screenshot); retrieved from the internet (https:www.youtube.com/watch?v=Dbe3udOf9_c); Mar. 18, 2015.
dictionary.com; Plural (definition); 6 pages; retrieved from the internet ( https://www.dictionary.eom/browse/plural#) on May 13, 2019.
dictionary.com; Quadrant (definition); 6 pages; retrieved from the internet ( https://www.dictionary.com/browse/quadrant?s=t) on May 13, 2019.
Ecligner Selfie; Change your smile; 1 page (screenshot); retrieved from the internet (https:play.google.com/store/apps/details?id=parklict.ecligner); on Feb. 13, 2018.
Martinelli et al.; Prediction of lower permanent canine and premolars width by correlation methods; The Angle Orthodontist; 75(5); pp. 805-808; Sep. 2005.
Nourallah et al.; New regression equations for prediciting the size of unerupted canines and premolars in a contemporary population; The Angle Orthodontist; 72(3); pp. 216-221; Jun. 2002.
Paredes et al.; A new, accurate and fast digital method to predict unerupted tooth size; The Angle Orthodontist; 76(1); pp. 14-19; Jan. 2006.
Sobral De Agular et al.; The gingival crevicular fluid as a source of biomarkers to enhance efficiency of orthodontic and functional treatment of growing patients; Bio. Med. Research International; vol. 2017; pp. 1-7; Article ID 3257235; (year of pub. sufficiently earlier than effective US filing date and any foreign priority date) 2017.
Levin; U.S. Appl. No. 16/282,431 entitled "Estimating a surface texture of a tooth," filed Feb. 2, 2019.
Chen et al.; U.S. Appl. No. 16/223,019 entitled "Release agent receptacle," filed Dec. 17, 2018.
AADR. American Association for Dental Research; Summary of Activities; Los Angeles, CA; p. 195; Mar. 20-23,(year of pub. sufficiently earlier than effective US filing date and any foreign priority date) 1980.
Alcaniz et al; An Advanced System for the Simulation and Planning of Orthodontic Treatments; Karl Heinz Hohne and Ron Kikinis (eds.); Visualization in Biomedical Computing, 4th Intl. Conf, VBC '96, Hamburg, Germany; Springer-Verlag; pp. 511-520; Sep. 22-25, 1996.
Alexander et al.; The DigiGraph Work Station Part 2 Clinical Management; J. Clin. Orthod.; pp. 402-407; (Author Manuscript); Jul. 1990.
Align Technology; Align technology announces new teen solution with introduction of invisalign teen with mandibular advancement; 2 pages; retrieved from the internet (http://investor.aligntech.com/static-files/eb4fa6bb-3e62-404f-b74d-32059366a01b); Mar. 6, 2017.
Allesee Orthodontic Appliance: Important Tip About Wearing the Red White & Blue Active Clear Retainer System; Allesee Orthodontic Appliances—Pro Lab; 1 page; (year of pub. sufficiently earlier than effective US filing date and any foreign priority date); 1998.
Allesee Orthodontic Appliances: DuraClearTM; Product information; 1 page; (year of pub. sufficiently earlier than effective US filing date and any foreign priority date) 1997.

Allesee Orthodontic Appliances; The Choice is Clear: Red, White & Blue . . . The Simple, Affordable, No-Braces Treatment; ( product information for doctors); retrieved from the internet (http://ormco.com/aoa/appliancesservices/RWB/doctorhtml); 5 pages on May 19, 2003.
Allesee Orthodontic Appliances; The Choice Is Clear: Red, White & Blue . . . The Simple, Affordable, No-Braces Treatment; (product information), 6 pages; (year of pub. sufficiently earlier than effective US filing date and any foreign priority date) 2003.
Allesee Orthodontic Appliances; The Choice is Clear: Red, White & Blue . . . The Simple, Affordable, No-Braces Treatment;(Patient Information); retrieved from the internet (http://ormco.com/aoa/appliancesservices/RWB/patients.html); 2 pages on May 19, 2003.
Allesee Orthodontic Appliances; The Red, White & Blue Way to Improve Your Smile; (information for patients), 2 pages; (year of pub. sufficiently earlier than effective US filing date and any foreign priority date) 1992.
Allesee Orthodontic Appliances; You may be a candidate for this invisible no-braces treatment; product information for patients; 2 pages; (year of pub. sufficiently earlier than effective US filing date and any foreign priority date) 2002.
Altschuler et al.; Analysis of 3-D Data for Comparative 3-D Serial Growth Pattern Studies of Oral-Facial Structures; AADR Abstracts, Program and Abstracts of Papers, 57th General Session, IADR Annual Session, Mar. 29, 1979-Apr. 1, 1979, New Orleans Marriot; Journal of Dental Research; vol. 58, Special Issue A, p. 221; Jan. 1979.
Altschuler et al.; Laser Electro-Optic System for Rapid Three-Dimensional (3D) Topographic Mapping of Surfaces; Optical Engineering; 20(6); pp. 953-961; Dec. 1981.
Altschuler et al.; Measuring Surfaces Space-Coded by a Laser-Projected Dot Matrix; SPIE Imaging q Applications for Automated Industrial Inspection and Assembly; vol. 182; pp. 187-191; Oct. 10, 1979.
Altschuler; 3D Mapping of Maxillo-Facial Prosthesis; AADR Abstract #607; 2 pages total, (year of pub. sufficiently earlier than effective US filing date and any foreign priority date) 1980.
Alves et al.; New trends in food allergens detection: toward biosensing strategies; Critical Reviews in Food Science and Nutrition; 56(14); pp. 2304-2319; doi: 10.1080/10408398.2013.831026; Oct. 2016.
Andersson et al.; Clinical Results with Titanium Crowns Fabricated with Machine Duplication and Spark Erosion; Acta Odontologica Scandinavica; 47(5); pp. 279-286; Oct. 1989.
Andrews, The Six Keys to Optimal Occlusion Straight Wire, Chapter 3, L.A. Wells; pp. 13-24; (year of pub. sufficiently earlier than effective US filing date and any foreign priority date) 1989.
Barone et al.; Creation of 3D multi-body orthodontic models by using independent imaging sensors; Sensors; 13(2); pp. 2033-2050; Feb. 5, 2013.
Bartels et al.; An Introduction to Splines for Use in Computer Graphics and Geometric Modeling; Morgan Kaufmann Publishers; pp. 422-425 Jan. 1, 1987.
Baumrind et al, "Mapping the Skull in 3-D," reprinted from J. Calif. Dent. Assoc, 48(2), 11 pages; (year of pub. sufficiently earlier than effective US filing date and any foreign priority date) Fall Issue 1972.
Baumrind et al.; A Stereophotogrammetric System for the Detection of Prosthesis Loosening in Total Hip Arthroplasty; NATO Symposium on Applications of Human Biostereometrics; SPIE; vol. 166; pp. 112-123; Jul. 9-13, 1978.
Baumrind; A System for Cranio facial Mapping Through the Integration of Data from Stereo X-Ray Films and Stereo Photographs; an invited paper submitted to the 1975 American Society of Photogram Symposium on Close-Range Photogram Systems; University of Illinois; pp. 142-166; Aug. 26-30, 1975.
Baumrind; Integrated Three-Dimensional Craniofacial Mapping: Background, Principles, and Perspectives; Seminars in Orthodontics; 7(4); pp. 223-232; Dec. 2001.
Begole et al.; A Computer System for the Analysis of Dental Casts; The Angle Orthodontist; 51(3); pp. 252-258; Jul. 1981.
Bernard et al; Computerized Diagnosis in Orthodontics for Epidemiological Studies: A ProgressReport; (Abstract Only), J. Dental

(56) References Cited

OTHER PUBLICATIONS

Res. Special Issue, vol. 67, p. 169, paper presented at International Association for Dental Research 66th General Session, Montreal Canada; Mar. 9-13, 1988.
Bhatia et al.; A Computer-Aided Design for Orthognathic Surgery; British Journal of Oral and Maxillofacial Surgery; 22(4); pp. 237-253; Aug. 1, 1984.
Biggerstaff et al.; Computerized Analysis of Occlusion in the Postcanine Dentition; American Journal of Orthodontics; 61(3); pp. 245-254; Mar. 1972.
Biggerstaff; Computerized Diagnostic Setups and Simulations; Angle Orthodontist; 40(I); pp. 28-36; Jan. 1970.
Biostar Operation & Training Manual. Great Lakes Orthodontics, Ltd. 199 Fire Tower Drive,Tonawanda, New York. 14150-5890, 20 pages; (year of pub. sufficiently earlier than effective US filing date and any foreign priority date) 1990.
Blu et al.; Linear interpolation revitalized; IEEE Transactions on Image Processing; 13(5); pp. 710-719; May 2004.
Bourke, Coordinate System Transformation; 1 page; retrived from the internet (http://astronomy.swin.edu.au/' pbourke/prolection/coords) on Nov. 5, 2004; Jun. 1996.
Boyd et al.; Three Dimensional Diagnosis and Orthodontic Treatment of Complex Malocclusions With the Invisalipn Appliance; Seminars in Orthodontics; 7(4); pp. 274-293; Dec. 2001.
Brandestini et al.; Computer Machined Ceramic Inlays: In Vitro Marginal Adaptation; J. Dent. Res. Special Issue; (Abstract 305); vol. 64; p. 208; (year of pub. sufficiently earlier than effective US filing date and any foreign priority date) 1985.
Brook et al.; An Image Analysis System for the Determination of Tooth Dimensions from Study Casts: Comparison with Manual Measurements of Mesio-distal Diameter; Journal of Dental Research; 65(3); pp. 428-431; Mar. 1986.
Burstone et al.; Precision Adjustment of the Transpalatal Lingual Arch: Computer Arch Form Predetermination; American Journal of Orthodontics; 79(2);pp. 115-133; Feb. 1981.
Burstone; Dr. Charles J. Burstone on the Uses of the Computer in Orthodontic Practice (Part 1); Journal of Clinical Orthodontics; 13(7); pp. 442-453; (interview); Jul. 1979.
Burstone; Dr. Charles J. Burstone on the Uses of the Computer in Orthodontic Practice (Part 2); journal of Clinical Orthodontics; 13(8); pp. 539-551 (interview); Aug. 1979.
Cardinal Industrial Finishes; Powder Coatings; 6 pages; retrieved from the internet (http://www.cardinalpaint.com) on Aug. 25, 2000.
Carnaghan, An Alternative to Holograms for the Portrayal of Human Teeth; 4th Int'l. Conf. on Holographic Systems, Components and Applications; pp. 228-231; Sep. 15, 1993.
Chaconas et al,; The DigiGraph Work Station, Part 1, Basic Concepts; Journal of Clinical Orthodontics; 24(6); pp. 360-367; (Author Manuscript); Jun. 1990.
Chafetz et al.; Subsidence of the Femoral Prosthesis, A Stereophotogrammetric Evaluation; Clinical Orthopaedics and Related Research; No. 201; pp. 60-67; Dec. 1985.
Chiappone; Constructing the Gnathologic Setup and Positioner; Journal of Clinical Orthodontics; 14(2); pp. 121-133; Feb. 1980.
Chishti et al.; U.S. Appl. No. 60/050,342 entitled "Procedure for moving teeth using a seires of retainers," filed Jun. 20, 1997.
CSI Computerized Scanning and Imaging Facility; What is a maximum/minimum intensity projection (MIP/MinIP); 1 page; retrived from the internet (http://csi.whoi.edu/content/what-maximumminimum-intensity-projection-mipminip); Jan. 4, 2010.
Cottingham; Gnathologic Clear Plastic Positioner; American Journal of Orthodontics; 55(1); pp. 23-31; Jan. 1969.
Crawford; CAD/CAM in the Dental Office: Does It Work?; Canadian Dental Journal; 57(2); pp. 121-123 Feb. 1991.
Crawford; Computers in Dentistry: Part 1: CAD/CAM: The Computer Moves Chairside, Part 2: F. Duret a Man With a Vision, Part 3: The Computer Gives New Vision—Literally, Part 4: Bytes 'N Bites the Computer Moves From the Front Desk to the Operatory; Canadian Dental Journal; 54(9); pp. 661-666 Sep. 1988.
Crooks; CAD/CAM Comes to USC; USC Dentistry; pp. 14-17; (year of pub. sufficiently earlier than effective US filing date and any foreign priority date) Spring 1990.
Cureton; Correcting Malaligned Mandibular Incisors with Removable Retainers; Journal of Clinical Orthodontics; 30(7); pp. 390-395; Jul. 1996.
Curry et al.; Integrated Three-Dimensional Craniofacial Mapping at the Craniofacial Research InstrumentationLaboratory/University of the Pacific; Seminars in Orthodontics; 7(4); pp. 258-265; Dec. 2001.
Cutting et al.; Three-Dimensional Computer-Assisted Design of Craniofacial Surgical Procedures: Optimization and Interaction with Cephalometric and CT-Based Models; Plastic and Reconstructive Surgery; 77(6); pp. 877-885; Jun. 1986.
DCS Dental AG; The CAD/CAM 'DCS Titan System' for Production of Crowns/Bridges; DSC Production; pp. 1-7; Jan. 1992.
Defranco et al.; Three-Dimensional Large Displacement Analysis of Orthodontic Appliances; Journal of Biomechanics; 9(12); pp. 793-801; Jan. 1976.
Dental Institute University of Zurich Switzerland; Program for International Symposium on Computer Restorations: State of the Art of the CEREC-Method; 2 pages; May 1991.
Dentrac Corporation; Dentrac document; pp. 4-13; (year of pub. sufficiently earlier than effective US filing date and any foreign priority date) 1992.
Dent-x; Dentsim . . . Dent-x's virtual reality 3-D training simulator . . . A revolution in dental education; 6 pages; retrieved from the internet (http://www.dent-x.com/DentSim.htm); on Sep. 24, 1998.
Di Muzio et al.; Minimum intensity projection (MinIP); 6 pages; retrieved from the internet (https://radiopaedia.org/articles/minimum-intensity-projection-minip) on Sep. 6, 2018.
Doruk et al.; The role of the headgear timer in extraoral co-operation; European Journal of Orthodontics; 26; pp. 289-291; Jun. 1, 2004.
DOYLE; Digital Dentistry; Computer Graphics World; pp. 50-52 andp. 54; Oct. 2000.
Dummer et al.; Computed Radiography Imaging Based on High-Density 670 nm VCSEL Arrays; International Society for Optics and Photonics; vol. 7557; p. 75570H; 7 pages; (Author Manuscript); Feb. 24, 2010.
Duret et al.; CAD/CAM Imaging in Dentistry; Current Opinion in Dentistry; 1(2); pp. 150-154; Apr. 1991.
Duret et al.; CAD-CAM in Dentistry; Journal of the American Dental Association; 117(6); pp. 715-720; Nov. 1988.
Duret; The Dental CAD/CAM, General Description of the Project; Hennson International Product Brochure, 18 pages; Jan. 1986.
Duret; Vers Une Prosthese Informatisee; Tonus; 75(15); pp. 55-57; (English translation attached); 23 pages; Nov. 15, 1985.
Economides; The Microcomputer in the Orthodontic Office; Journal of Clinical Orthodontics; 13(11); pp. 767-772; Nov. 1979.
Ellias et al.; Proteomic analysis of saliva identifies potential biomarkers for orthodontic tooth movement; The Scientific World Journal; vol. 2012; Article ID 647240; dio:10.1100/2012/647240; 7 pages; (year of pub. sufficiently earlier than effective US filing date and any foreign priority date) 2012.
Elsasser; Some Observations on the History and Uses of the Kesling Positioner; American Journal of Orthodontics; 36(5); pp. 368-374; May 1, 1950.
English translation of Japanese Laid-Open Publication No. 63-11148 to inventor T. Ozukuri (Laid-Open on Jan. 18, 1998) pp. 1-7.
Faber et al.; Computerized Interactive Orthodontic Treatment Planning; American Journal of Orthodontics; 73(1); pp. 36-46; Jan. 1978.
Felton et al.; A Computerized Analysis of the Shape and Stability of Mandibular Arch Form; American Journal of Orthodontics and Dentofacial Orthopedics; 92(6); pp. 478-483; Dec. 1987.
Florez-Moreno; Time-related changes in salivary levels of the osteotropic factors sRANKL and OPG through orthodontic tooth movement; American Journal of Orthodontics and Dentofacial Orthopedics; 143(1); pp. 92-100; Jan. 2013.
Friede et al.; Accuracy of Cephalometric Prediction in Orthognathic Surgery; Journal of Oral and Maxillofacial Surgery; 45(9); pp. 754-760; Sep. 1987.

(56) References Cited

OTHER PUBLICATIONS

Friedrich et al.; Measuring system for in vivo recording of force systems in orthodontic treatment-concept and analysis of accuracy; J. Biomech.; 32(1); pp. 81-85; (Abstract Only) Jan. 1999.

Futterling et al.; Automated Finite Element Modeling of a Human Mandible with Dental Implants; JS WSCG '98—Conference Program; 8 pages; retrieved from the Internet (https://dspace5.zcu.cz/bitstream/11025/15851/1/Strasser_98.pdf); on Aug. 21, 2018.

Gao et al.; 3-D element Generation for Multi-Connected Complex Dental and Mandibular Structure; IEEE Proceedings International Workshop in Medical Imaging and Augmented Reality; pp. 267-271; Jun. 12, 2001.

Gim-Alldent Deutschland, "Das DUX System: Die Technik," 3 pages; (English Translation Included); (year of pub. sufficiently earlier than effective US filing date and any foreign priority date); 2002.

Gottleib et al.; JCO Interviews Dr. James A. McNamura, Jr., on the Frankel Appliance: Part 2: Clinical 1-1 Management; Journal of Clinical Orthodontics; 16(6); pp. 390-407; retrieved from the internet (http://www.jco-online.com/archive/print_article.asp?Year=1982&Month=06&ArticleNum+); 21 pages; Jun. 1982.

Grayson; New Methods for Three Dimensional Analysis of Craniofacial Deformity, Symposium: Computerized Facial Imaging in Oral and Maxillofacial Surgery; American Association of Oral and Maxillofacial Surgeons; 48(8) suppl 1; pp. 5-6; Sep. 13, 1990.

Grest, Daniel; Marker-Free Human Motion Capture in Dynamic Cluttered Environments from a Single View-Point, PhD Thesis; 171 pages; Dec. 2007.

Guess et al.; Computer Treatment Estimates in Orthodontics and Orthognathic Surgery; Journal of Clinical Orthodontics; 23(4); pp. 262-268; 11 pages; (Author Manuscript); Apr. 1989.

Heaven et al.; Computer-Based Image Analysis of Artificial Root Surface Caries; Abstracts of Papers #2094; Journal of Dental Research; 70:528; (Abstract Only); Apr. 17-21, 1991.

Highbeam Research; Simulating stress put on jaw. (ANSYS Inc.'s finite element analysis software); 2 pages; retrieved from the Internet (http://static.highbeam.eom/t/toolingampproduction/november011996/simulatingstressputonfa . . . ); on Nov. 5, 2004.

Hikage; Integrated Orthodontic Management System for Virtual Three-Dimensional Computer Graphic Simulation and Optical Video Image Database for Diagnosis and Treatment Planning; Journal of Japan KA Orthodontic Society; 46(2); pp. 248-269; 56 pages; (English Translation Included); Feb. 1987.

Hoffmann et al.; Role of Cephalometry for Planning of Jaw Orthopedics and Jaw Surgery Procedures; Informatbnen, pp. 375-396; (English Abstract Included); Mar. 1991.

Hojjatie et al.; Three-Dimensional Finite Element Analysis of Glass-Ceramic Dental Crowns; Journal of Biomechanics; 23(11); pp. 1157-1166; Jan. 1990.

Huckins; CAD-CAM Generated Mandibular Model Prototype from MRI Data; AAOMS, p. 96; (Abstract Only); (year of pub. sufficiently earlier than effective US filing date and any foreign priority date) 1999.

Invisalign; You were made to move. There's never been a better time to straighten your teeth with the most advanced clear aligner in the world; Product webpage; 2 pages; retrieved from the internet (www.invisalign.com/) on Dec. 28, 2017.

JCO Interviews; Craig Andreiko , DDS, MS on the Elan and Orthos Systems; Interview by Dr. Larry W. White; Journal of Clinical Orthodontics; 28(8); pp. 459-468; 14 pages; (Author Manuscript); Aug. 1994.

JCO Interviews; Dr. Homer W. Phillips on Computers in Orthodontic Practice, Part 2; Journal of Clinical Orthodontics; 17(12); pp. 819-831; 19 pages; (Author Manuscript); Dec. 1983.

Jerrold; The Problem, Electronic Data Transmission and the Law; American Journal of Orthodontics and Dentofacial Orthopedics; 113(4); pp. 478-479; 5 pages; (Author Manuscript); Apr. 1998.

Jones et al.; An Assessment of the Fit of a Parabolic Curve to Pre- and Post-Treatment Dental Arches; British Journal of Orthodontics; 16(2); pp. 85-93; May 1989.

Kamada et.al.; Case Reports On Tooth Positioners Using LTV Vinyl Silicone Rubber; J. Nihon University School of Dentistry; 26(1); pp. 11-29; (year of pub. sufficiently earlier than effective US filing date and any foreign priority date) 1984.

Kamada et.al.; Construction of Tooth Positioners with LTV Vinyl Silicone Rubber and Some Case KJ Reports; J. Nihon University School of Dentistry; 24(1); pp. 1-27; (year of pub. sufficiently earlier than effective US filing date and any foreign priority date) 1982.

Kanazawa et al.; Three-Dimensional Measurements of the Occlusal Surfaces of Upper Molars in a Dutch Population; Journal of Dental Research; 63(11); pp. 1298-1301; Nov. 1984.

Kesling et al.; The Philosophy of the Tooth Positioning Appliance; American Journal of Orthodontics and Oral surgery; 31(6); pp. 297-304; Jun. 1945.

Kesling; Coordinating the Predetermined Pattern and Tooth Positioner with Conventional Treatment; American Journal of Orthodontics and Oral Surgery; 32(5); pp. 285-293; May 1946.

Kleeman et al.; The Speed Positioner; J. Clin. Orthod.; 30(12); pp. 673-680; Dec. 1996.

Kochanek; Interpolating Splines with Local Tension, Continuity and Bias Control; Computer Graphics; 18(3); pp. 33-41; Jan. 1, 1984.

Kumar et al.; Rapid maxillary expansion: A unique treatment modality in dentistry; J. Clin. Diagn. Res.; 5(4); pp. 906-911; Aug. 2011.

Kunii et al.; Articulation Simulation for an Intelligent Dental Care System; Displays; 15(3); pp. 181-188; Jul. 1994.

Kuroda et al.; Three-Dimensional Dental Cast Analyzing System Using Laser Scanning; American Journal of Orthodontics and Dentofacial Orthopedics; 110(4); pp. 365-369; Oct. 1996.

Laurendeau et al.; A Computer-Vision Technique for the Acquisition and Processing of 3-D Profiles of 7 Dental Imprints: An Application in Orthodontics; IEEE Transactions on Medical Imaging; 10(3); pp. 453-461; Sep. 1991.

Leinfelder et al.; A New Method for Generating Ceramic Restorations: a CAD-CAM System; Journal of the American Dental Association; 118(6); pp. 703-707; Jun. 1989.

Manetti et al.; Computer-Aided Cefalometry and New Mechanics in Orthodontics; Fortschr Kieferorthop; 44; pp. 370-376; 8 pages; (English Article Summary Included); (year of pub. sufficiently earlier than effective US filing date and any foreign priority date) 1983.

McCann; Inside the ADA; J. Amer. Dent. Assoc, 118:286-294; Mar. 1989.

McNamara et al.; Invisible Retainers; J. Clin Orthod.; pp. 570-578; 11 pages; (Author Manuscript); Aug. 1985.

McNamara et al.; Orthodontic and Orthopedic Treatment in the Mixed Dentition; Needham Press; pp. 347-353; Jan. 1993.

Moermann et al., Computer Machined Adhesive Porcelain Inlays: Margin Adaptation after Fatigue Stress; IADR Abstract 339; J. Dent. Res.; 66(a):763; (Abstract Only); (year of pub. sufficiently earlier than effective US filing date and any foreign priority date) 1987.

Moles; Correcting Mild Malalignments—As Easy as One, Two, Three; AOA/Pro Corner; 11(2); 2 pages; (year of pub. sufficiently earlier than effective US filing date and any foreign priority date) 2002.

Mormann et al.; Marginale Adaptation von adhasuven Porzellaninlays in vitro; Separatdruck aus:Schweiz. Mschr. Zahnmed.; 95; pp. 1118-1129; 8 pages; (Machine Translated English Abstract); (year of pub. sufficiently earlier than effective US filing date and any foreign priority date); 1985.

Nahoum; The Vacuum Formed Dental Contour Appliance; N. Y. State Dent. J.; 30(9); pp. 385-390; Nov. 1964.

Nash; CEREC CAD/CAM Inlays: Aesthetics and Durability in a Single Appointment; Dentistry Today; 9(8); pp. 20, 22-23 and 54; Oct. 1990.

Nedelcu et al.; "Scanning Accuracy and Precision In 4 Intraoral Scanners: An In Vitro Comparison Based on 3-Dimensional Analysis"; J. Prosthet. Dent.; 112(6); pp. 1461-1471; Dec. 2014.

Nishiyama et al.; A New Construction of Tooth Repositioner by LTV Vinyl Silicone Rubber; The Journal of Nihon University

(56) References Cited

OTHER PUBLICATIONS

School of Dentistry; 19(2); pp. 93-102 (year of pub. sufficiently earlier than effective US filing date and any foreign priority date) 1977.
Ogawa et al.; Mapping, profiling and clustering of pressure pain threshold (PPT) in edentulous oral muscosa; Journal of Dentistry; 32(3); pp. 219-228; Mar. 2004.
Ogimoto et al.; Pressure-pain threshold determination in the oral mucosa; Journal of Oral Rehabilitation; 29(7); pp. 620-626; Jul. 2002.
Paul et al.; Digital Documentation of Individual Human Jaw and Tooth Forms for Applications in Orthodontics; Oral Surgery and Forensic Medicine Proc. of the 24th Annual Conf. of the IEEE Industrial Electronics Society (IECON '98); vol. 4; pp. 2415-2418; Sep. 4, 1998.
Pinkham; Foolish Concept Propels Technology; Dentist, 3 pages , Jan./Feb. 1989.
Pinkham; Inventor's CAD/CAM May Transform Dentistry; Dentist; pp. 1 and 35, Sep. 1990.
Ponitz; Invisible retainers; Am. J. Orthod.; 59(3); pp. 266-272; Mar. 1971.
Procera Research Projects; Procera Research Projects 1993 Abstract Collection; 23 pages; (year of pub. sufficiently earlier than effective US filing date and any foreign priority date) 1993.
Proffit et al.; The first stage of comprehensive treatment alignment and leveling; Contemporary Orthodontics, 3rd Ed.; Chapter 16; Mosby Inc.; pp. 534-537; (year of pub. sufficiently earlier than effective US filing date and any foreign priority date) 2000.
Proffit et al.; The first stage of comprehensive treatment: alignment and leveling; Contemporary Orthodontics; (Second Ed.); Chapter 15, MosbyYear Book; St. Louis, Missouri; pp. 470-533 Oct. 1993.
Raintree Essix & Ars Materials, Inc., Raintree Essix, Technical Magazine Table of contents and Essix Appliances, 7 pages; retrieved from the internet (http://www.essix.com/magazine/defaulthtml) on Aug. 13, 1997.
Redmond et al.; Clinical Implications of Digital Orthodontics; American Journal of Orthodontics and Dentofacial Orthopedics; 117(2); pp. 240-242; Feb. 2000.
Rekow et al.; CAD/CAM for Dental Restorations—Some of the Curious Challenges; IEEE Transactions on Biomedical Engineering; 38(4); pp. 314-318; Apr. 1991.
Rekow et al.; Comparison of Three Data Acquisition Techniques for 3-D Tooth Surface Mapping; Annual International Conference of the IEEE Engineering in Medicine and Biology Society; 13(1); pp. 344-345 (year of pub. sufficiently earlier than effective US filing date and any foreign priority date) 1991.
Rekow; A Review of the Developments in Dental CAD/CAM Systems; Current Opinion in Dentistry; 2; pp. 25-33; Jun. 1992.
Rekow; CAD/CAM in Dentistry: A Historical Perspective and View of the Future; Journal Canadian Dental Association; 58(4); pp. 283, 287-288; Apr. 1992.
Rekow; Computer-Aided Design and Manufacturing in Dentistry: A Review of the State of the Art; Journal of Prosthetic Dentistry; 58(4); pp. 512-516; Dec. 1987.
Rekow; Dental CAD-CAM Systems: What is the State of the Art?; The Journal of the American Dental Association; 122(12); pp. 43-48; Dec. 1991.
Rekow; Feasibility of an Automated System for Production of Dental Restorations, Ph.D. Thesis; Univ. of Minnesota, 250 pages, Nov. 1988.
Richmond et al.; The Development of the PAR Index (Peer Assessment Rating): Reliability and Validity.; The European Journal of Orthodontics; 14(2); pp. 125-139; Apr. 1992.
Richmond et al.; The Development of a 3D Cast Analysis System; British Journal of Orthodontics; 13(1); pp. 53-54; Jan. 1986.
Richmond; Recording The Dental Cast in Three Dimensions; American Journal of Orthodontics and Dentofacial Orthopedics; 92(3); pp. 199-206; Sep. 1987.

Rudge; Dental Arch Analysis: Arch Form, A Review of the Literature; The European Journal of Orthodontics; 3(4); pp. 279-284; Jan. 1981.
Sahm et al.; "Micro-Electronic Monitoring of Functional Appliance Wear"; Eur J Orthod.; 12(3); pp. 297-301; Aug. 1990.
Sahm; Presentation of a wear timer for the clarification of scientific questions in orthodontic orthopedics; Fortschritte der Kieferorthopadie; 51 (4); pp. 243-247; (Translation Included) Jul. 1990.
Sakuda et al.; Integrated Information-Processing System In Clinical Orthodontics: An Approach with Use of a Computer Network System; American Journal of Orthodontics and Dentofacial Orthopedics; 101(3); pp. 210-220; 20 pages; (Author Manuscript) Mar. 1992.
Schafer et al.; "Quantifying patient adherence during active orthodontic treatment with removable appliances using microelectronic wear-time documentation"; Eur J Orthod.; 37(1)pp. 1-8; doi:10.1093/ejo/cju012; Jul. 3, 2014.
Schellhas et al.; Three-Dimensional Computed Tomography in Maxillofacial Surgical Planning; Archives of Otolaryngology—Head and Neck Surgery; 114(4); pp. 438-442; Apr. 1988.
Schroeder et al.; Eds. The Visual Toolkit, Prentice Hall PTR, New Jersey; Chapters 6, 8 & 9, (pp. 153-210,309-354, and 355-428; (year of pub. sufficiently earlier than effective US filing date and any foreign priority date) 1998.
Shilliday; Minimizing finishing problems with the mini-positioner; American Journal of Orthodontics; 59(6); pp. 596-599; Jun. 1971.
Shimada et al.; Application of optical coherence tomography (OCT) for diagnosis of caries, cracks, and defects of restorations; Current Oral Health Reports; 2(2); pp. 73-80; Jun. 2015.
Siemens; CEREC—Computer-Reconstruction, High Tech in der Zahnmedizin; 15 pagesl; (Includes Machine Translation); (year of pub. sufficiently earlier than effective US filing date and any foreign priority date); 2004.
Sinclair; The Readers' Corner; Journal of Clinical Orthodontics; 26(6); pp. 369-372; 5 pages; retrived from the internet (http://www.jco-online.com/archive/print_article.asp?Year=1992&Month=06&ArticleNum=); Jun. 1992.
Stoll et al.; Computer-aided Technologies in Dentistry; Dtsch Zahna'rztl Z 45, pp. 314-322; (English Abstract Included); (year of pub. sufficiently earlier than effective US filing date and any foreign priority date) 1990.
Sturman; Interactive Keyframe Animation of 3-D Articulated Models; Proceedings Graphics Interface '84; vol. 86; pp. 35-40; May-Jun. 1984.
The American Heritage, Stedman's Medical Dictionary; Gingiva; 3 pages; retrieved from the interent (http://reference.com/search/search?q=gingiva) on Nov. 5, 2004.
The Dental Company Sirona: Cere omnicam and cerec bluecam brochure: The first choice in every case; 8 pages; (year of pub. sufficiently earlier than effective US filing date and any foreign priority date) 2014.
Thera Mon; "Microsensor"; 2 pages; retrieved from the internet (www.english.thera-mon.com/the-product/transponder/index.html); on Sep. 19, 2016.
Thorlabs; Pellin broca prisms; 1 page; retrieved from the internet (www.thorlabs.com); Nov. 30, 2012.
Tiziani et al.; Confocal principle for macro and microscopic surface and defect analysis; Optical Engineering; 39(1); pp. 32-39; Jan. 1, 2000.
Truax; Truax Clasp-Less(TM) Appliance System; The Functional Orthodontist; 9(5); pp. 22-24, 26-8; Sep.-Oct. 1992.
Tru-Tatn Orthodontic & Dental Supplies, Product Brochure, Rochester, Minnesota 55902, 16 pages; (year of pub. sufficiently earlier than effective US filing date and any foreign priority date) 1996.
U.S. Department of Commerce, National Technical Information Service, Holodontography: An Introduction to Dental Laser Holography; School of Aerospace Medicine Brooks AFB Tex; Mar. 1973, 40 pages; Mar. 1973.
U.S. Department of Commerce, National Technical Information Service; Automated Crown Replication Using Solid Photography SM; Solid Photography Inc., Melville NY,; 20 pages; Oct. 1977.

(56) References Cited

OTHER PUBLICATIONS

Vadapalli; Minimum intensity projection (MinIP) is a data visualization; 7 pages; retrieved from the internet (https://prezi.com/tdmttnmv2knw/minimum-intensity-projection-minip-is-a-data-visualization/) on Sep. 6, 2018.
Van Der Linden et al.; Three-Dimensional Analysis of Dental Casts by Means of the Optocom; Journal of Dental Research; 51 (4); p. 1100; Jul.-Aug. 1972.
Van Der Linden; A New Method to Determine Tooth Positions and Dental Arch Dimensions; Journal of Dental Research; 51(4); p. 1104; Jul.-Aug. 1972.
Van Der Zel; Ceramic-Fused-to-Metal Restorations with a New CAD/CAM System; Quintessence International; 24(A); pp. 769-778; (year of pub. sufficiently earlier than effective US filing date and any foreign priority date); 1993.
Van Hilsen et al.; Comparing potential early caries assessment methods for teledentistry; BMC Oral Health; 13(16); doi: 10.1186/1472-6831-13-16; 9 pages; Mar. 2013.
Varady et al.; Reverse Engineering of Geometric Models' an Introduction; Computer-Aided Design; 29(4); pp. 255-268; 20 pages; (Author Manuscript); Apr. 1997.
Verstreken et al.; An Image-Guided Planning System for Endosseous Oral Implants; IEEE Transactions on Medical Imaging; 17(5); pp. 842-852; Oct. 1998.
Warunek et al.; Physical and Mechanical Properties of Elastomers in Orthodonic Positioners; American Journal of Orthodontics and Dentofacial Orthopedics; 95(5); pp. 388-400; 21 pages; (Author Manuscript); May 1989.
Warunek et.al.; Clinical Use of Silicone Elastomer Applicances; JCO; 23(10); pp. 694-700; Oct. 1989.
Watson et al.; Pressures recorded at te denture base-mucosal surface interface in complete denture wearers; Journal of Oral Rehabilitation 14(6); pp. 575-589; Nov. 1987.
Wells; Application of the Positioner Appliance in Orthodontic Treatment; American Journal of Orthodontics; 58(4); pp. 351-366; Oct. 1970.
Wikipedia; Palatal expansion; 3 pages; retrieved from the internet (https://en.wikipedia.org/wiki/Palatal_expansion) on Mar. 5, 2018.
Williams; Dentistry and CAD/CAM: Another French Revolution; J. Dent. Practice Admin.; 4(1); pp. 2-5 Jan./Mar. 1987.
Williams; The Switzerland and Minnesota Developments in CAD/CAM; Journal of Dental Practice Administration; 4(2); pp. 50-55; Apr./Jun. 1987.
Wireless Sensor Networks Magazine; Embedded Teeth for Oral Activity Recognition; 2 pages; retrieved on Sep. 19, 2016 from the internet (www.wsnmagazine.com/embedded-teeth/); Jul. 29, 2013.
Wishan; New Advances in Personal Computer Applications for Cephalometric Analysis, Growth Prediction, Surgical Treatment Planning and Imaging Processing; Symposium: Computerized Facial Imaging in Oral and Maxilofacial Surgery; p. 5; Presented on Sep. 13, 1990.
Witt et al.; The wear-timing measuring device in orthodontics-cui bono? Reflections on the state-of-the-art in wear-timing measurement and compliance research in orthodontics; Fortschr Kieferorthop.; 52(3); pp. 117-125; (Translation Included) Jun. 1991.
Wolf; Three-dimensional structure determination of semi-transparent objects from holographic data; Optics Communications; 1(4); pp. 153-156; Sep. 1969.
WSCG'98—Conference Program, The Sixth International Conference in Central Europe on Computer Graphics and Visualization '98; pp. 1-7; retrieved from the Internet on Nov. 5, 2004, (http://wscg.zcu.cz/wscg98/wscg98.htm); Feb. 9-13, 1998.
Xia et al.; Three-Dimensional Virtual-Reality Surgical Planning and Soft-Tissue Prediction for Orthognathic Surgery; IEEE Transactions on Information Technology in Biomedicine; 5(2); pp. 97-107; Jun. 2001.
Yamada et al.; Simulation of fan-beam type optical computed-tomography imaging of strongly scattering and weakly absorbing media; Applied Optics; 32(25); pp. 4808-4814; Sep. 1, 1993.
Yamamoto et al.; Optical Measurement of Dental Cast Profile and Application to Analysis of Three-Dimensional Tooth Movement in Orthodontics; Front. Med. Biol. Eng., 1(2); pp. 119-130; (year of pub. sufficiently earlier than effective US filing date and any foreign priority date); 1988.
Yamamoto et al.; Three-Dimensional Measurement of Dental Cast Profiles and Its Applications to Orthodontics; Conf. Proc. IEEE Eng. Med. Biol. Soc.; 12(5); pp. 2052-2053; Nov. 1990.
Yamany et al.; A System for Human Jaw Modeling Using Intra-Oral Images; Proc. of the 20th Annual Conf. of the IEEE Engineering in Medicine and Biology Society; vol. 2; pp. 563-566; Oct. 1998.
Yoshii; Research on a New Orthodontic Appliance: The Dynamic Positioner (D.P.); 111. The General Concept of the D.P. Method and Its Therapeutic Effect, Part 1, Dental and Functional Reversed Occlusion Case Reports; Nippon Dental Review; 457; pp. 146-164; 43 pages; (Author Manuscript); Nov. 1980.
Yoshii; Research on a New Orthodontic Appliance: The Dynamic Positioner (D.P.); I. The D.P. Concept and Implementation of Transparent Silicone Resin (Orthocon); Nippon Dental Review; 452; pp. 61-74; 32 pages; (Author Manuscript); Jun. 1980.
Yoshii; Research on a New Orthodontic Appliance: The Dynamic Positioner (D.P.); II. The D.P. Manufacturing Procedure and Clinical Applications; Nippon Dental Review; 454; pp. 107-130; 48 pages; (Author Manuscript); Aug. 1980.
Yoshii; Research on a New Orthodontic Appliance: The Dynamic Positioner (D.P.); III—The General Concept of the D.P. Method and Its Therapeutic Effect, Part 2. Skeletal Reversed Occlusion Case Reports; Nippon Dental Review; 458; pp. 112-129; 40 pages; (Author Manuscript); Dec. 1980.
Grove et al.; U.S. Appl. No. 15/726,243 entitled "Interproximal reduction templates," filed Oct. 5, 2017.
Cramer; U.S. Appl. No. 15/937,569 entitled "Apparatuses and methods assisting in dental therapies," filed Mar. 27, 2018.
Cramer et al.; U.S. Appl. No. 15/942,341 entitled "Orthodontic appliances including at least partially un-erupted teeth and method of forming them," filed Mar. 30, 2018.
Shanjani et al.; U.S. Appl. No. 16/019,037 entitled "Biosensor performance indicator for intraoral appliances," filed Jun. 26, 2018.
Riley et al.; U.S. Appl. No. 16/003,841 entitled Palatal expander with skeletal anchorage devices, filed Jun. 8, 2018.
Sato et al.; U.S. Appl. No. 16/041,606 entitled "Palatal contour anchorage," filed Jul. 20, 2018.
Xue et al.; U.S. Appl. No. 16/010,087 entitled "Automatic detection of tooth type and eruption status," filed Jun. 15, 2018.
Sato et al.; U.S. Appl. No. 16/048,054 entitled "Optical coherence tomography for orthodontic aligners," filed Jul. 27, 2018.
Miller et al.; U.S. Appl. No. 16/038,088 entitled "Method and apparatuses for interactive ordering of dental aligners," filed Jul. 17, 2018.
Nyukhtikov et al.; U.S. Appl. No. 15/998,883 entitled "Buccal corridor assessment and computation," filed Aug. 15, 2018.
Sirona Dental Systems GmbH, CEREC 3D, Manuel utilisateur, Version 2.0X (in French); 114 pages; (English translation of table of contents included); (year of pub. sufficiently earlier than effective US filing date and any foreign priority date); 2003.
Bandodkar et al.; All-printed magnetically self-healing electrochemical devices; Science Advances; 2(11); 11 pages; e1601465; Nov. 2016.
Bandodkar et al.; Self-healing inks for autonomous repair of printable electrochemical devices; Advanced Electronic Materials; 1(12); 5 pages; 1500289; Dec. 2015.
Bandodkar et al.; Wearable biofuel cells: a review; Electroanalysis; 28(6); pp. 1188-1200; Jun. 2016.
Bandodkar et al.; Wearable chemical sensors; present challenges and future prospects; ACS Sensors; 1(5); pp. 464-482; May 11, 2016.
Imani et al.; A wearable chemical-electrophysiological hybrid biosensing system for real-time health and fitness monitoring; Nature Communications; 7; 11650. doi 1038/ncomms11650; 7 pages; May 23, 2016.
Jia et al.; Epidermal biofuel cells: energy harvesting from human perspiration; Angewandle Chemie International Edition; 52(28); pp. 7233-7236; Jul. 8, 2013.

(56) References Cited

OTHER PUBLICATIONS

Jia et al.; Wearable textile biofuel cells for powering electronics; Journal of Materials Chemistry A; 2(43); pp. 18184-18189; Oct. 14, 2014.
Jeerapan et al.; Stretchable biofuel cells as wearable textile-based self-powered sensors; Journal of Materials Chemistry A; 4(47); pp. 18342-18353; Dec. 21, 2016.
Kim et al.; Advanced materials for printed wearable electrochemical devices: A review; Advanced Electronic Materials; 3(1); 15 pages; 1600260; Jan. 2017.
Kim et al.; Noninvasive alcohol monitoring using a wearable tatto-based iontophoretic-biosensing system; Acs Sensors; 1(8); pp. 1011-1019; Jul. 22, 2016.
Kim et al.; Non-invasive mouthguard biosensor for continuous salivary monitoring of metabolites; Analyst; 139(7); pp. 1632-1636; Apr. 7, 2014.
Kim et al.; A wearable fingernail chemical sensing platform: pH sensing at your fingertips; Talanta; 150; pp. 622-628; Apr. 2016.
Kim et al.; Wearable salivary uric acid mouthguard biosensor with integrated wireless electronics; Biosensors and Bioelectronics; 74; pp. 1061-1068; 19 pages; (Author Manuscript); Dec. 2015.
Kumar et al.; All-printed, stretchable Zn—Ag2o rechargeable battery via, hyperelastic binder for self-powering wearable electronics; Advanced Energy Materials; 7(8); 8 pages; 1602096; Apr. 2017.
Kumar et al.; Biomarkers in orthodontic tooth movement; Journal of Pharmacy Bioallied Sciences; 7(Suppl 2); pp. S325-S330; 12 pages; (Author Manuscript); Aug. 2015.
Parrilla et al.; A textile-based stretchable multi-ion potentiometric sensor; Advanced Healthcare Materials; 5(9); pp. 996-1001; May 2016.
Windmiller et al.; Wearable electrochemical sensors and biosensors: a review; Electroanalysis; 25(1); pp. 29-46; Jan. 2013.
Zhou et al.; Bio-logic analysis of injury biomarker patterns in human serum samples; Talanta; 83(3); pp. 955-959; Jan. 15, 2011.
Zhou et al.; Biofuel cells for self-powered electrochemical biosensing and logic biosensing: A review; Electroanalysis; 24(2); pp. 197-209; Feb. 2012.
Kopelman et al.; U.S. Appl. No. 16/152,281 entitled "Intraoral appliances for sampling soft-tissue," filed Oct. 4, 2018.
Morton et al.; U.S. Appl. No. 16/177,067 entitled "Dental appliance having selective occlusal loading and controlled intercuspation," filed Oct. 31, 2018.
Akopov et al.; U.S. Appl. No. 16/178,491 entitled "Automatic treatment planning," filed Nov. 1, 2018.
Elbaz et al.; U.S. Appl. No. 16/198,488 entitled "Intraoral scanner with dental diagnostics capabilities," filed Nov. 21, 2018.
Elbaz et al.; U.S. Appl. No. 16/188,262 entitled "Intraoral scanner with dental diagnostics capabilities," filed Nov. 12, 2018.
Farooq et al.; Relationship between tooth dimensions and malocclusion; JPMA: The Journal of the Pakistan Medical Association; 64(6); pp. 670-674; Jun. 2014.
Newcombe; DTAM: Dense tracking and mapping in real-time; 8 pages; retrieved from the internet (http://www.doc.ic.ac.uk/?ajd/Publications/newcombe_etal_iccv2011.pdf; on Dec. 2011.
ormco.com; Increasing clinical performance with 3D interactive treatment planning and patient-specific appliances; 8 pages; retrieved from the internet (http://www.konsident.com/wp-content/files_mf/1295385693http_ormco.com_index_cmsfilesystemaction_fileOrmcoPDF_whitepapers.pdf) on Feb. 27, 2019.
Video of DICOM to Surgical Guides; [Copy Not Enclosed], Can be viewed at <URL:https://youtu.be/47KtOmCEFQk; Published Apr. 4, 2016.
Sabina et al., U.S. Appl. No. 16/258,516 entitled "Diagnostic intraoral scanning" filed Jan. 25, 2019.
Sabina et al., U.S. Appl. No. 16/258,523 entitled "Diagnostic intraoral tracking" filed Jan. 25, 2019.
Sabina et al., U.S. Appl. No. 16/258,527 entitled "Diagnostic intraoral methods and apparatuses" filed Jan. 25, 2019.
Li et al.; U.S. Appl. No. 16/171,159 entitled "Alternative bite adjustment structures," filed Oct. 25, 2018.
Culp; U.S. Appl. No. 16/236,220 entitled "Laser cutting," filed Dec. 28, 2018.
Culp; U.S. Appl. No. 16/265,287 entitled "Laser cutting," filed Feb. 1, 2019.
beautyworlds.com; Virtual plastic surgery—beautysurge.com announces launch of cosmetic surgery digital imaging services; 5 pages; retrieved from the internet (http://www.beautyworlds.com/cosmossurgdigitalimagning.htm); Mar. 2004.
Berland; The use of smile libraries for cosmetic dentistry; Dental Tribunne: Asia pacfic Edition; pp. 16-18; Mar. 29, 2006.
Bookstein; Principal warps: Thin-plate splines and decomposition of deformations; IEEE Transactions on pattern analysis and machine intelligence; 11(6); pp. 567-585; Jun. 1989.
Cadent Inc.; OrthoCAD ABO user guide; 38 pages; Dec. 21, 2005.
Cadent Inc.; Reviewing and modifying an orthoCAD case; 4 pages; Feb. 14, 2005.
Daniels et al.; The development of the index of complexity outcome and need (ICON); British Journal of Orthodontics; 27(2); pp. 149-162; Jun. 2000.
Dentrix; Dentrix G3, new features; 2 pages; retrieved from the internet (http://www.dentrix.com/g3/new_features/index.asp); on Jun. 6, 2008.
Di Giacomo et al.; Clinical application of sterolithographic surgical guides for implant placement: Preliminary results; Journal Periodontolgy; 76(4); pp. 503-507; Apr. 2005.
Gansky; Dental data mining: potential pitfalls and practical issues; Advances in Dental Research; 17(1); pp. 109-114; Dec. 2003.
Geomagic; Dental reconstruction; 1 page; retrieved from the internet (http://geomagic.com/en/solutions/industry/detal_desc.php) on Jun. 6, 2008.
Gottschalk et al.; OBBTree: A hierarchical structure for rapid interference detection; 12 pages; (http://www.cs.unc.edu/?geom/OBB/OBBT.html); relieved from te internet (https://www.cse.iitk.ac.in/users/amit/courses/RMP/presentations/dslamba/presenlation/sig96.pdf) on Apr. 25, 2019.
gpsdentaire.com; Get a realistic smile simulation in 4 steps with GPS; a smile management software; 10 pages; retrieved from the internet (http://www.gpsdentaire.com/en/preview/) on Jun. 6, 2008.
Karaman et al.; A practical method of fabricating a lingual retainer; Am. Journal of Orthodontic and Dentofacial Orthopedics; 124(3); pp. 327-330; Sep. 2003.
Mantzikos et al.; Case report: Forced eruption and implant site development; The Angle Orthodontist; 68(2); pp. 179-186; Apr. 1998.
Methot; Get the picture with a gps for smile design in 3 steps; Spectrum; 5(4); pp. 100-105; (year of pub. sufficiently earlier than effective US filing date and any foreign priority date) 2006.
OrthoCAD downloads; retrieved Jun. 27, 2012 from the internet (www.orthocad.com/download/downloads.asp); 2 pages; Feb. 14, 2005.
Page et al.; Validity and accuracy of a risk calculator in predicting periodontal disease; Journal of the American Dental Association; 133(5); pp. 569-576; May 2002.
Patterson Dental; Cosmetic imaging; 2 pages retrieved from the internet (http://patterson.eaglesoft.net/cnt_di_cosimg.html) on Jun. 6, 2008.
Rose et al.; The role of orthodontics in implant dentistry; British Dental Journal; 201(12); pp. 753-764; Dec. 23, 2006.
Rubin et al.; Stress analysis of the human tooth using a three-dimensional finite element model; Journal of Dental Research; 62(2); pp. 82-86; Feb. 1983.
Sarment et al.; Accuracy of implant placement with a sterolithographic surgical guide journal of Oral and Maxillofacial Implants; 118(4); pp. 571-577; Jul. 2003.
Smalley; Implants for tooth movement: Determining implant location and orientation: Journal of Esthetic and Restorative Dentistry; 7(2); pp. 62-72; Mar. 1995.
Smart Technology; Smile library II; 1 page; retrieved from the internet (http://smart-technology.net/) on Jun. 6, 2008.
Smile-Vision_The smile-vision cosmetic imaging system; 2 pages; retrieved from the internet (http://www.smile-vision.net/cos_imaging.php) on Jun. 6, 2008.

(56) References Cited

OTHER PUBLICATIONS

Szeliski; Introduction to computer vision: Structure from motion; 64 pages; retrieved from the internet (http://robots.stanford.edu/cs223b05/notes/CS%20223-B%20L10%structurefrommotion1b.ppt, on Feb. 3, 2005.

Vevin et al.; Pose estimation of teeth through crown-shape matching; In Medical Imaging: Image Processing of International Society of Optics and Photonics; vol. 4684; pp. 955-965; May 9, 2002.

Virtual Orthodontics; Our innovative software; 2 pages; (http://www.virtualorthodontics.com/innovativesoftware.html); retrieved from the internet (https://web.archive.org/web/20070518085145/http://www.virtualorthodontics.com/innovativesoftware.html); (year of pub. sufficiently earlier than effective US filing date and any foreign priority date) 2005.

Wiedmann; According to the laws of harmony to find the right tooth shape with assistance of the computer; Digital Dental News; 2nd Vol.; pp. 0005-0008; (English Version Included); Apr. 2008.

Wong et al.; Computer-aided design/computer-aided manufacturing surgical guidance for placement of dental implants: Case report; Implant Dentistry; 16(2); pp. 123-130; Sep. 2007.

Wong et al.; The uses of orthodontic study models in diagnosis and treatment planning; Hong Knog Dental Journal; 3(2); pp. 107-115; Dec. 2006.

Yaltara Software; Visual planner; 1 page; retrieved from the internet (http://yaltara.com/vp/) on Jun. 6, 2008.

Zhang et al.; Visual speech features extraction for improved speech recognition; 2002 IEEE International conference on Acoustics, Speech and Signal Processing; vol. 2; 4 pages; May 13-17, 2002.

Arnone et al.; U.S. Appl. No. 16/235,449 entitled "Method and system for providing indexing and cataloguing of orthodontic related treatment profiles and options," filed Dec. 28, 2018.

Mason et al.; U.S. Appl. No. 16/374,648 entitled "Dental condition evaluation and treatment," filed Apr. 3, 2019.

Brandt et al.; U.S. Appl. No. 16/235,490 entitled "Dental wire attachment," filed Dec. 28, 2018.

Kou; U.S. Appl. No. 16/270,891 entitled "Personal data file," filed Feb. 8, 2019.

Liuping L., "Monte Carlo Simulation of An Optical Coherence Tomography in High Scattering Tissue", Thesis, 2016, 78 pages.

\* cited by examiner

TOOTH SHADING, TRANSPARENCY AND GLAZING

CROSS REFERENCE TO RELATED APPLICATIONS

This patent application claims priority to U.S. Provisional Patent Application No. 62/537,941, filed on Jul. 27, 2017, titled "TOOTH SHADING, TRANSPARENCY AND GLAING," and to U.S. Provisional Patent Application No. 62/662,961, filed on Apr. 26, 2018, titled "TOOTH SHADING, TRANSPARENCY AND GLAZING." each of which is herein incorporated by reference in its entirety.

This patent application also references U.S. patent application Ser. No. 15/662,234, titled "INTRAORAL SCANNER WITH DENTAL DIAGNOSTICS CAPABILITIES," filed on Jul. 27, 2017, which is herein incorporated by reference in its entirety.

INCORPORATION BY REFERENCE

All publications and patent applications mentioned in this specification are herein incorporated by reference in their entirety to the same extent as if each individual publication or patent application was specifically and individually indicated to be incorporated by reference.

FIELD

The methods and apparatuses described herein may relate to dental implants (e.g., restorations such as artificial teeth, caps, dentures, veneers, bridges, etc.) having more life-like coloring, shading and transparency. Specifically, described herein are methods of making dental implant using an optical scanner that generates a model of the patient's teeth including a three-dimensional surface representation and a 3D volumetric model (showing internal features, including contours, density, transparency, etc.), and color of the patient's teeth.

BACKGROUND

Reconstructing the accurate visual appearance of teeth for implants, teeth reconstruction and veneers is a challenge for the teeth restoration industry. Matching one or more implants (e.g., artificial restorations such as dentures, veneers, etc.) to a patient's natural dentition can be a difficult, and may require communication between the dentist or dental technician and possibly a separate laboratory. It is difficult to duplicate natural appearance in ceramics particularly when relying on a clinician to describe or fully illustrate what he or she sees in a shade-matching process. Typically, the first part of the process may be to define the colors, shades and transparency for the original teeth. However, attempting to define color for opaque surfaces is particularly complex, due to the transparency of the teeth and the inner structures of the teeth that contains materials having different optical properties, for example enamel and dentin.

Traditionally, tooth shading is typically performed by external acquiring the tooth surface appearance, using RGB or spectral sensors. Typically, such measurements may give 1-3 color regions per tooth, and define up to approximately 20 shades. Additionally, tooth color restoration may be performed using SLR cameras to take images that may be compared manually to a reference shade palette, and the fine coloring of the tooth implant is typically done manually to resemble the image, without any digital detailed data involved in the process.

In a restorative treatment, the restorative implant (e.g., crown, bridge, etc.) may require information for the tooth/teeth color map, shading, and the transparency, so that the resulting implant may have the appropriate glazing.

Described herein are methods, systems and/or computer-readable media that may address the issues raised above.

SUMMARY OF THE DISCLOSURE

Systems, methods, and/or computer-readable media described herein provide technical solutions to the highly technical problems of machine generation of dental restorations. In particular, these systems, methods and/or computer readable media may provide technical solutions to aid in the creation of dental restorations that more closely resemble a natural tooth (including its internal optical structure). These systems, methods and/or computer readable media may help in virtually rendering a tooth, including its internal optical structure, and apply these renderings (e.g., digital models) to the fabrication of the dental restoration.

Any of the methods and apparatuses (systems, devices, etc., including software, hardware and/or firmware) described herein may be used to make a dental restoration for a patient, so that the dental restoration has optical properties that match optical properties of the patient's teeth. For example, the methods and apparatuses described herein may be used to create a visible light volumetric model that includes optical properties based on the patient's existing teeth in a three-dimensional context, and this visible light volumetric model may be used to generate a dental restoration using the optical properties of the visible light volumetric model. The optical properties are described for surface and internal volume of one or more teeth, which may be the teeth adjacent or similar to the tooth to be restored by the dental restoration. In some variations, a volumetric model of all or a portion of the dental restoration may be generated and the optical properties of the dental restoration volumetric model may be derived from the visible light volumetric model.

In general, a dental restoration may include a restorative implant, such as a crown, veneer, bridges, and the like. Any of these restorative implants may include a glaze (e.g., a veneer, including a ceramic veneer) as part of the restoration, to simulate the dental enamel.

Any of the methods, systems, and/or computer readable media described herein may include or include the use of a three-dimensional (3D) oral scanner, which may also be referred to as an intraoral scanner. These method an apparatuses may be used with any appropriate intraoral scanner, but particularly those that scan in both near-IR and visible light, either separately (including sequentially) or concurrently/simultaneously. An example of an intraoral scanner that may be used is described, for example, in U.S. patent application Ser. No. 15/662,234, titled "INTRAORAL SCANNER WITH DENTAL DIAGNOSTICS CAPABILITIES", filed on Jul. 27, 2017.

A volumetric model typically refers to a digital representation of a three-dimensional space, e.g., a volume. In particular, described herein are volumetric models of all or a portion of a tooth. The volumetric model may generally be a solid model or a shell/boundary model. A volumetric model may be digital map representing a three-dimensional region; for example, the volumetric model may comprise voxels.

The method, systems and/or computer readable media described herein typically generate 3D volumetric models that include one or more optical properties of teeth as a part of the 3D volumetric model. Any optical property may be used, including: light absorption, light reflection, light transmission, and light scattering. Other optical properties may include hue, transparency, translucency, opalescence, chroma, value, luster and florescence. These optical properties may overlap and/or may be alternative expressions of each other and/or may be derived from other optical properties. For example, translucency may be expressed as a property of light scattering and light reflection.

In general, reflection, transmission and absorption may depend on the wavelength of the affected radiation. Thus, these three processes can either be quantified for monochromatic radiation or for polychromatic radiation (and the spectral distribution of the incident radiation may be specified). In addition, reflectance, transmittance and absorptance might also depend on polarization and geometric distribution of the incident radiation, which may also be specified.

Light reflection (e.g., reflectance) may be the ratio of reflected radiant power to incident radiant power. For a certain area elements of the reflecting surface, the (differential) incident radiant power may be the surface's irradiance, multiplied with the size of the surface element. Total reflectance may be further subdivided in regular reflectance and diffuse reflectance, which may be given by the ratios of regularly (or specularly) reflected radiant power and diffusely reflected radiant power to incident radiant power.

Light absorption may refer to the transformation of radiant power applied to a material to another type of energy, usually heat, by interaction with the material. Absorption may be wavelength-specific. The absorptance of a medium may be defined by the ratio of absorbed radiant power to incident radiant power.

The light transmission (or transmittance) of a medium may be defined as the ratio of transmitted radiant power to incident radiant power. Total transmittance may be further subdivided in regular transmittance and diffuse transmittance, which may be given by the ratios of regularly (or directly) transmitted radiant power and diffusely transmitted radiant power to incident radiant power.

Reflection is the process by which electromagnetic radiation is returned either at the boundary between two media (surface reflection) or at the interior of a medium (volume reflection), whereas transmission is the passage of electromagnetic radiation through a medium. Both processes can be accompanied by diffusion (also called scattering), which is the process of deflecting a unidirectional beam into many directions. When no diffusion occurs, reflection or transmission of a unidirectional beam results in a unidirectional beam according to the laws of geometrical optics. Reflection, transmission and scattering leave the frequency of the radiation unchanged, although the Doppler effect may cause a change in frequency when the reflecting material or surface is in motion. Reflectance, transmittance and absorptance are dimensionless. Quantities such as reflectance and transmittance are used to describe the optical properties of materials. The quantities can apply to either complex radiation or to monochromatic radiation.

For example, described herein are methods of making a dental restoration for a patient, so that the dental restoration has optical properties that match optical properties of the patient's teeth. The method may include: receiving a visible light volumetric model of at least the portion of the patient's tooth, wherein the volumetric model includes a representation of an outer surface of the patient's tooth and a region of enamel extending from the outer surface of the patient's tooth to the dentine; further wherein the visible light volumetric model includes an indicator of two or more of: light absorbance, light reflection and light scattering of one or more wavelengths of light for the outer surface of the patient's tooth, the surface of the dentine and the region of enamel; and making a dental restoration from the visible light volumetric model, wherein surface and internal structure of the dental restoration have optical properties based on the visible light volumetric model.

Making the dental restoration may comprise generating a volumetric model of the dental restoration comprising a plurality of voxels, wherein the voxels of the volumetric model of the restoration have values based on the values of voxels of the visible light volumetric model. The shape of the dental restoration may be predefined or selected, and the optical properties may be provided by the visible light volumetric model of one or more of the patient's teeth.

In general, the dental restoration may be manufactured so that its internal structure and surface have the same optical characteristics as the patient's actual teeth, based on the unrestored tooth and/or on one or more neighboring teeth, so that the dental restoration will appear similar to the patient's natural teeth. When manufacturing the actual dental restoration, the dental restoration may be formed manually (e.g., by a technician) guided by the techniques described herein, or semi-manually, or automatically (including by 3D printing techniques). In general, manufacturing the dental restoration may give each voxel of the restoration a similar optical values compared to the reference tooth voxels (e.g., from the visible light volumetric model), for a corresponding position and/or depth within the volume of the tooth.

The dental restoration may be made from the visible light volumetric model either manually (e.g., by selecting materials having the optical properties corresponding to those from the surface and internal structures within a portion of the visible light volumetric model), or automatically, including forming a digital model of the dental restoration with optical properties derived from the visible light volumetric model.

In general, the step of receiving the visible light volumetric model may include receiving the visible light volumetric model from a memory, from a transmission and/or from within the same system, such as by generating the visible light volumetric model. The received visible light volumetric model may be a visible light volumetric model of at least a portion of the patient's tooth for a tooth that is adjacent to the patient's tooth to be restored by the dental restoration. Alternatively, the received visible light model may be the visible light volumetric model for the tooth that is to be restored by the dental restoration and/or for a tooth corresponding to that tooth on the bilateral side of the jaw from the tooth to be restored.

For example, receiving the visible light volumetric model may include generating the visible light volumetric model. Thus receiving the visible light volumetric model may include: generating or receiving a volumetric model of at least the portion of the patient's tooth from a three-dimensional (3D) oral scanner operating in both a near-IR wavelength and a visible light wavelength, wherein the volumetric model includes the representation of the outer surface of the patient's tooth and the region of enamel extending from the outer surface of the patient's tooth to the patient's dentine; estimating values for one or more of: light absorption, light reflection, light transmission, and light scattering of one or more visible light wavelengths for a plurality of voxels defining the outer surface of the patient's tooth and the region of enamel extending from the outer surface of the patient's tooth to the patient's dentine; and adding the estimated values to the volumetric model to form the visible light volumetric model.

Estimating values may comprise estimating values for two or more of: light absorption, light reflection, light transmission, and light scattering for each of the plurality of voxels defining the outer surface of the patient's tooth and the region of enamel extending from the outer surface of the patient's tooth to the patient's dentine. Estimating values may comprise estimating values for one or more of: light absorption, light reflection, light transmission, and light scattering at three or more visible light wavelengths for each of the plurality of voxels defining the outer surface of the patient's tooth and the region of enamel extending from the outer surface of the patient's tooth to the patient's dentine. The three or more visible light wavelengths include one or more red, green and blue wavelength.

In some variations, estimating comprises estimating the value for one or more of: light absorption, light reflection, light transmission, and light scattering of one or more visible light wavelengths for each of the plurality of voxels defining the outer surface of the patient's tooth and the region of enamel extending from the outer surface of the patient's tooth to the patient's dentine by setting the value to a predetermined prior value.

Any of these methods may also include setting the values for one or more of: light absorption, light reflection, light transmission, and light scattering of one or more visible light wavelengths for each of the plurality of voxels defining the outer surface of the patient's tooth and the region of enamel extending from the outer surface of the patient's tooth to the patient's dentine to a predetermined prior value determined by parametric estimation.

Estimating may comprise estimating the value for one or more of: light absorption, light reflection, light transmission, and light scattering of one or more visible light wavelengths for each of the plurality of voxels defining the outer surface of the patient's tooth and the region of enamel extending from the outer surface of the patient's tooth to the patient's dentine by iterating to determine the value that approximates optical properties based on the position of the camera and the reconstructed volume compared to RGB data recorded when scanning the patient's teeth with an intraoral scanner to generate the volumetric model. In some variations, estimating comprises estimating the value for one or more of: light absorption, light reflection, light transmission, and light scattering of one or more visible light wavelengths for each of the plurality of voxels defining the outer surface of the patient's tooth and the region of enamel extending from the outer surface of the patient's tooth to the patient's dentine by setting the value to a predetermined prior value determined from a population of representative patients, wherein the prior value is selected using one or more of: measured RGB data recorded when scanning the patient's teeth with an intraoral scanner to generate the volumetric model, volume information, and patient information. The volume information may comprise path length from the surface of the tooth to the dentin through the enamel. The patient information may comprise one or more of: patient age, gender, estimated jaw shape.

In any of these variations, the method may further include dividing the volumetric model into a plurality of sub-regions before estimating the value for one or more of: light absorption, light reflection, light transmission, and light scattering of one or more visible light wavelengths for the outer surface of the patient's tooth and the region of enamel extending from the outer surface of the patient's tooth to the patient's dentine.

Described herein are systems, methods and computer readable media that may virtually render a tooth including visible optical structures that may be used to generate a dental restoration. For example, these systems may include non-transitory computer readable media storing instructions for execution by a processor for preparing a dental restoration having optical properties matching optical properties of a patient's tooth. Any of these systems, methods and computer readable media may: generate or receive a volumetric model of at least a portion of a patient's tooth from a three-dimensional (3D) oral scanner operating in both a near-IR wavelength and a visible light wavelength, wherein the volumetric model includes a representation of an outer surface of the patient's tooth and a region of enamel extending from the outer surface of the patient's tooth to the patient's dentine; estimate values for one or more (e.g., two or more, three or more, etc.) optical properties such as: light absorption, light reflection, light transmission, and light scattering of one or more visible light wavelengths for a plurality of voxels defining the outer surface of the patient's tooth and the region of enamel extending from the outer surface of the patient's tooth to the patient's dentine; add the estimated values to the volumetric model to form a visible light volumetric model; and make a dental restoration from the visible light volumetric model.

The volumetric model of at least the portion of the patient's tooth may be received, e.g., by a processor, and the volumetric model may comprise a plurality of voxels defining the outer surface of the patient's tooth and the region of enamel extending from the outer surface of the patient's tooth to the patient's dentine. The volumetric model may be received by a separate apparatus, such as a dental scanner, including a dental scanner (e.g., intraoral scanner) that is capable of forming a 3D volumetric model, as described more fully in U.S. patent application Ser. No. 15/662,234, titled "INTRAORAL SCANNER WITH DENTAL DIAGNOSTICS CAPABILITIES," filed on Jul. 27, 2017, herein incorporated by reference in its entirety. In some variations the processor is part of, or coupled to, the scanner. Alternatively or additional, the volumetric model may be stored in a memory that is accessed by the processor.

For example, a (3D) oral scanner may concurrently or simultaneously scan a patient's tooth or teeth in both a near-IR wavelength and a visible light wavelength. The scan may generate the volumetric model so that the initial volumetric model includes a representation of an outer surface of the patient's tooth and a region of enamel extending from the outer surface of the patient's tooth to the patient's dentine. The depth of penetration may depend upon the scan. Near-IR light may penetrate into the enamel to at least the dentine, so that the volumetric model may be reconstructed from the near-IR scanning to provide highly accurate three-dimensional models of the scanned region, including the thickness, shape and distribution of the enamel and/or dentine. The visible light scan may be coordinated with the penetrative near-IR scan, and may include one or more (e.g., RGB) wavelengths.

The values for one or more of: light absorption, light reflection, light transmission, and light scattering may be estimated from the volumetric model. In some variations, it may be beneficial to estimate the values for two or more of light absorption, light reflection, light transmission, and light scattering (e.g., estimated values for: light absorption and light reflection; light absorption and light transmission; light absorption and light scattering; light reflection and light transmission; light reflection and light scattering; and/or light transmission and light scattering). In some variations, three or more of light absorption, light reflection, light transmission, and light scattering may be estimated (e.g., light absorption, light reflection and light transmission; light absorption, light reflection, and light scattering and light scattering; light absorption, light transmission, and light scattering; and/or light reflection, light transmission, and light scattering). In some variations all four of light absorption, light reflection, light transmission, and light scattering may be estimated.

Estimations of light absorption, light reflection, light transmission, and light scattering may be made based on the dentin positions within the tooth, which may be extracted from the volumetric model. Some or all of the optical properties of light absorption, light reflection, light transmission, and light scattering may be estimated for multiple visible light wavelengths for voxels defining at least a portion of the volumetric model, such as the voxels defining the outer surface of the patient's tooth and the region of enamel extending from the outer surface of the patient's tooth to the patient's dentine. For example, visible light wavelengths for a one or more of red, green and blue wavelengths, and in some variations each of red, green, and blue, may be provided.

Estimations for one or more of: light absorption, light reflection, light transmission, and light scattering for voxels (and/or regions of voxels) defining the outer surface of the patient's tooth and the region of enamel extending from the outer surface of the patient's tooth to the patient's dentine may be provided by setting values. For example, estimating the values may include setting the values for the outer surface of the teeth and the volume of the enamel between the teeth and the dentin to predetermined values (e.g., prior values) that may be selected based on the visible light wavelength(s) provided in the original volumetric data. In some variations, the processor may refer to a database or memory that includes values for the one or more optical properties (e.g., light absorption, light reflection, light transmission, and light scattering). The values of the optical properties may be determined from average values, population values, or the like. When setting the voxel values for the one or more optical properties, values may be assigned based on a correlation to similar surface values. For example, the outer surface may be assigned or set values by assuming basic vales (e.g., prior characteristics) for the outer surface and/or enamel and/or dentine surface. The 3D volumetric model may include a model of the outer surface of the teeth or tooth, and the one or more optical parameter values may be set for corresponding voxels based on how well the assumed parameters (modeled parameters) fit to the measured values that may be included in the volumetric model.

For example, an estimate of the one or more optical properties may be made based on assumed parameters that are set, and these assumed parameters may be tested against the estimates parametric estimation or a similar method may be used to estimate parameters from the volumetric model in order to generate estimated images that may be compared to actual images taken by the scan to determine the 3D volumetric model or derived from the 3D volumetric model. For example, assuming parameters of the enamel, these assumed parameters may be used to generate an expected image of the teeth that may be compared to actual data from the patient that is included in the original volumetric model; by comparing how well the actual, measured data fits to the expected values model, the assumed values for the one or more optical properties may be changed to improve the fit between the measured data and the estimated image(s) using a technique such as parametric estimation, for example.

Thus, one or more optical properties (e.g., light absorption, light reflection, light transmission, and light scattering) of one or more visible light wavelengths for each of the plurality of voxels defining the outer surface of the patient's tooth and the region of enamel extending from the outer surface of the patient's tooth to the patient's dentine may be estimated by setting the value to a predetermined prior value. The resulting estimation may be refined by comparing images of the modeled teeth generated using these values to images from the volumetric model. Thus, the values for one or more of: light absorption, light reflection, light transmission, and light scattering of one or more visible light wavelengths for each of the plurality of voxels defining the outer surface of the patient's tooth and the region of enamel extending from the outer surface of the patient's tooth to the patient's dentine may be set to a predetermined prior value determined by parametric estimation. For example, the values that approximate optical properties may be determined by iterating based on the position of the camera and the reconstructed volume compared to RGB data recorded when scanning the patient's teeth with an intraoral scanner to generate the volumetric model.

In some variations, values for the one or more optical properties may be set within a visible light volumetric model by setting the value to a predetermined prior value determined from a population of representative patients, wherein the prior value is selected using one or more of: measured RGB data recorded when scanning the patient's teeth with an intraoral scanner to generate the volumetric model, volume information, and patient information. Alternatively or additionally, setting the value to a predetermined prior value may be determined from a population of representative patients, wherein the prior value is selected using one or more of: measured RGB data recorded when scanning the patient's teeth with an intraoral scanner to generate the volumetric model, volume information, and patient information. For example, the volume information may comprise path length from the surface of the tooth to the dentin through the enamel. The patient information may comprise one or more of: patient age, gender, estimated jaw shape.

Thus, estimating values for the one or more optical properties as descried herein may include setting the voxel (or regions of voxels) in the regions between the surface of the tooth and the dentine to one or more prior values. For example, the prior values may be based on an average light absorbance and light scattering per wavelength (color); the images (e.g., visible light images) taken when scanning to form the initial volumetric 3D model may be used to estimate the optical properties for the surface and enamel. Specifically, the surface and enamel optical property values may be estimated from the prior values using an iterative method that solves for optical properties (e.g., absorption, reflection, and transmission) based on the position of the camera and the reconstructed volume compared to the actual RGB images taken with the scanner.

In any of the methods, systems and/or computer-readable media described herein, the volumetric model may be divided into a plurality of sub-regions before estimating the value for the one or more optical properties (e.g., light absorption, light reflection, light transmission, and light scattering) of one or more visible light wavelengths. These sub-regions may include any number of voxels (e.g., one or more) and may be grouped based on the shape or morphology of the tooth. For example, regions of the enamel (e.g., isothermal regions and/or region a fixed range or distance from the surface) may for sub-regions.

The method, systems and/or computer-readable media described herein may form a model, e.g., a visible light volumetric model, that includes the values for the one or more of optical properties (e.g., light absorption, light reflection, light transmission, and light scattering) of one or more visible light wavelengths for the outer surface of the patient's tooth and the region of enamel extending from the outer surface of the patient's tooth to the patient's dentine. The visible light volumetric model may also include the original volumetric model. A dental restoration may be formed from the visible light volumetric model.

For example, described herein are non-transitory computer readable medium storing instructions for execution by a processor that, when executed, cause the processor to: generate or receive a volumetric model of at least a portion of a patient's tooth, wherein the volumetric model includes a representation of an outer surface of the patient's tooth and a region of enamel extending from the outer surface of the patient's tooth to the patient's dentine; estimate values for one or more of: light absorption, light reflection, light transmission, and light scattering of one or more visible light wavelengths for the outer surface of the patient's tooth and the region of enamel extending from the outer surface of the patient's tooth to the patient's dentine; and add the estimated values to the volumetric model to form a visible light volumetric model.

In some variations, estimating the values for one or more of the optical properties may include setting the outer surface and the region of enamel between the outer surface and the dentine to predetermined (prior) values and use the measured RGB image date for the corresponding volume region to solve for optical properties of the surface, using the volume information, e.g., path length from the surface of the tooth to the surface of the dentin through the enamel. The predetermined/prior values may be selected based on patient information (e.g., age of patient, estimated from jaw shape, etc.), a set list of predetermined/prior values based on available restoration materials, etc.

BRIEF DESCRIPTION OF THE DRAWINGS

The novel features of the invention are set forth with particularity in the claims that follow. A better understanding of the features and advantages of the present invention will be obtained by reference to the following detailed description that sets forth illustrative embodiments, in which the principles of the invention are utilized, and the accompanying drawings.

DETAILED DESCRIPTION

Figure 1:
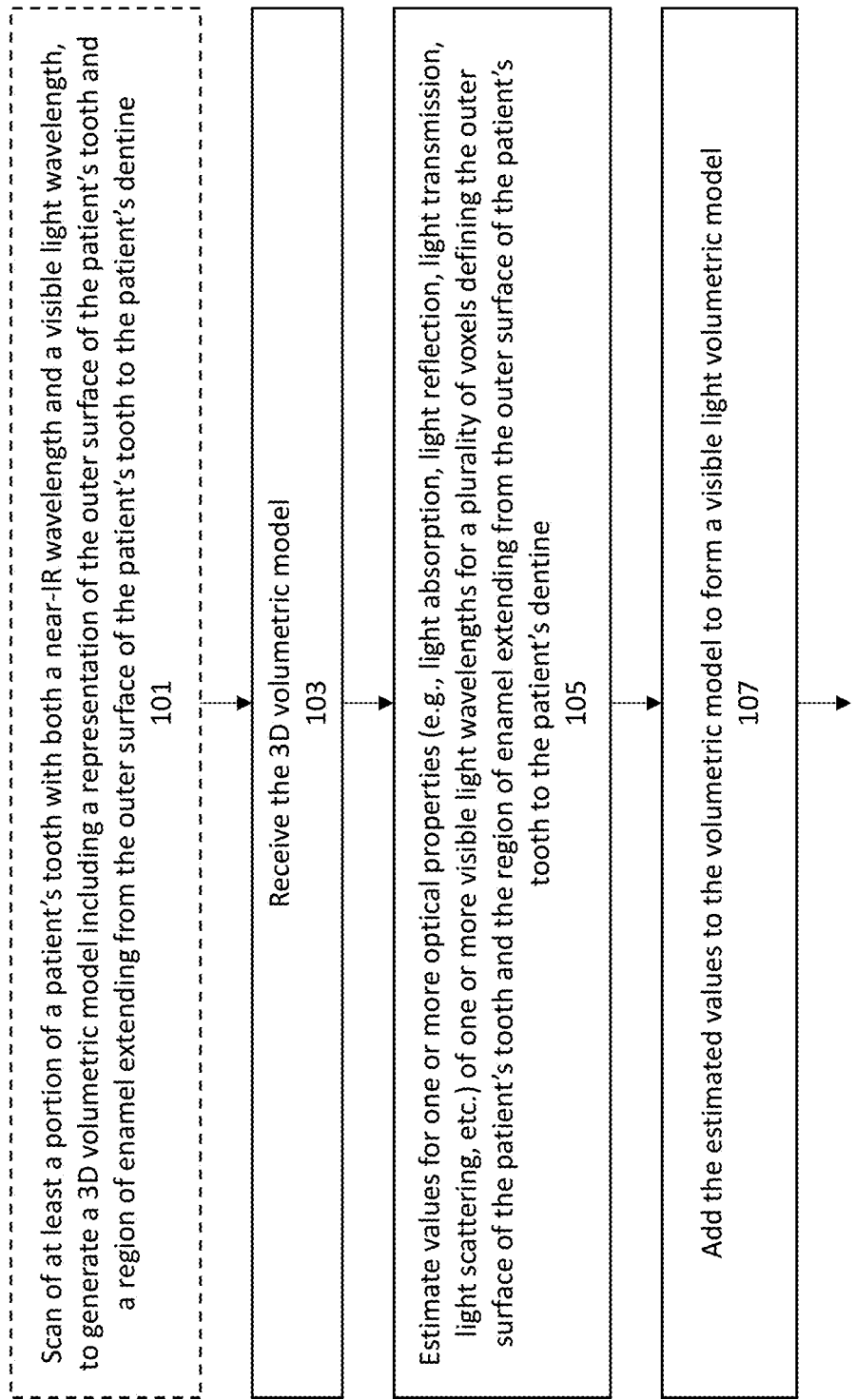
FIG. 1 is an example of one method of the creation of a visible light volumetric model that may be used to fabricate a dental restoration.

Described herein are apparatuses (system and devices), automated methods and/or computer-readable media for aiding in the creation of dental restorations, such as dental implants, that closely resemble a patient's natural teeth, including in particular its internal optical structure. In general, the systems, methods and/or computer-readable media may virtually render a model of a patient's tooth or teeth, including the internal optical structure. The patient's tooth may be the tooth to be repaired by the dental restoration, an adjacent tooth, a corresponding bilateral tooth, or any other of the patient's natural teeth. This model, which may be referred to as a visible light volumetric model, may then be used manually or automatically to create a highly accurate dental restoration, such as an artificial tooth, cap, denture, veneer, bridge, etc., having the same or similar optical properties compared to the patient's natural teeth.

Most dental restorative implants apply only surface properties. Such estimates fail to accurately approximate the visual properties of a tooth, which may vary based on the lighting of the tooth, resulting in poor matching between a restorative implant and the patient's natural teeth, particularly in differently lit environments. Teeth have specific optical properties including color and transparency, which may be a function of both external and internal features. When creating dental restorations, it is highly desirable to make the tooth restoration so that it has a realistic, and preferably customized, color and transparency that matches or is consistent with the patient's existing teeth. A visible light volumetric model may provide a model of a tooth or teeth that can guide the formation of the dental restoration.

As described herein, a visible light volumetric model may include both a structural mapping of a volume of a patient's tooth or teeth that may form all or part of a dental restoration and may also include a one or more optical properties associate with regions within the volume of the structural mapping. Although a variety of optical properties may be associated, it may be particularly helpful to include one or more of: light absorption, light reflection, light transmission, and light scattering. Additional or alternative optical properties that may be used include: hue, transparency, translucency, opalescence, chroma, value, luster and florescence. These optical properties maybe specific to one or more light wavelengths (e.g., visible light wavelengths, such as red, green and/or blue wavelengths or groups of wavelengths).

When producing (either automatically or manually) a dental restoration using the visible light volumetric model, the structural and/or optical properties within the model may be used. The visible light volumetric model is a volumetric model that provides information on both external and internal structures; the addition of the optical properties may then provide a guide or map for forming a restoration. The optical properties may be used to select the materials used to form the dental restoration. In some variations the optical properties may be used to select the material(s) forming the dental restoration. For example, the optical properties may be matched to optical properties for materials used to form the dental restoration (e.g., plastics, ceramics, dyes/colorants, etc.). In some variations the systems, methods and/or computer-readable media may automatically convert the optical properties provided in a visible light volumetric model into one or more materials that may be used. Alternatively or additionally, the values of the optical properties within the visible light volumetric model may be converted or adjusted into values that may be used to select the material(s) used to form the dental restoration, or may simply be replaced with an indicator (e.g., name, number, etc.) for the material(s) having the same or similar optical properties.

The visible light volumetric model may be a collection of voxels describing the volume of the patient's tooth or teeth. In some variations, this volume is determined directly from the patient's existing teeth by scanning, e.g., using an intraoral scanner, as described below in Example 1. In other variations, the volume is a reconstructed volume that is based on another region of the patient's teeth or tooth. For example, when making a dental restoration of a patient's tooth, it may not be possible to scan the missing tooth. However, a 3D volumetric scan of other patient teeth, such as the symmetric tooth and/or an adjacent tooth, may be used as a template for the visible light volumetric model of a dental restoration. Alternatively the visible light volumetric model may be a model of the patient's existing teeth and the fabricator (manual or automatic) may use the visible light volumetric model as a guide for forming a missing tooth, and matching the internal structural (e.g., enamel and/or dentin) and optical properties.

The systems, methods and/or computer-readable media described herein may provide more accurate information that may be used to form a restorative implant. The visible light volumetric models described herein may also find use that is not limited to the formation of dental restorations. For example, the visible light volumetric model may be used to track patient dental health, plan or track dental treatments, provide guidance to a dental practitioner in treating the patient (e.g., in making fillings, oral surgery, etc.) and/or for cosmetic procedures such as tooth whitening.

FIG. 1 is a general overview of an exemplary method (which may be performed by a system as described herein) for the creation of a visible light volumetric model that may be used to fabricate a dental restoration. Optionally, a scan of at least a portion of a patient's tooth with both a near-IR wavelength and a visible light wavelength may be used to generate a 3D volumetric model including a representation of the outer surface of the patient's tooth, and a region of enamel extending from the outer surface of the patient's tooth to the patient's dentine 101. The scan information, including the images taken while scanning for either or both the visible light wavelength(s) and the near-IR wavelength(s) may be included with or as part of the 3D volumetric scan. The scan may be performed by an intraoral scanner that is part of the overall system, or separate. The 3D volumetric model may then be received by a processor 103 (e.g., of a dental restoration fabrication system, as described below in reference, and used to estimate value for one or more optical properties (e.g., light absorption, light reflection, light transmission, light scattering, etc.) of one or more visible light wavelengths for a plurality of voxels defining the outer surface of the patient's tooth and the region of enamel extending from the outer surface of the patient's tooth to the patient's dentine 105. The estimated values for the optical properties may then be added to the 3D volumetric model to form the visible light volumetric model. In general, the visible light volumetric model includes a plurality of voxels that describe the 3D volume of a patient's tooth or teeth and at least some of these voxels (e.g., the region between the outer surface and the enamel between the outer surface and the dentine) include information about the optical properties of one or more visible light wavelengths.

Figure 2:
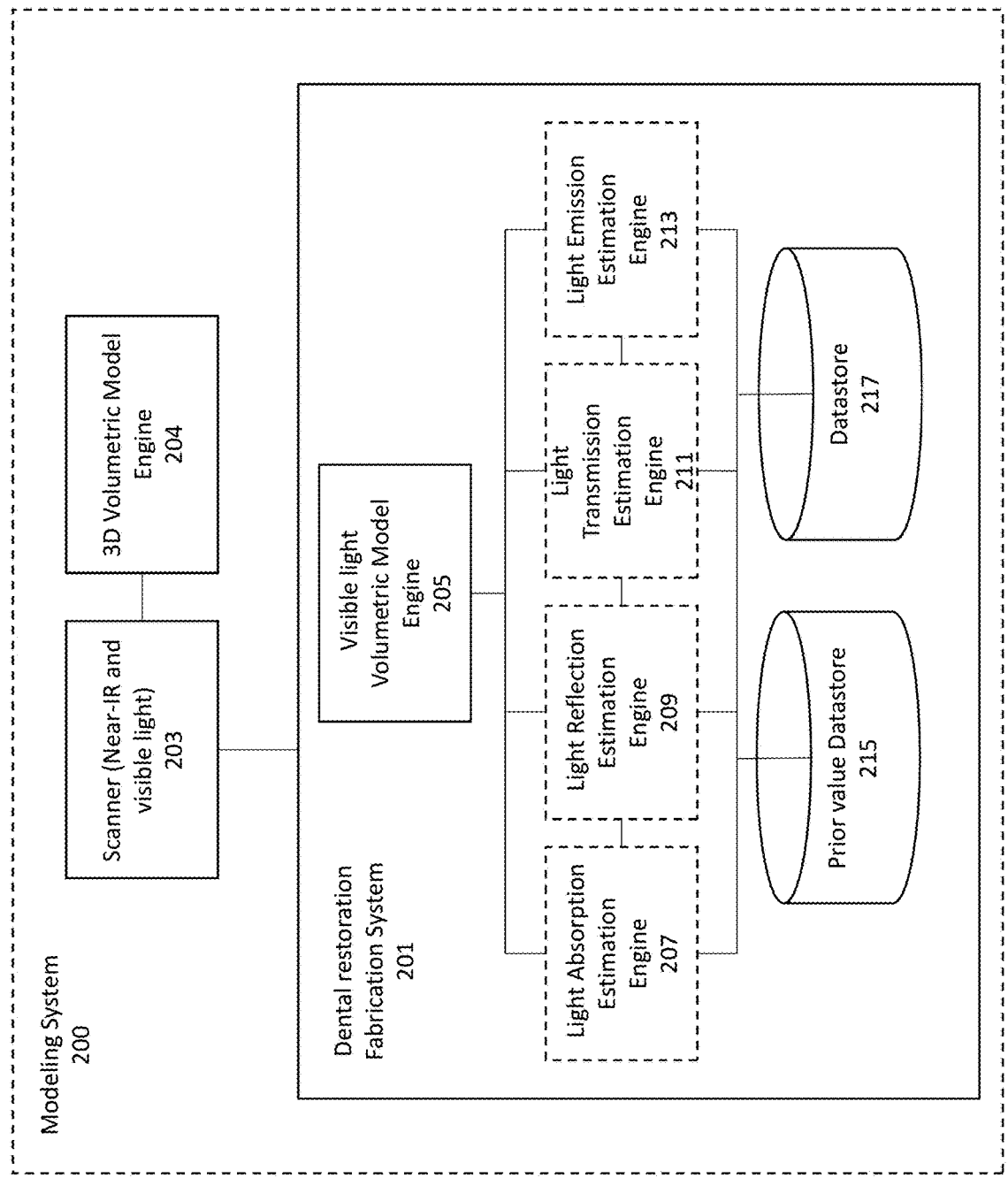
FIG. 2 is an example of a system that may generate a visible light volumetric model which may be used to fabricate a dental restoration. Thus, a portion of this system may be referred to as a dental reconstruction fabrication system.

FIG. 2 is a diagram showing an example of a dental restoration fabrication system 201, which is optionally shown as part of a larger modeling system 200. The modules of the dental restoration fabrication system 201 may include one or more engines and data stores. A computer system can be implemented as an engine, as part of an engine or through multiple engines. As used herein, an engine includes one or more processors or a portion thereof. A portion of one or more processors can include some portion of hardware less than all of the hardware comprising any given one or more processors, such as a subset of registers, the portion of the processor dedicated to one or more threads of a multi-threaded processor, a time slice during which the processor is wholly or partially dedicated to carrying out part of the engine's functionality, or the like. As such, a first engine and a second engine can have one or more dedicated processors or a first engine and a second engine can share one or more processors with one another or other engines. Depending upon implementation-specific or other considerations, an engine can be centralized or its functionality distributed. An engine can include hardware, firmware, or software embodied in a computer-readable medium for execution by the processor.

The processor transforms data into new data using implemented data structures and methods, such as is described with reference to the figures herein.

The engines described herein, or the engines through which the systems and devices described herein can be implemented, can be cloud-based engines. As used herein, a cloud-based engine is an engine that can run applications and/or functionalities using a cloud-based computing system. All or portions of the applications and/or functionalities can be distributed across multiple computing devices, and need not be restricted to only one computing device. In some embodiments, the cloud-based engines can execute functionalities and/or modules that end users access through a web browser or container application without having the functionalities and/or modules installed locally on the end-users' computing devices.

As used herein, data stores are intended to include repositories having any applicable organization of data, including tables, comma-separated values (CSV) files, traditional databases (e.g., SQL), or other applicable known or convenient organizational formats. Data stores can be implemented, for example, as software embodied in a physical computer-readable medium on a specific-purpose machine, in firmware, in hardware, in a combination thereof, or in an applicable known or convenient device or system. Data store-associated components, such as database interfaces, can be considered part of a data store, part of some other system component, or a combination thereof, though the physical location and other characteristics of data store-associated components is not critical for an understanding of the techniques described herein.

Data stores can include data structures. As used herein, a data structure is associated with a particular way of storing and organizing data in a computer so that it can be used efficiently within a given context. Data structures are generally based on the ability of a computer to fetch and store data at any place in its memory, specified by an address, a bit string that can be itself stored in memory and manipulated by the program. Thus, some data structures are based on computing the addresses of data items with arithmetic operations; while other data structures are based on storing addresses of data items within the structure itself. Many data structures use both principles, sometimes combined in non-trivial ways. The implementation of a data structure usually entails writing a set of procedures that create and manipulate instances of that structure. The data stores, described herein, can be cloud-based data stores. A cloud-based data store is a data store that is compatible with cloud-based computing systems and engines.

The dental restoration fabrication system 201 may include a computer-readable medium, a visible light volumetric model engine 205, one or more optical property estimation engines (e.g., light absorption estimation engine 207, light reflection estimation engine 209, light emission estimation engine 213, light transmission estimation engine 211, etc.), and a prior value data store 215. Additional data stores 217 may be included, e.g., referencing patient information and/or materials information. One or more of the modules of the dental restoration fabrication system may be coupled to one another (e.g., through the example couplings shown in FIG. 2) or to modules not explicitly shown in FIG. 2. The computer-readable medium may include any computer-readable medium, including without limitation a bus, a wired network, a wireless network, or some combination thereof.

The optical property estimation engines may implement one or more automated agents configured to learn matching of the optical properties based information from 3D virtual representations of teeth taken from subjects (e.g., other 3D volumetric models).

Estimation of One or More Optical Properties

In a first example, a restorative implant having more realistic optical properties may be made from a visible light volumetric model in which one or more optical properties is estimated for outer surface and the region(s) between the outer surface and the dentin of the volumetric model by using the structural information in the volumetric model, including the dentin position within the tooth or portion of a tooth of the volumetric model. Volumetric data may be used to indicate where in the tooth the dentin is positioned relative to the outer surface, providing, an estimate of the thickness of the enamel. The optical properties (e.g., light absorption, light reflection, light transmission, and light scattering of one or more visible light wavelengths) of the tooth or tooth portion within the volumetric model may be determined for each of a plurality of voxels within the volumetric model by using the morphology of the tooth or tooth region, including the thickness of the enamel and the location of the dentin within the enamel, and using optical information taken or extracted from the visible light wavelength(s) taken by the scan that are include as part of the volumetric model.

For example, in some variations, the optical properties of the outer surface and the region between the outer surface and the dentin (and in some variations, including the dentin), the average light absorbance and light scattering and/or scatter per wavelength (e.g., color), may be estimated from the visible light image(s) in the volumetric model that is passed on to the processor operating to estimate the optical properties (e.g., the visible light volumetric model engine). For example, when the visible light images taken by the intraoral scanner used to generate the volumetric model are RGB images, these images may be used to estimate the optical properties for the surface and enamel. In some variations, the optical properties may be determined by assuming a starting prior value for the different region(s) of the tooth, including the outer surface, enamel and in some cases, the dentine. For example, the different depths of enamel may be provided with different starting prior values of the one or more optical properties, or the enamel may be treated as initially homogeneous and initially set with the same prior value of these one or more optical properties. This intermediate rendering model with these starting optical property values may then be compared against the actual volumetric model, and in particular, the visible light image(s) of the volumetric model (or used to form the volumetric model). The volumetric model may include the camera position (or may assume a camera position) when scanning. This allows the system to generate estimated images from the intermediate rendering model ("estimated images") that may be directly compared with the images taken by the scanner ("real images"). The comparison between the real images and the estimated images may be quantified and the difference between the real images and the estimated images may be minimized by iteratively adjusting the starting optical property values until the estimated images converge to a value within an acceptable range within the real images. The acceptable range may be pre-determined, or it may be determined based on the rate of change of the difference. Any appropriate iterative minimization protocol may be used. Any appropriate iterative minimization protocol may be used. For example, nonlinear minimization techniques may be used.

In this first example, the methods, systems and/or computer-readable media described herein may assume that the prior values are constant. Prior values may be used for the optical properties not just of the outer surface, but also for the enamel thickness between the outer surface and the dentine. The methods, systems and/or computer-readable media described herein benefit from the use of an intraoral scanner that is able to determine both tooth shape (external features, including external enamel) as well as the thickness of the enamel and the position and distribution of dentin within the tooth.

The initial parameters may be adjusted preferentially over certain regions, including within the outer surface and/or the enamel or regions of enamel. In some variations optical properties (e.g., one or more or two or more of light absorption, light reflection, light transmission, and light scattering) may be set based on a guess from the visible light portion of the initial volumetric model. In some variations the system, and particularly a parameter value setting engine portion of the system, may be configured as an agent that is capable of machine learning to set the initial values of the optical property based on the volumetric models from multiple patients.

Once the iterative minimization has sufficiently converged on values for the one or more (e.g., two or more) optical properties for the voxels making up the outer tooth surface and the region between the outer tooth surface and the dentine, these optical properties may be added to all or a portion of the original volumetric model to form the visible light volumetric model.

In use, a dental restoration may be generated using the visible light volumetric model. The visible light volumetric model may provide a more realistic model of the optical appearance of the patient's tooth or teeth. This more realistic visible light volumetric model may then be applied automatically or manually to form the dental implant. The model may be used to replace or reconstruct a tooth. In some examples the original volumetric model may be formed by scanning the tooth to be replaced or reconstructed in order to determine the location (and shape) of the dentin within the tooth relative to the surface (e.g., the thickness of the enamel), so that the method described above may be used to form a more accurate visible light volumetric model of the tooth including the dentin location within the tooth. If the target tooth being remodeled and/or replaced is missing from the patient's oral cavity, one or more teeth adjacent to the target tooth may be scanned, or more preferably, the complimentary tooth on the opposite side of the jaw, may be scanned, if present (e.g., if replacing the upper right canine, the upper left canine may be scanned). The reconstructed tooth is therefore assumed to have similar optical properties to the remaining teeth.

A dental restoration may be formed from the visible light volumetric model including the one or more optical properties within some or all of the voxels describing the outer and inner structure of the teeth. For example, the optical properties of a material representing the dentin and/or enamel may be applied manually or automatically on or in the dental restoration as it is formed, to mimic the more natural-looking optical properties. The tooth may be fabricated manually or more preferably automatically, etc., using a 3D printer or other additive fabrication technique.

In addition to the information about the shape and extend of the dentin and the thickness of the enamel, a model of a target tooth may incorporate a more realistic representation of the optical properties of the patient's dentin and enamel. For example, a target tooth, or region of a target tooth, may be modeled (and/or fabricated) using a volumetric model of the target tooth, or a similar tooth, describing the relative dentin position within the tooth, along with prior information about the optical properties of the dentin and enamel. The prior information of the dentin and enamel may include values for dentin average color (and in some variations scatter and absorption), and values for enamel absorption and scatter. These value may be per wavelength. Prior values may be assumed values, and may be based on averages or populations.

Using the prior values as well as the volumetric information about the tooth, the systems and methods described herein may determine an estimate of the optical properties of the tooth as the tooth may appear for any point and angle (actual image data).

The optical properties of a tooth when observed from a position outside of the tooth may depend in part on the volumetric properties of the tooth. For example, the light scatter and the absorption of light at different illuminating wavelengths may change as the light passes through the different layers (e.g., enamel and dentin), as well as the surface properties of the tooth. Thus, the appearance of the tooth is built on the different layers. A volumetric model of the tooth taken using a penetrating wavelength, e.g., near-IR, may provide a three-dimensional volumetric dataset for the tooth and this model may be used to estimate the effect of these different layers on the optical properties of the tooth. For example, the color, Y, of the tooth from a particular position (e.g., from outside of the tooth at a given point and angle relative to the tooth) may be estimated, for a particular wavelength, as the difference between the enamel contribution and the product of the Dentin contribution and the length to the dentin from the point (e.g., from the outer surface).

As described above, the estimate of optical properties per wavelength may be compared to the actual optical properties seen or measured from outside the tooth. For example, a scanner (e.g., in some variations, the same scanner determining the volumetric model of the teeth) may record RGB information for the tooth from outside of the tooth, and this measured value for a particular point and angle, X, may be compared to the calculated valve, Y. The difference between X and Y per wavelength may provide a value (e.g., a "re-interpreted X value" or error) that may be minimized when forming a model of the tooth. For example, the prior values of the dentin average optical properties (e.g., scatter and absorption), and the prior values for enamel optical properties (e.g., absorption and scatter) may be modified to minimize the re-interpreted X value, over a range of (visible) wavelengths.

In practice, the materials used to form the enamel and dentin in the model may be limited to finite number of materials having optical properties, e.g., average light scattering (light reflection) and light absorption. In order to determine which of the materials to use for modeling the enamel and dentin, the optical properties of the available materials may be used as the prior values used to calculate optical properties, Y, at different wavelengths, and the materials resulting in the best fit to the observed color (e.g., the minimum reinterpreted X value) may be used to model the tooth or tooth portion. Thus, by setting the prior values to the values taken from the available materials, the materials providing the best fit may be determined.

Alternatively, the prior values for the optical properties of the enamel and/or dentin may be estimated from one or more patient or tooth-specific properties. For example, the prior values may be estimated for the enamel and/or dentin based on one or more properties such as the age of the patient, which may be known, or from an estimate of the patient age based on jaw shape, tooth structure, or other internal structure, or a measured property from the teeth, such as the near-IR transparency, absorption or scattering of the teeth. These additional properties may be used to refine the estimates of the enamel and/or dentin so that they may be calibrated specifically to the patient. For example a system may be trained to calibrate between known parameters and the optical properties of the dentin and/or enamel (e.g., the prior values that may be used).

Alternatively, rather than use prior values for the optical properties of the tooth in order to model the tooth (or a region of the tooth) to generate the visible light volumetric model, a tooth may be scanned both to determine the geometric distribution of the dentin and enamel within the volume of the tooth (e.g., using a near-IR wavelength or range of wavelengths) as well as using one or more visible light wavelengths that are partially absorbed and scattered by the enamel. Estimates of the volumetric transparency and scattering and/or absorption of the teeth at particular visible light wavelengths may be derived from these additional (e.g., RGB) visible light wavelength scans, in conjunction with the near-IR wavelength scan information, and may provide an accurate approximation of the internal structures. Although these additional (e.g., RGB) wavelengths are less penetrative, since the enamel is much less transparent to them, it may be difficult to solve for a volumetric distribution of internal structures (e.g., dentin) within the tooth using just this information. However, if this information is combined with volumetric information from the more penetrating near-IR information, providing accurate locations of the internal structures, the transparency and absorption at each of the visible light wavelengths may be approximated by modifying the same procedures that could otherwise be used to find internal structures.

For example, volumetric information may be determined from a tooth by scanning from a plurality of different positions around the tooth using a near-IR wavelength. The scanning provides both the location of the scanner (e.g., the location of the emitted/received near-IR light) and an image taken through the tooth at that position. This data may be used to reconstruct the internal volume, assuming that the transparency of the enamel to the near-IR light is high, while the transparency of other internal structures (e.g., dentin, carries, etc.) is lower. When visible light, for which the enamel is not highly transparent, but instead may be absorptive and/or scattering, is used to scan the tooth, the parameters of transparence and/or absorption/scattering may be set as a variable, with the internal structure being known from the near-IR imaging. Thus, in some variations, the visible light volumetric model may be more directly determined from the initial volumetric model to include the optical properties, such as transparency and/or absorption/scattering that may be generated at a plurality of visible light wavelengths.

For example, a technique which may be referred to as volumetric back propagation may be used. Volumetric back propagation may be used to estimate (e.g., trace) rays of a sensing wavelength going through the tooth volume and entering the camera. The actual intensities reaching the sensor for each ray may be determined from the penetrative images and sensor (camera) positions and orientations. For each ray, the damping of the intensity due to scattering in the volume it passes may be estimated. For example, when using near-IR light, the transmission of light through a strongly scattering and weakly absorbing material may be modeled using a hybrid calculation scheme of scattering by a technique (e.g., such as the Monte Carlo method) to obtain the spatial variation of transmittance of the light through the material. A set of projection data may be estimated by spatially extrapolating the difference in the optical density between the absorbing object and a non-absorbing reference to the shortest time of flight. This technique may therefore give a difference in absorption coefficients. For example, see E. Wolf, "Three-dimensional structure determination of semi-transparent objects from holographic data," *Optics Communications,* 1(4), pp. 153-156 (1969). The volumetric scattering may then be estimated by solving for the actual intensities reaching the sensor.

Given the volumetric structural model from the near-IR data, another wavelength (e.g., from visible spectrum) may be used to solve for one or more optical properties such as transparency. For example, this may be done either directly using the volumetric model from the near IR, or modifying the volumetric model using a pre-determined method (e.g., specifying some pre-measured function/map from near IR transparency to R/G/B transparency).

In any of these methods, when solving for the optical properties (such as light transparency and/or light absorption/scattering) of the visible light at different frequencies within the tooth volume, assumptions may be made to simplify the procedure. For example, the method may assume that the enamel on the teeth has uniform optical properties (e.g., transparency, absorption, scattering, etc.). Thus, any estimate of the optical properties may be uniformly applied to the modeled tooth or tooth region. Alternatively, the method may assume that individual teeth (or groups of teeth) have similar or identical optical properties. Thus, when modeling more than one tooth or groups of teeth, the method may separately model these different groups of teeth to determine optical properties for the different teeth or groups of teeth in the model. Finally, the method may presume that the optical properties of each point or sub-volume (e.g., voxel) within the enamel at some resolution may have different values; the method may therefore calculate a map or model of these optical properties that may correspond to the volumetric model (e.g., the model generated from the near-IR imaging).

As mentioned above, the volumetric model from the near-IR wavelengths, as well as the optical properties (forming the combined visible light volumetric light model) may be used to construct a model of a tooth or portion of a tooth (or multiple teeth) having similar or identical optical properties as a natural tooth for that patient. This information may be used to generate a more accurate digital model of the tooth (or teeth) and/or a more accurate physical model, such as a restorative implant. The restorative implant may be fabricated, for example, by 3D modeling using materials corresponding to the optical properties and volumetric structures identified.

Although the exemplary methods described above typically use the volumetric information taken from the near-IR scanning and modeling to determine internal structures such as the region between the dentin and the enamel in addition to visible light (e.g., RGB) wavelengths, any of these methods may instead or additionally be used with a visible light wavelength, particularly in the red (e.g., around 650 nm, e.g., between 600-750 nm, between 600-740 nm, between 600-730 nm, between 600-720 nm, between 600-710 nm, between 600-700 nm, etc.). In some variations, both the near-IR wavelength and a visible light wavelength may be used to determine a volumetric model (or models, which may be combined) of the teeth, and the additional optical properties may be used to determine the color and/or transparence of the teeth.

For example, in one example, volumetric data derived from a visible light wavelength (e.g., red) may be used to determine the relative location of dentin in the tooth being replaced or simulated, and the optical properties of the simulated tooth or tooth portion may be estimated for the tooth. The internal structure may be formed in the model (e.g., as part of a restorative implant and/or digital model) and the enamel may be applied having an estimated or matched color.

In another example, the volumetric data derived from a visible light wavelength (e.g., red) may be used to determine the relative location of dentin in the tooth, and prior information about the optical properties of the dentin and enamel may be used (e.g., such as values for dentin average color, scatter and absorption, etc., and values for enamel absorption and scatter). This information may then be used to generate the model, such as a restorative implant, of the tooth, as described above.

Also described herein are methods in which the optical properties (e.g., light absorption, light transmission, light reflection, light emission, etc.) of a tooth or region of a tooth may be determined by directly scanning with wavelengths of light within the visible light spectrum separately, and a volumetric estimation for each wavelength may be generated for each wavelength. This information may provide each color component separately, and the final information may be used to determine the contribution of each color component at the depths within the volume. In this example, a volumetric reconstruction using each different wavelength (e.g., a red, a blue and a green wavelength) may provide an estimate of the contribution of each of these wavelengths to the final optical properties to be modeled. For example, although the penetration of light in the blue wavelength through the teeth will typically be very low, and therefore the depth of penetration of the volumetric information may be equivalently low, this information may be combined with the volumetric model from the other visible wavelengths to provide a model of the visible properties of the teeth.

Volumetric models using each of the visible light wavelengths may be estimated, for example, using volumetric back propagation, or any other appropriate method. The scanner may provide the positon information for the emitting/sensing of the visible light wavelength, relative to the teeth, as well as the plurality of different images taken with each wavelength from known positions. This combination of information may then be used to solve for the volumetric information within the scanned tooth.

A combined model, combining the volumetric reconstructions of each of the visible (e.g., RGB) wavelengths, may be used to form a more accurate digital model, which may in turn be used to generate a physical model, such as a restorative implant. For example, a three-dimensional printer that allows the RGB components of each voxel to be specified may receive this information for each voxel within the reconstructed volume.

EXAMPLE

Figures 3A, 3B:
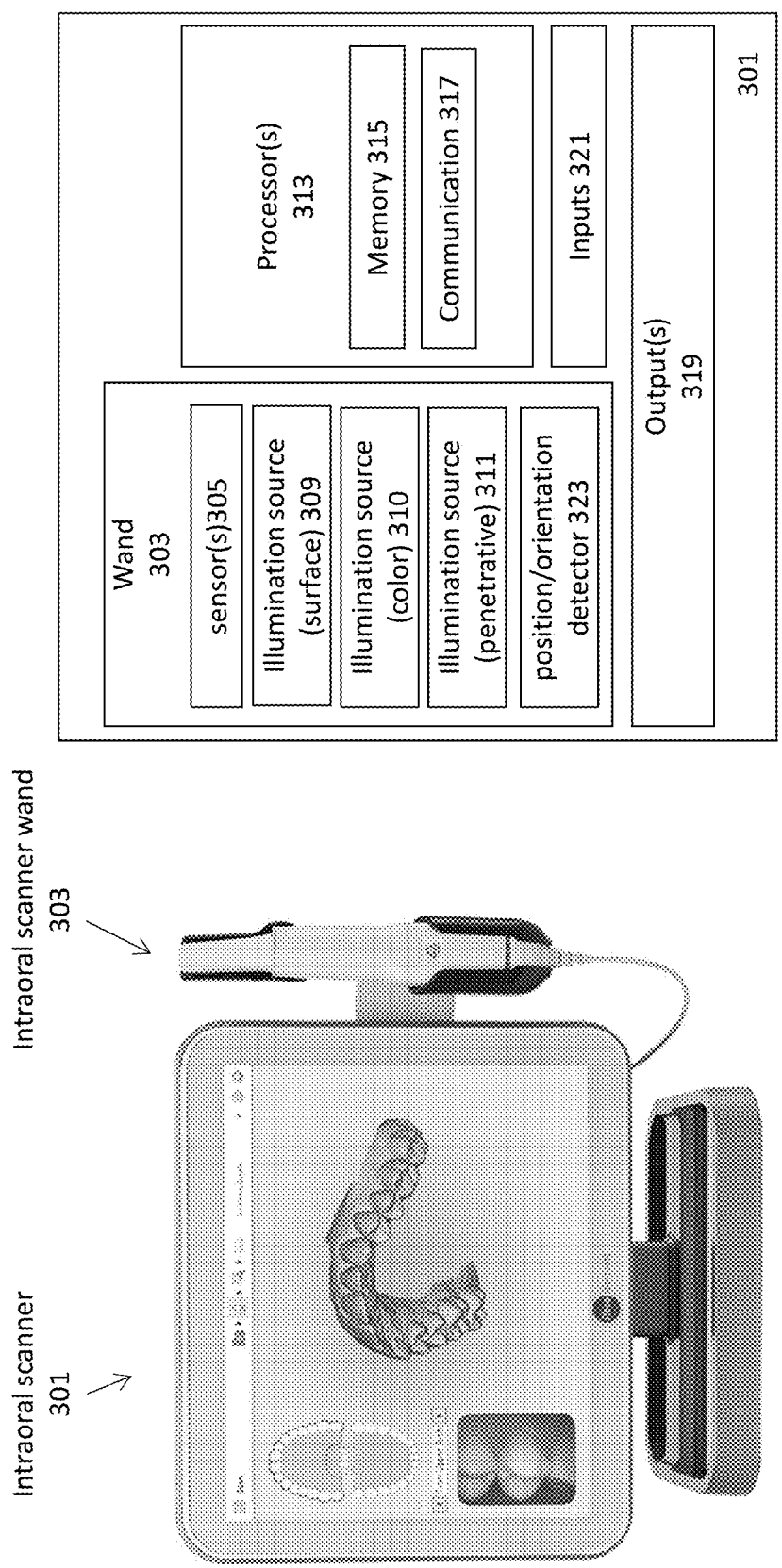
FIG. 3A illustrates one example of a 3D (color) intraoral scanner that may be adapted for used as described herein to generate a volumetric model of subject's teeth having both internal (identified by near-IR) and external (e.g., surface) figures, including a visible light wavelength.
FIG. 3B schematically illustrates an example of an intraoral scanner configured to generate a model of subject's teeth having both surface and internal features.

The methods, systems and/or computer readable media described herein may be used with, or may include, a scanner such as an intraoral scanner that scans both in near-IR (penetrative) and visible light (e.g., while light, approximately 400-600 nm) illumination. For example, FIGS. 3A and 3B illustrate such an intraoral scanner. The use of visible light in addition to the use of a penetrative wavelength, such as a near-IR illumination (e.g., 850 nm) may allow optical properties to be determined in addition to volumetric properties. A visible light volumetric model may include and correlate both types of information (e.g., internal and external structural information as well as optical properties), which may produce a more accurate map of a tooth or teeth that may be used for more precisely identifying (and later matching) the colors, transparency and shading of the teeth, e.g., in producing a dental restoration. The visible light volumetric model may be used with one or more techniques, such as 3D printing, to restore or produce the whole 3D structure of all or part of an original tooth having matching optical properties, in order to get a better simulation of the tooth for dental restorations (e.g., crowns and implants). The original volumetric model may be generated as described herein, using, for example, near-IR and/or trans-illumination scans that are combined with 3D scan of the teeth surface.

The methods and apparatuses described herein may include intraoral scanners for generating a three-dimensional (3D) model of a subject's intraoral region (e.g., tooth or teeth, gums, jaw, etc.) which may include internal features of the teeth and may also include a model of the surface, and methods of using such scanners. For example, FIG. 3A illustrates one example of an intraoral scanner 301 that may be configured or adapted as described herein to generate 3D models having both surface and internal features. As shown schematically in FIG. 3B, an exemplary intraoral scanner may include a wand 303 that can be hand-held by an operator (e.g., dentist, dental hygienist, technician, etc.) and moved over a subject's tooth or teeth to scan both surface and internal structures. The wand may include one or more sensors 305 (e.g., cameras such as CMOS, CCDs, detectors, etc.) and one or more light sources 309, 310, 311. In FIG. 3B, three light sources are shown: a first light source 309 configured to emit light in a first spectral range for detection of surface features (e.g., visible light, monochromatic visible light, etc.; this light does not have to be visible light), a second color light source (e.g., white light between 400-700 nm, e.g., approximately 400-600 nm), and a third light source 311 configured to emit light in a second spectral range for detection of internal features within the tooth (e.g., by trans-illumination, small-angle penetration imaging, laser florescence, etc., which may generically be referred to as penetration imaging, e.g., in the near-IR). Although separate illumination sources are shown in FIG. 3B, in some variations a selectable light source may be used. The light source may be any appropriate light source, including LED, fiber optic, etc. The wand 303 may include one or more controls (buttons, switching, dials, touchscreens, etc.) to aid in control (e.g., turning the wand on/of, etc.); alternatively or additionally, one or more controls, not shown, may be present on other parts of the intraoral scanner, such as a foot petal, keyboard, console, touchscreen, etc.

In general, any appropriate light source may be used, in particular, light sources matched to the mode being detected. For example, any of these apparatuses may include a visible light source or other (including non-visible) light source for surface detection (e.g., at or around 680 nm, or other appropriate wavelengths). A color light source, typically a visible light source (e.g., "white light" source of light) for color imaging may also be included. In addition a penetrating light source for penetration imaging (e.g., infrared, such as specifically near infrared light source) may be included as well.

The intraoral scanner 301 may also include one or more processors, including linked processors or remote processors, for both controlling the wand 303 operation, including coordinating the scanning and in reviewing and processing the scanning and generation of the 3D model including surface and internal features. As shown in FIG. 3B the one or more processors 313 may include or may be coupled with a memory 315 for storing scanned data (surface data, internal feature data, etc.). Communications circuitry 317, including wireless or wired communications circuitry may also be included for communicating with components of the system (including the wand) or external components, including external processors. For example the system may be configured to send and receive scans or 3D models. One or more additional outputs 319 may also be included for outputting or presenting information, including display screens, printers, etc. As mentioned, inputs 321 (buttons, touchscreens, etc.) may be included and the apparatus may allow or request user input for controlling scanning and other operations.

Any of the apparatuses and methods described herein may be used to scan for and/or identify internal structures such as cracks, caries (decay) and lesions in the enamel and/or dentin. Thus, any of the apparatuses described herein may be configured to perform scans that may be used to detect internal structures using a penetrative wavelength or spectral range of penetrative wavelengths. Also described herein are methods for detecting cracks, caries and/or lesions or other internal feature such as dental fillings, etc. A variety of penetrative scanning techniques (penetration imaging) may be used or incorporated into the apparatus, including but not limited to trans-illumination and small-angle penetration imaging, both of which detect the passage of penetrative wavelengths of light from or through the tissue (e.g., from or through a tooth or teeth).

Figure 3C:
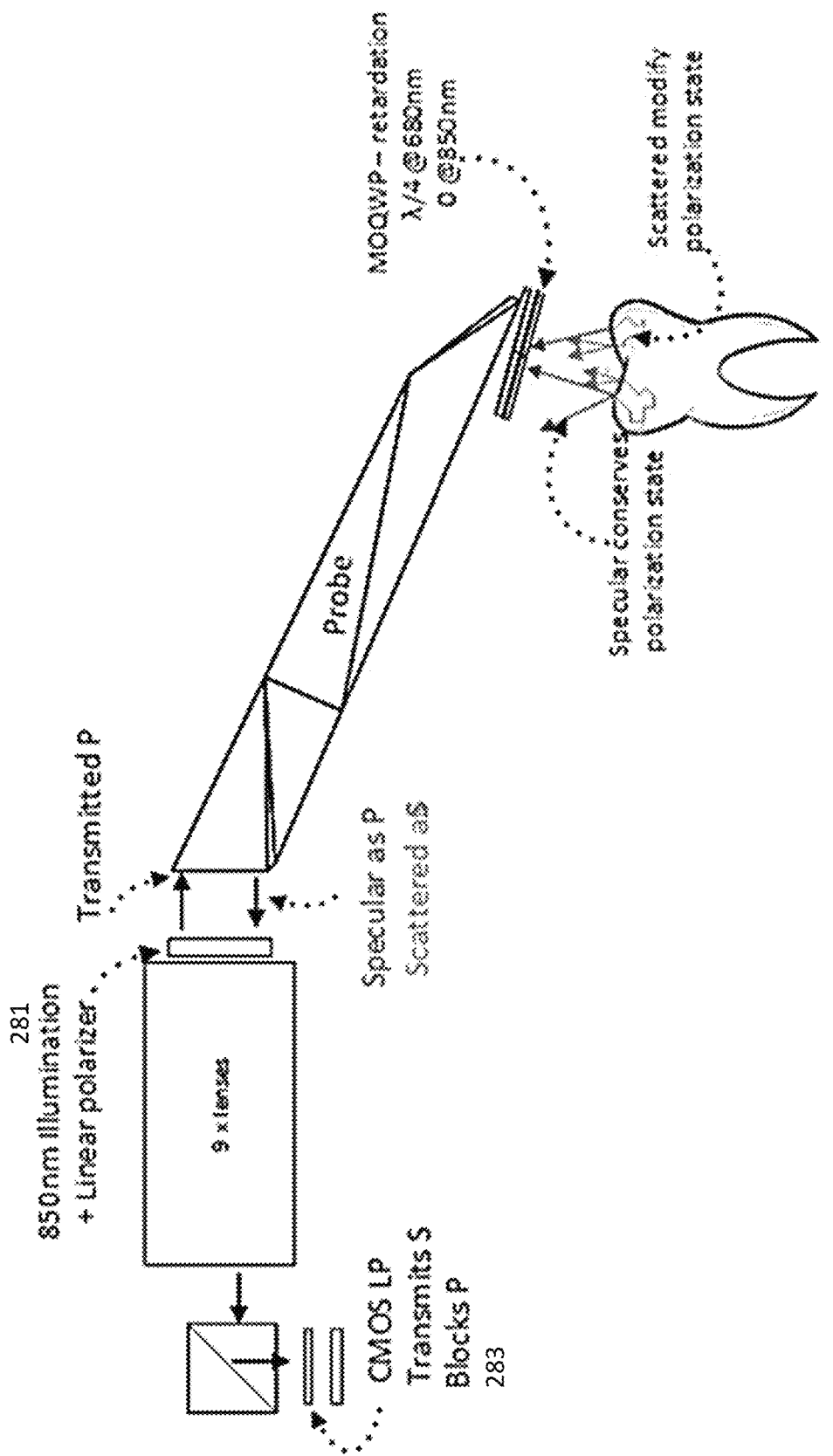
FIG. 3C shows a schematic of an intraoral scanner configured to do both surface scanning (e.g., visible light, non-penetrative) and penetrative scanning using a near infrared (IR) wavelength. The scanner includes a polarizer and filters to block near-IR light reflected off the surface of the tooth while still collecting near-IR light reflected from internal structures.

FIG. 3C shows a schematic of an intraoral scanner configured to do both surface scanning (e.g., visible light, non-penetrative) and penetrative scanning using a near infrared (IR) wavelength. In FIG. 3C, the scanner includes a polarizer (e.g., linear polarizer 281) and filters 283 to block near-IR light reflected off the surface of the tooth while still collecting near-IR light reflected from internal structures. In this example, near-IR light is applied with a known polarization (P) (at 850 nm in this example); emitted light illuminates the tooth and specular light reflected from the surface of the tooth, e.g., the enamel, is reflected with the specular polarization state conserved. Light hitting the internal features such as the dentin may instead be scattered (S), which may modify the polarization state. Within the intraoral scanner, light returning back through the wand to the sensor (e.g., a CMOS detector) is first filtered 283 through a filter that transmits the scattered (S) light from the internal structures to the detector but does not pass specular light with the original polarization (P) to the detector. Other intraoral scanner configurations with or without polarization filters such as those shown in FIG. 3C may be used as part of the probe.

The methods, systems and/or computer readable media described herein may provide more detailed visual properties of the teeth and may also or alternatively allow automated and/or more accurate 3D restoration of the inner structure of the tooth. These benefits may enable restoration that is closer to the original teeth, while being more robust to light conditions, illumination angles, viewing angles, background, spectrum and other factors that affect the appearance of tooth implants, including restorations such as artificial teeth, caps, dentures, veneers, bridges, etc.

Reconstruction of internal as well as surface features of the teeth, e.g., using segmentation of inner regions such as the dentin and the enamel thickness, may be used as restoration lab data for generating 3D reconstructions of a tooth, teeth, or portion of a tooth or teeth. Thus, the model of a patient's teeth including internal structures (e.g., a volumetric model or data representing a volumetric model) may be converted into restoration lab data that will allow either more accurate manual formation of an implant (e.g., artificial teeth, caps, dentures, veneers, etc.) or automatic formation of an implant (e.g., by 3D printing or robotic formation). The use of these volumetric models may facilitate the formation of implants that copy or mimic the tooth inner structure, transparency and color (hue, intensity, etc.) as part of the implant and thus optimally resemble the patient's real teeth.

In any of the methods and apparatuses for modeling the surface an internal structures described herein, the apparatuses (e.g., scanners) may be configured to concurrently record color (e.g., visible light, RGB, etc.) data from the teeth, and this color information may be included as part of the volumetric model data (e.g., the three-dimensional reconstruction). These volumetric models may be adapted to form visible light volumetric models by including volumetric visible light information.

Examples of the intraoral scanners and methods of operating them to generate the volumetric models are provided below. Penetrative images, e.g., image taken with an intraoral scanner using near-IR, may generate a volumetric model of the teeth. This volumetric model may be modified as described herein to include optical property information and may be used for construction of a dental restoration device, based on the more accurate teeth structure and optical properties provided by the visible light volumetric model engine. See, e.g., FIG. 4B, described below. Although the methods and apparatuses described herein are provided in the context of determining internal structures using near-IR or IR light, any of these methods and apparatuses, and particularly methods for modeling and constructing more accurate dental implants, may incorporate or be used with other imaging technologies that provide internal structure of the teeth, including, for example, X-ray or CBCT imaging.

When near-IR is used, the volumetric model may be formed from near IR or IR images (or any other wave-length that can penetrate the tooth surface, e.g. 800 nm, 850 nm, 900 nm, etc.) collected by the intraoral scanner. The volumetric model may include a 3D density map of the inner tooth structure, a 3D map of the optical properties of the outer surface and/or the region between the outer surface and the dentine, the dentine, etc. (e.g., for each point or voxel inside the tooth model), and optionally segmentation of different structures, e.g. the dentin, enamel, and/or the surface that separates them.

Any of the intraoral scanners described herein may be configured to capture, in real-time, the three or more imaging modes described above: e.g., surface 3D scan, RGB color capture of the tooth surface, and near-IR or IR images that are able to penetrate the tooth surface and image structures inside the teeth. This information, and particularly the penetrative images, may be used to produce a volumetric map of the tooth. The ability to capture at least these three imaging modes simultaneously or approximately simultaneously (e.g., by rapidly scanning between them may allow the production of three-dimensional models of the tooth/teeth which may be modified to include optical characteristics such as light absorption, light reflection, light transmission and/or light emission. This information may therefore be used to produce an accurate dental implants, including tooth replacements or restoratives, such as: caps, veneers, dentures, bridges, etc.

In a restorative treatment, the restorative implant (e.g., crown or bridge) may use information for shading as well as glazing the implant. The methods, systems and/or computer readable media described herein may produce one or more models of tooth internal and external structure and 3D optical properties for at least the outer surface and the region between the outer surface and the dentine.

Figure 4A:
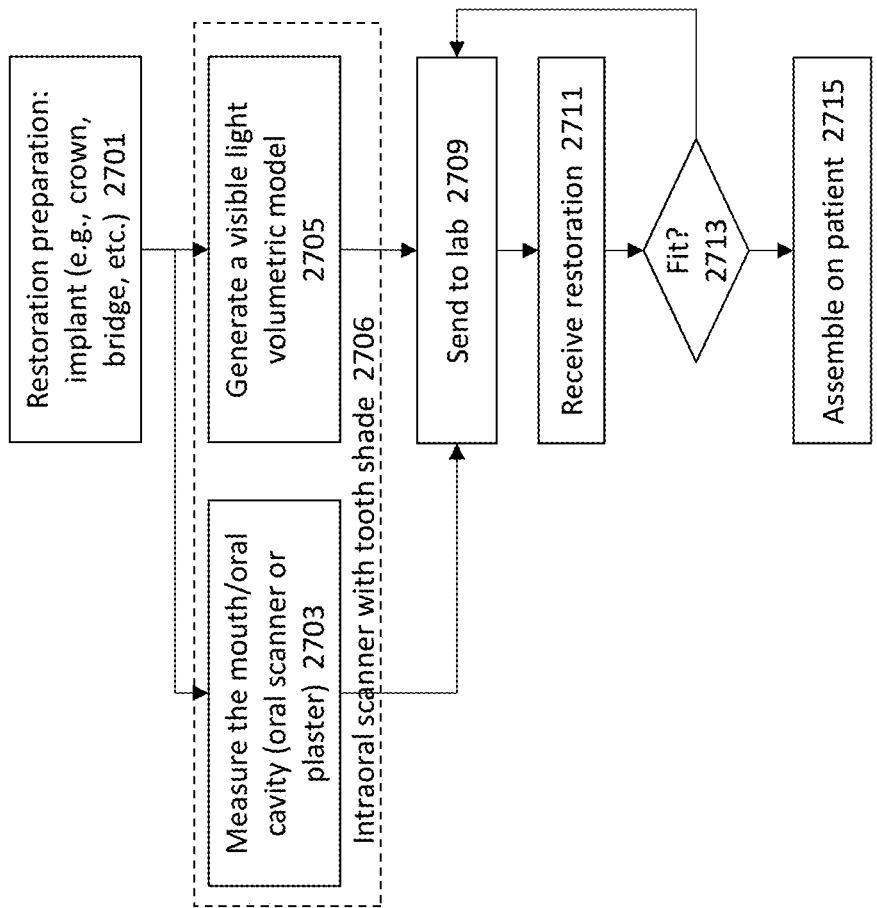
FIG. 4A illustrates a prior-art method of forming a dental implant.
Figure 4B:
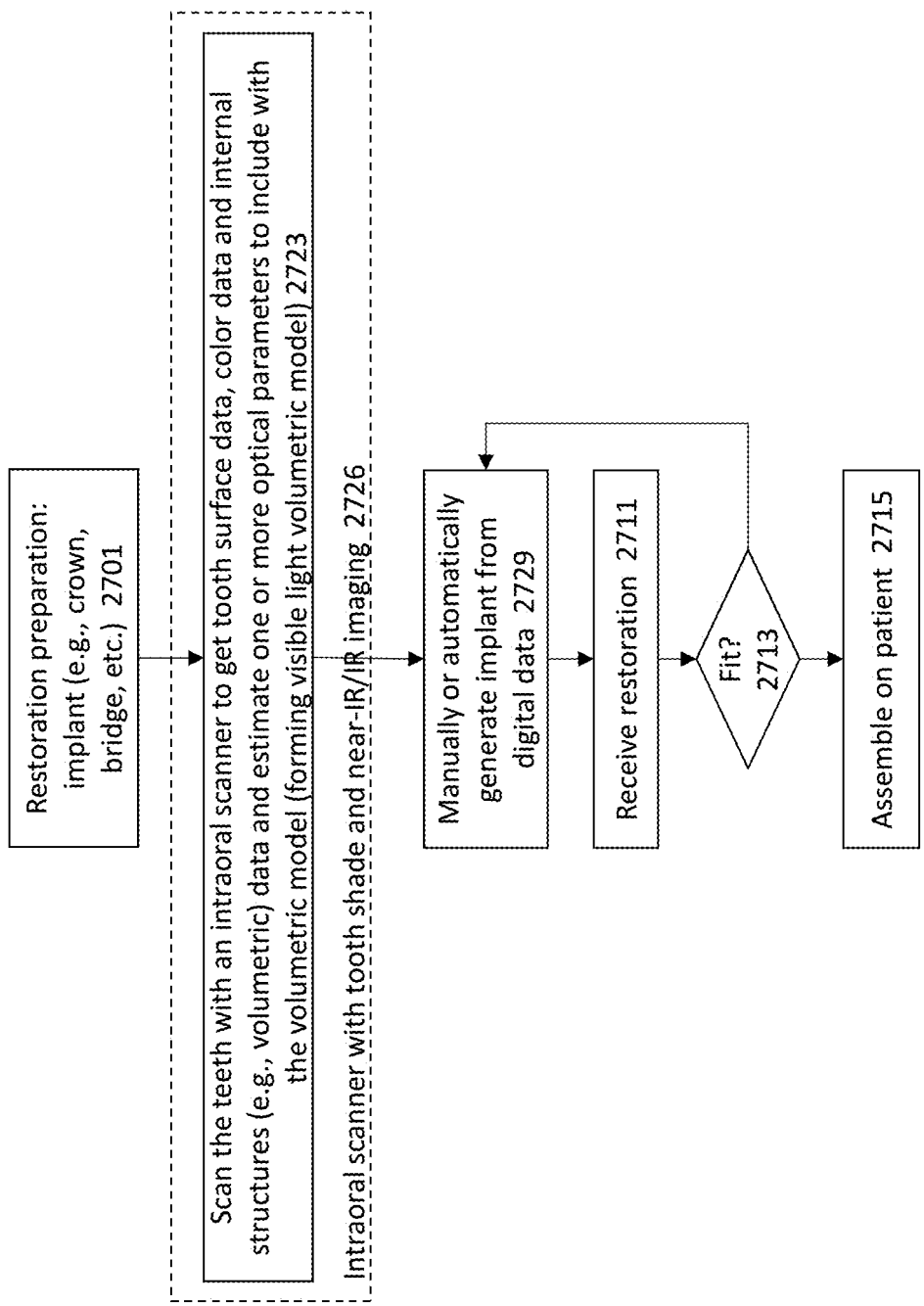
FIG. 4B illustrate a method for forming a dental implant by using an intraoral scanner operating in both non-penetrative (e.g., surface scanning and/or color scanning) wavelength and a penetrative (e.g., near-IR) wavelength to determine a visible light volumetric model, having one or more optical properties for voxels within the volume in addition to structural information about the teeth.

FIG. 4A illustrates an example of a process flow for a method of forming a dental prosthesis (e.g., a dental restoration) 2701 as currently processed. The steps may include taking measurements of the patient's teeth, including both the teeth to be modified as well as the patient's other teeth 2703. These measurements may be taken manually (e.g., using a cast of the teeth) and/or using a digital scanner (e.g., intraoral scanner). These methods may also generate, from the initial volumetric model, a visible light volumetric model 2705. After iterative settling on the optical properties as described above, the resulting optical property matching may be based on an overall impression of the tooth. Depending on how the optical properties were set/assigned initially, they may have a very limited spatial distribution. This information may all be sent to a lab 2709 to fabricate the implant 2711, which may then be checked for fit 2713 (and revised if it doesn't fit) and installed on the patient 2715.

An intraoral scanner may be used to provide the surface measurements of the patient's teeth, and may be adapted to provide optical properties for voxels within the volume.

The optical properties within the volume may be related to the thickness of the enamel, which may be readily estimated when the three-dimensional distribution of the outer surface and dentin are known. Thus, the optical properties information may be combined with the shape and/or visible light information from the original volumetric model of the teeth. As described in FIG. 4B, a restoration implant may be prepared 2701 using an intra-oral scanner 2726 providing both volumetric mapping of scanned teeth that includes data for 3D dimensions and optical properties; this information may be used directly (digitally) to form the implant, or it may be sent to a lab 2729 to form the implant from the data. The implant may then be checked for fit 2713 (and revised if it doesn't fit) and installed on the patient 2715.

The use of near-IR and/or IR data to enhance the volumetric data of the scanned teeth allows the correlation of optical properties within the volumetric model (or in a separate data structure correlated with the volumetric model).

In practice, a lab may receive information of 3D measurement requirements of the as well as information about their optical properties within the volume. The intraoral scanner (IOS) may be configured to acquire 3D and tooth optical properties automatically.

Any of the methods (including user interfaces) described herein may be implemented as software, hardware or firmware, and may be described as a non-transitory computer-readable storage medium storing a set of instructions capable of being executed by a processor (e.g., computer, tablet, smartphone, etc.), that when executed by the processor causes the processor to control perform any of the steps, including but not limited to: displaying, communicating with the user, analyzing, modifying parameters (including timing, frequency, intensity, etc.), determining, alerting, or the like.

When a feature or element is herein referred to as being "on" another feature or element, it can be directly on the other feature or element or intervening features and/or elements may also be present. In contrast, when a feature or element is referred to as being "directly on" another feature or element, there are no intervening features or elements present. It will also be understood that, when a feature or element is referred to as being "connected", "attached" or "coupled" to another feature or element, it can be directly connected, attached or coupled to the other feature or element or intervening features or elements may be present. In contrast, when a feature or element is referred to as being "directly connected", "directly attached" or "directly coupled" to another feature or element, there are no intervening features or elements present. Although described or shown with respect to one embodiment, the features and elements so described or shown can apply to other embodiments. It will also be appreciated by those of skill in the art that references to a structure or feature that is disposed "adjacent" another feature may have portions that overlap or underlie the adjacent feature.

Terminology used herein is for the purpose of describing particular embodiments only and is not intended to be limiting of the invention. For example, as used herein, the singular forms "a", "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof. As used herein, the term "and/or" includes any and all combinations of one or more of the associated listed items and may be abbreviated as "/".

Spatially relative terms, such as "under", "below", "lower", "over", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if a device in the figures is inverted, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly. Similarly, the terms "upwardly", "downwardly", "vertical", "horizontal" and the like are used herein for the purpose of explanation only unless specifically indicated otherwise.

Although the terms "first" and "second" may be used herein to describe various features/elements (including steps), these features/elements should not be limited by these terms, unless the context indicates otherwise. These terms may be used to distinguish one feature/element from another feature/element. Thus, a first feature/element discussed below could be termed a second feature/element, and similarly, a second feature/element discussed below could be termed a first feature/element without departing from the teachings of the present invention.

Throughout this specification and the claims which follow, unless the context requires otherwise, the word "comprise", and variations such as "comprises" and "comprising" means various components can be co-jointly employed in the methods and articles (e.g., compositions and apparatuses including device and methods). For example, the term "comprising" will be understood to imply the inclusion of any stated elements or steps but not the exclusion of any other elements or steps.

In general, any of the apparatuses and methods described herein should be understood to be inclusive, but all or a sub-set of the components and/or steps may alternatively be exclusive, and may be expressed as "consisting of" or alternatively "consisting essentially of" the various components, steps, sub-components or sub-steps.

As used herein in the specification and claims, including as used in the examples and unless otherwise expressly specified, all numbers may be read as if prefaced by the word "about" or "approximately," even if the term does not expressly appear. The phrase "about" or "approximately" may be used when describing magnitude and/or position to indicate that the value and/or position described is within a reasonable expected range of values and/or positions. For example, a numeric value may have a value that is +/−0.1% of the stated value (or range of values), +/−1% of the stated value (or range of values), +/−2% of the stated value (or range of values), +/−5% of the stated value (or range of values), +/−10% of the stated value (or range of values), etc. Any numerical values given herein should also be understood to include about or approximately that value, unless the context indicates otherwise. For example, if the value "10" is disclosed, then "about 10" is also disclosed. Any numerical range recited herein is intended to include all sub-ranges subsumed therein. It is also understood that when a value is disclosed that "less than or equal to" the value, "greater than or equal to the value" and possible ranges between values are also disclosed, as appropriately understood by the skilled artisan. For example, if the value "X" is disclosed the "less than or equal to X" as well as "greater than or equal to X" (e.g., where X is a numerical value) is also disclosed. It is also understood that the throughout the application, data is provided in a number of different formats, and that this data, represents endpoints and starting points, and ranges for any combination of the data points. For example, if a particular data point "10" and a particular data point "15" are disclosed, it is understood that greater than, greater than or equal to, less than, less than or equal to, and equal to 10 and 15 are considered disclosed as well as between 10 and 15. It is also understood that each unit between two particular units are also disclosed. For example, if 10 and 15 are disclosed, then 11, 12, 13, and 14 are also disclosed.

Although various illustrative embodiments are described above, any of a number of changes may be made to various embodiments without departing from the scope of the invention as described by the claims. For example, the order in which various described method steps are performed may often be changed in alternative embodiments, and in other alternative embodiments one or more method steps may be skipped altogether. Optional features of various device and system embodiments may be included in some embodiments and not in others. Therefore, the foregoing description is provided primarily for exemplary purposes and should not be interpreted to limit the scope of the invention as it is set forth in the claims.

The examples and illustrations included herein show, by way of illustration and not of limitation, specific embodiments in which the subject matter may be practiced. As mentioned, other embodiments may be utilized and derived there from, such that structural and logical substitutions and changes may be made without departing from the scope of this disclosure. Such embodiments of the inventive subject matter may be referred to herein individually or collectively by the term "invention" merely for convenience and without intending to voluntarily limit the scope of this application to any single invention or inventive concept, if more than one is, in fact, disclosed. Thus, although specific embodiments have been illustrated and described herein, any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A method of making a dental restoration for a patient, so that the dental restoration has optical properties that match optical properties of the patient's teeth, the method comprising:
   receiving a visible light volumetric model of at least a portion of the patient's tooth, wherein the visible light volumetric model includes a representation of an outer surface of the patient's tooth and a region of enamel extending from the outer surface of the patient's tooth to a dentine of the patient's tooth; further wherein the visible light volumetric model includes an indicator of two or more of: light absorbance, light reflection and light scattering of one or more wavelengths of light for each of a plurality of voxels defining the outer surface of the patient's tooth and the region of enamel extending from the outer surface of the patient's tooth to the dentine to estimate optical properties of the patient's tooth, wherein the visible light volumetric model includes a comparison of the estimated optical properties of the patient's tooth and measured optical properties of the patient's tooth, further wherein differences between the estimated optical properties of the patient's tooth and the measured optical properties of the patient's tooth are minimized by iteratively adjusting starting optical property values until estimated images based on the estimate optical properties converge to a value within an acceptable range within real images based on the measured optical properties; and
   making the dental restoration from the visible light volumetric model, wherein surface and internal structure of the dental restoration have optical properties based on the visible light volumetric model.

2. The method of claim 1, wherein receiving the visible light volumetric model comprises receiving the visible light volumetric model of at least a portion of the patient's tooth for a tooth that is adjacent to the patient's tooth to be restored by the dental restoration.

3. The method of claim 1, wherein making the dental restoration comprises generating a volumetric model of the dental restoration comprising the plurality of voxels, wherein the plurality of voxels of the volumetric model of the dental restoration have values based on values of the plurality of voxels of the visible light volumetric model.

4. The method of claim 1, wherein receiving the visible light volumetric model comprises:
   generating or receiving a volumetric model of the at least the portion of the patient's tooth from a three-dimensional (3D) oral scanner operating in both a near-IR wavelength and a visible light wavelength, wherein the volumetric model includes the representation of the outer surface of the patient's tooth and the region of enamel extending from the outer surface of the patient's tooth to the dentine;
   estimating values for one or more of: light absorption, light reflection, light transmission, and light scattering of one or more visible light wavelengths for the plurality of voxels defining the outer surface of the patient's tooth and the region of enamel extending from the outer surface of the patient's tooth to the dentine; and
   adding the estimated values to the volumetric model to form the visible light volumetric model.

5. The method of claim 4, wherein estimating values comprises estimating values for two or more of: light absorption, light reflection, light transmission, and light scattering for each of the plurality of voxels defining the outer surface of the patient's tooth and the region of enamel extending from the outer surface of the patient's tooth to the dentine.

6. The method of claim 4, wherein estimating values comprises estimating values for one or more of: light absorption, light reflection, light transmission, and light scattering at three or more visible light wavelengths for each of the plurality of voxels defining the outer surface of the patient's tooth and the region of enamel extending from the outer surface of the patient's tooth to the dentine.

7. The method of claim 6, wherein the three or more visible light wavelengths include one or more red, green and blue wavelength.

8. The method of claim 4, wherein estimating values comprises estimating a value for one or more of: light absorption, light reflection, light transmission, and light scattering of one or more visible light wavelengths for each of the plurality of voxels defining the outer surface of the patient's tooth and the region of enamel extending from the outer surface of the patient's tooth to the dentine by setting the value to a predetermined prior value.

9. The method of claim 4, further comprising setting the values for one or more of: light absorption, light reflection, light transmission, and light scattering of one or more visible light wavelengths for each of the plurality of voxels defining the outer surface of the patient's tooth and the region of enamel extending from the outer surface of the patient's tooth to the dentine to a predetermined prior value determined by parametric estimation.

10. The method of claim 4, wherein estimating comprises estimating a value for one or more of: light absorption, light reflection, light transmission, and light scattering of one or more visible light wavelengths for each of the plurality of voxels defining the outer surface of the patient's tooth and the region of enamel extending from the outer surface of the patient's tooth to the dentine by iterating to determine the value that approximates optical properties based on a position of a camera and a reconstructed volume compared to RGB data recorded when scanning the patient's teeth with an intraoral scanner to generate the volumetric model.

11. The method of claim 4, wherein estimating comprises estimating a value for one or more of: light absorption, light reflection, light transmission, and light scattering of one or more visible light wavelengths for each of the plurality of voxels defining the outer surface of the patient's tooth and the region of enamel extending from the outer surface of the patient's tooth to the dentine by setting the value to a predetermined prior value determined from a population of representative patients, wherein the predetermined prior value is selected using one or more of: measured RGB data recorded when scanning the patient's teeth with an intraoral scanner to generate the volumetric model, volume information, and patient information.

12. The method of claim 11, wherein the volume information comprises path length from the outer surface of the patient's tooth to the dentine through the region of the enamel.

13. The method of claim 11, wherein the patient information comprises one or more of: patient age, gender, estimated jaw shape.

14. The method of claim 4, further comprising dividing the volumetric model into a plurality of sub-regions before estimating the values for one or more of: light absorption, light reflection, light transmission, and light scattering of one or more visible light wavelengths for the outer surface of the patient's tooth and the region of enamel extending from the outer surface of the patient's tooth to the dentine.

15. The method of claim 1, wherein the estimated optical properties of the patient's tooth are determined per wavelength of light.

16. The method of claim 1, wherein the visible light volumetric model comprises an estimated color of the patient's tooth corresponding to a difference between an enamel contribution and a product of a dentine contribution and a length through the region of the enamel from the outer surface of the patient's tooth to the dentine.

17. The method of claim 1, wherein the estimated optical properties of the patient's tooth are based on a thickness of the region of enamel.

18. The method of claim 17, wherein the thickness of the region of enamel is derived from a position of the dentine relative to the outer surface of the patient's tooth in the visible light volumetric model.

19. A non-transitory computer readable medium storing instructions for execution by a processor for preparing a dental restoration having optical properties matching optical properties of a patient's tooth, wherein the instructions, when executed, cause the processor to:

generate or receive a volumetric model of at least a portion of the patient's tooth from a three-dimensional (3D) oral scanner operating in both a near-IR wavelength and a visible light wavelength, wherein the volumetric model includes a representation of an outer surface of the patient's tooth and a region of enamel extending from the outer surface of the patient's tooth to the patient's dentine;

estimate optical properties of the patient's tooth using two or more of: light absorption, light reflection, light transmission, and light scattering of one or more visible light wavelengths for each of a plurality of voxels defining the outer surface of the patient's tooth and the region of enamel extending from the outer surface of the patient's tooth to the patient's dentine;

add the estimated optical properties to the volumetric model to form a visible light volumetric model, wherein the visible light volumetric model includes a comparison of the estimated optical properties of the patient's tooth and measured optical properties of the patient's tooth, wherein differences between the estimated optical properties of the patient's tooth and the measured optical properties of the patient's tooth are minimized by iteratively adjusting starting optical property values until estimated images based on the estimate optical properties converge to a value within an acceptable range within real images based on the measured optical properties; and make the dental restoration from the visible light volumetric model.

20. A non-transitory computer readable medium storing instructions for execution by a processor that, when executed, cause the processor to:

generate or receive a volumetric model of at least a portion of a patient's tooth, wherein the volumetric model includes a plurality of voxels representing an outer surface of the patient's tooth and a region of enamel extending from the outer surface of the patient's tooth to the patient's dentine;

estimate optical properties of the patient's tooth using one or more of: light absorption, light reflection, light transmission, and light scattering of one or more visible light wavelengths for each of the plurality of voxels defining the outer surface of the patient's tooth and the region of enamel extending from the outer surface of the patient's tooth to the patient's dentine; and add the estimated optical properties to the volumetric model to form a visible light volumetric model, wherein the visible light volumetric model includes a comparison of the estimated optical properties of the patient's tooth and measured optical properties of the patient's tooth, wherein differences between the estimated optical properties of the patient's tooth and the measured optical properties of the patient's tooth are minimized by iteratively adjusting starting optical property values until estimated images based on the estimate optical properties converge to a value within an acceptable range within real images based on the measured optical properties.

21. The non-transitory computer readable medium of claim 20, wherein the instructions cause the processor to receive volumetric data from a three-dimensional (3D) oral scanner operating in both a near-IR wavelength and a visible light wavelength.

22. The non-transitory computer readable medium of claim 20, wherein the instructions cause the processor to receive the volumetric model of at least the portion of the patient's tooth, wherein the volumetric model comprises the plurality of voxels defining the outer surface of the patient's tooth and the region of enamel extending from the outer surface of the patient's tooth to the patient's dentine.

23. The non-transitory computer readable medium of claim 20, wherein the instructions cause the processor to estimate values for two or more of: light absorption, light reflection, light transmission, and light scattering.

24. The non-transitory computer readable medium of claim 20, wherein the instructions cause the processor to estimate values for one or more of: light absorption, light reflection, light transmission, and light scattering at three or more visible light wavelengths.

\* \* \* \* \*